(12) United States Patent
Radichel et al.

(10) Patent No.: US 12,272,934 B2
(45) Date of Patent: Apr. 8, 2025

(54) INTEGRATED TRANSMISSION LINE INSTALLATION SYSTEM

(71) Applicant: CONDUX INTERNATIONAL, INC., Mankato, MN (US)

(72) Inventors: Bradley Paul Radichel, Mankato, MN (US); Eric Lakin Cope, Mankato, MN (US); Heinz Ulrich Wortmann, Mankato, MN (US); Michael Robert Johnson, Mankato, MN (US); David Jon Hassing, Mankato, MN (US); Santosh Saride, Mankato, MN (US)

(73) Assignee: Condux International, Inc., Mankato, MN (US)

( * ) Notice: Subject to any disclaimer, the term of this patent is extended or adjusted under 35 U.S.C. 154(b) by 350 days.

(21) Appl. No.: 17/761,962

(22) PCT Filed: Sep. 18, 2020

(86) PCT No.: PCT/US2020/051618
§ 371 (c)(1),
(2) Date: Mar. 18, 2022

(87) PCT Pub. No.: WO2021/055839
PCT Pub. Date: Mar. 25, 2021

(65) Prior Publication Data
US 2022/0393444 A1 Dec. 8, 2022

Related U.S. Application Data

(60) Provisional application No. 62/903,584, filed on Sep. 20, 2019.

(51) Int. Cl.
*H02G 1/08* (2006.01)
*G02B 6/52* (2006.01)
*H02G 9/06* (2006.01)

(52) U.S. Cl.
CPC ............ *H02G 1/086* (2013.01); *G02B 6/52* (2013.01); *H02G 9/06* (2013.01)

(58) Field of Classification Search
CPC ............ H02G 1/086; H02G 9/04; H02G 9/06; H02G 9/065; H02G 9/08
See application file for complete search history.

(56) References Cited

U.S. PATENT DOCUMENTS

| 5,390,841 A | 2/1995 | Horiuchi et al. |
| 5,467,968 A | 11/1995 | Proud et al. |

(Continued)

FOREIGN PATENT DOCUMENTS

| EP | 2031720 A1 * | 3/2009 | .............. H02G 1/086 |
| WO | WO-2018090043 A1 * | 5/2018 | ............ G01V 11/002 |

OTHER PUBLICATIONS

Extended European Search Report for Application No. 20864354.4 mailed Sep. 15, 2023.

(Continued)

*Primary Examiner* — Tyrone V Hall, Jr.
(74) *Attorney, Agent, or Firm* — Merchant & Gould P.C.

(57) ABSTRACT

An integrated transmission line installation system includes a transmission line conveying system that operates to install a transmission line within a conduit by advancing the transmission line through the conduit. The conduit includes at least a first segment and a second segment. The segments are evaluated to determine a full route including the routes of the first and second segments, and an installation plan is generated based at least in part on the full route. The transmission line conveying system includes two or more transmission line conveying apparatuses, a first that controls the advancement of the transmission line through the first segment, and a second that controls the advancement of the transmission line through the second segment. The transmission line conveying system controls and synchronizes (Continued)

the operation of the transmission line conveying apparatuses according to the installation plan so that the transmission line can be continuously installed through the full length of the conduit in a single pass.

17 Claims, 41 Drawing Sheets

(56) References Cited

U.S. PATENT DOCUMENTS

| | | |
|---|---|---|
| 5,897,103 A | 4/1999 | Griffioen et al. |
| 6,264,171 B1 | 7/2001 | Hoium et al. |
| 11,025,039 B2 | 6/2021 | Radichel et al. |
| 11,255,479 B2 | 2/2022 | Radichel et al. |
| 2004/0007699 A1 | 1/2004 | Griffioen et al. |

OTHER PUBLICATIONS

International Search Report and Written Opinion for PCT/US2020/051648 (Feb. 8, 2021).

* cited by examiner

INTEGRATED TRANSMISSION LINE INSTALLATION SYSTEM

CROSS-REFERENCE TO RELATED APPLICATION

This application is a National Stage Application of PCT International Patent Application No. PCT/US2020/051618, filed Sep. 18, 2020, which claims the benefit of and priority to U.S. Provisional Patent Application No. US 62/903,584, filed Sep. 20, 2019, which applications are hereby incorporated by reference. To the extent appropriate, a claim of priority is made to each of the above disclosed applications.

BACKGROUND

Transmission lines are used for transmitting power or data signals. One type of transmission line is a fiber optic cable that can be used to transmit digital data using light signals. The use of fiber optic cable for data transmission is popular, at least in part due to the high data transmission rate and very fast transmission speed.

Transmission lines can be used to carry power or data signals short distances, such as within a building, or long distances, such as between neighboring cities. For longer distance communication, cables are often installed in underground ducts, where continuous cables as long as 0.5, 1, 2, 5 kilometers, or more, are desired between manhole or hand hole locations.

Installation equipment such as line blowers and pullers have been developed that can be used to insert fiber optic cables into ducts over long distances, but there are many variables that impact whether or not such an installation will be successful.

Because of the uncertainty that an installation will be able to reach the full desired distance of a long run (which would require either that the installation be retried or, more commonly, that the end of the cable be located, the duct opened up, and one or more additional attempts be made to complete the run), a long run is typically divided up into several shorter runs. For example, if an installation of a 10,000 foot cable is desired, the run might be divided into ten 1,000 foot segments.

To install the first 1,000 feet, the installation equipment is setup at the beginning of the run, and then the first 1,000 feet of cable is installed. Then, the remaining 9,000 feet of cable must be passed through the duct and temporarily stored at the end of the first run—typically by laying the cable on the ground in a "figure eight" shape. This figure eight process alone can take 90 minutes to 2 hours!

Next, the installation equipment is then moved to the beginning of the next run, and another 1,000 feet of cable is installed. The remaining 8,000 feet of cable is then passed through and once again temporarily stored in a figure eight on the ground adjacent the end of that run, which can take another 90 minutes to 2 hours of time.

This process continues until the full 10,000 feet of cable has been installed. This process is not only time consuming, but can also result in microbending and point loading of the cable, which can break the glass fibers inside the cable, reducing or destroying the ability of the fibers to transmit signals.

SUMMARY

In general terms, this disclosure is directed to a transmission line installation system. In one possible configuration and by non-limiting example, the transmission line installation system utilizes a "system" approach to installing a continuous reel of cable through an entire route of a duct in a single pass, without having to figure eight the cable and perform the installation in stages. In another example, the transmission line installation system synchronizes the operation of two or more transmission line conveying apparatuses to continuously install a transmission line into a conduit having multiple segments in a single pass. Various aspects are described in this disclosure, which include, but are not limited to, the following aspects.

One aspect is a transmission line installation system comprising: a control unit comprising a processing device, a computer-readable storage device, a communication device, a display device, and at least one input device, the control unit being configured to display status information and to receive input from a user; and at least two transmission line conveying apparatuses arranged in series along a conduit and operable to cooperate to advance a transmission line through a conduit, the transmission line conveying apparatuses comprising a plurality of components each including a local controller operable to locally control the associated component, the local controllers of the components comprising a processing device, a computer-readable storage device, and a communication device, wherein the communication devices of the local controllers are configured to communicate with at least one of the control unit and at least one other local controller to synchronize operation of the components during installation of the transmission line.

Another aspect is a method of installing a transmission line into a duct, the duct having at least a first segment and a second segment, the method comprising: operating a first line blower to receive a transmission line and to advance the transmission line into the first segment of the duct; monitoring advancement of the transmission line through the first segment of the duct; automatically activating a second line blower arranged between the first and second segments of the duct when determined that the transmission line is approaching an end of the first segment; and operating the second line blower to receive the transmission line from the first segment of the duct and to advance the transmission line into the second segment of the duct.

A further aspect is a method of generating a transmission line installation plan for installing a transmission line into a duct, the duct having at least a first segment and a second segment, the method comprising: generating a first installation plan for the first segment including analyzing a route of the first segment and defining installation parameters based at least in part on the route of the first segment; generating a second installation plan for the second segment including analyzing a route of the second segment and defining installation parameters based at least in part on the route of the second segment; determining a transition plan for a transition region defining installation parameters for advancing the transmission line from an end of the first segment to a beginning of the second segment; and generating a full route installation plan based on the first installation plan, second installation plan, and transition plan.

Yet another aspect is a method of installing a transmission line, comprising using a transmission line installation system to advance the transmission line through the duct according to the transmission line installation plan generated by the method of generating a transmission line installation plan.

Another aspect is a flexible seal for a transmission line blower, comprising: a body having an inner aperture extending therethrough, the body including a securing flange and an inner body coupled together at a forward end, the securing flange configured to be supported to prevent rearward movement of the flexible seal, and the inner body extending along the inner aperture and configured to deforms and conform to an exterior shape of a transmission line as it passes through the inner aperture to form a seal along an exterior surface of the transmission line.

A further aspect is a transmission line blower comprising: an air block having a transmission line input aperture; and the flexible seal positioned at the transmission line input aperture to seal the aperture when a transmission line passes therethrough.

Yet another aspect is a rotational seal assembly for a transmission line blower, comprising: a rotational coupling having a stationary side and a rotational side that is rotatable relative to the stationary side; and a seal coupled to the rotational side of the rotational coupling, the seal having a body with an inner aperture extending therethrough, the body including an inner body extending along the inner aperture to receive the transmission line therethrough and to rotate on the rotational coupling as the transmission line advances through the inner aperture.

Another aspect is a transmission line blower comprising: an air block having a transmission line input aperture; and the rotational seal positioned at the transmission line input aperture to seal the aperture when a transmission line passes therethrough.

A further aspect is a line blower comprising: a local controller operable under control of a global controller; an air block having a transmission line input and a transmission line output; an air intake configured to receive pressurized air and to supply the pressurized air to the air block; and a fluid injector controlled by the local controller and configured to inject fluid onto the transmission line as the transmission line passes between the transmission line input and the transmission line output.

Another aspect is a transmission line installation monitoring and management system, comprising: at least one processing device; and at least one computer readable storage device, storing data instructions, that when executed by the processing device, cause the processing device to: manage installation resources including at least human installers and installation equipment by assigning the resources to projects, and tracking the locations of the resources; monitor and manage a transmission line installation system by communicating with the transmission line installation system across a data communication network to: receive installation status data from the transmission line installation system, the status data being provided in real time during the installation and providing updates on the status of installation of a transmission line through a duct; and send commands to the transmission line installation system to adjust the operation of the transmission line installation system; manage a project schedule; and perform historical analysis by saving data regarding prior transmission line installations, and using the data to predict resources and materials that will be needed for projects on the project schedule.

Yet another aspect is a duct internal diameter profiling device comprising: a body shaped and sized to be passed through a duct; and a plurality of projections extending from the body for interacting with an interior surface of the duct when passed therethrough, wherein the plurality of projections are movable to measure one or more features of the interior of the duct.

A further aspect is a power system for a transmission line installation system comprising an air compressor and hydraulic pump integrated into a single unit, and further comprising a controller, the controller operable to bi-directionally communicate with other components of the transmission line installation system to synchronize the system and the other components.

Another aspect is a line blower comprising: a cable drive assembly configured to engage with a transmission line and provide a pushing force to advance the transmission line; an air block having a transmission line input and a transmission line output; an air intake configured to receive pressurized air and to supply the pressurized air to the air block; and a guide system including a lead in guide structure having a tapered configuration to guide a leading end of the transmission line.

Yet another aspect is a line blower comprising: an air block comprising: a transmission line input; a transmission line output; and an air input; and an air block lead in guide system arranged at the transmission line input having a tapered configuration to guide a leading end of a transmission line into the air block.

A further aspect is a transmission line installation system comprising: a transmission line conveying apparatus comprising an input duct clamp and an output duct clamp, the input duct clamp configured for connection to an end of a first duct segment, and the output duct clamp configured for connection to an end of a second duct segment.

DETAILED DESCRIPTION

Figure 1:
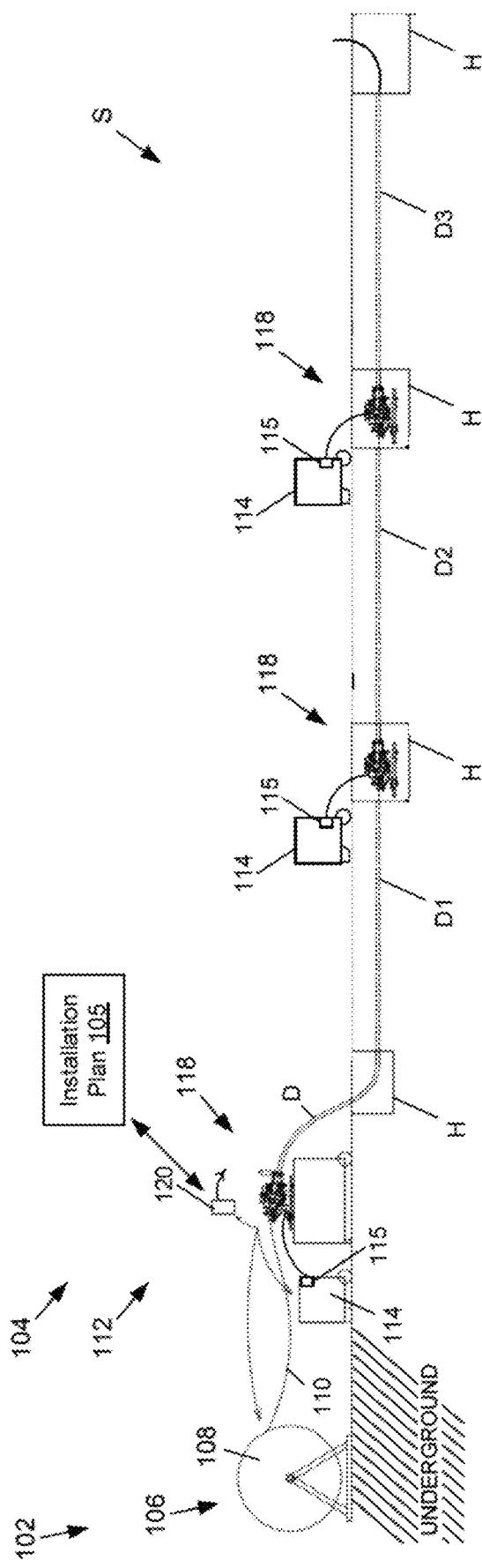
FIG. 1 is a schematic diagram illustrating an example transmission line installation system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to a transmission line installation system 100, which can be used to install a transmission line. The term "transmission line" is used herein as a generic term for any type of wire, cable, or other elongate structure capable of transmitting energy, whether in the form of a fiber optic cable, power line, electrical cable, telephone line (copper line), coaxial cable, or the like. For simplicity, the present disclosure refers to a particular example of a transmission line, namely a fiber optic cable. However, the transmission line installation system 100 can be used in the same manner for installation of any other transmission line, and therefore the present disclosure should not be interpreted to be limited to installation of fiber optic cables. Instead, the transmission line installation system 100 can also be used for installing power lines, telephone lines, coaxial cables, and any other desired transmission line. In typical embodiments the transmission line installation system 100 is configured to install a transmission line within a conduit such as a duct. Additionally, a transmission line installation system can also be used for other purposes, such as for installing a pull tape or other pull line, an inner duct, or other items within a conduit.

Although the term "transmission line" is sometimes used (such as in radio-frequency engineering) to refer to a specific type of line used to carry radio frequency signals, the term "transmission line" is not intended to be so limited in the present disclosure, but rather is intended to broadly include the transmission of any type of energy or signal (electricity, radio frequency, light, etc.) along an elongate and flexible structure. Specifically, examples of transmission lines include those that can transmit electricity, such as a wire; or light, such as a fiber optic cable including optical fibers.

One particular type of transmission line is an ultra-high fiber count (UHFC) fiber optic cable. Such a cable often contains thousands of optical fibers, housed within a protective enclosure. The transmission line installation system 100 can be used to install ultra-high fiber count fiber optic cables. In other embodiments the transmission line installation system 100 can be used to install various other types of transmission lines.

The present disclosure describes a transmission line installation system 100 that includes a transmission line conveying system 104. The transmission line conveying system 104 includes one or more transmission line conveying apparatuses 118. Examples of transmission line conveying apparatuses 118 include line blowers, line pullers, line pushers, and any other devices capable of advancing a transmission line through a conduit such as a duct. For ease of explanation, the present disclosure sometimes refers to a specific example of a transmission line conveying apparatus 118, such as a line blower, by the reference number 118. This is done to illustrate the specific example being described, and also to indicate that in other embodiments another transmission line conveying apparatus (e.g., a line puller) could alternatively be used.

FIG. 1 is schematic diagram illustrating an example integrated transmission line installation system 100 being used to install a transmission line at a site S. In the illustrated example, the transmission line installation system 100 includes a transmission line source 102 and a transmission line conveying system 104. The example transmission line source 102 includes a reel stand 106 for holding a transmission line reel 108 containing a transmission line 110. The example transmission line conveying system 104 includes a line blower system 112. The line blower system 112 includes a plurality of components 113, such as including a compressor 114, a power source 116, and line blowers 118. In some embodiments the line blower system 112 also includes one or more of an air heater, an air cooler, a humidifier, an air dryer, a static charge elimination device, a moisturizer, a lubricator, or combinations of these, such as a lubricator and moisturizer combination or other combinations. In some embodiments one or more of these components can also or alternatively operate as a duct primer, or in other embodiments a separate duct primer can be provided. These components can be separate components or can be part of the compressor 114 or the line blowers 118. In some embodiment, the system 100 further includes a control unit 120. Also shown in FIG. 1 is the transmission line installation site S containing a conduit such as a ducts D, for receiving the transmission line 110.

The transmission line installation system 100 is usable by one or more installation technicians to install a transmission line 110 into the site S.

In a typical scenario, one or more conduits such as the ducts D are buried underground at a site S along a desired route prior to cable installation. The ends of the ducts terminate at hand holes H, which are enclosures with an access opening though which the ends can be accessed. In some embodiments the duct D is formed of multiple duct segments D1, D2, D3, etc. Each duct segment D1, D2, D3 includes two ends. The orientation of the duct and duct segment is sometimes referred to herein with reference to the direction through which the transmission line is advanced through the duct or duct segment, such that the duct and duct segment include a beginning and an end, wherein the beginning is where the transmission line is first inserted into the duct and the end is where the transmission line comes out of the duct after advancing through the duct. The ducts and duct segments can also be referred to as having a proximal end and a distal end, or a first end and a second end.

Although the route of the duct D is illustrated in FIG. 1 as being straight and flat between hand holes H in FIG. 1, often the route is not straight and flat, and instead the route of the duct D may have multiple bends, slopes, and other features, such as around a building or to follow under or along a road, etc. Additionally, the exact route of the ducts D is often not precisely known after the duct is installed, and therefore in some embodiments a route evaluation system can be used to evaluate and determine the geometry of the route of the duct D prior to cable installation. Route evaluation is discussed in further detail herein with reference to operation 432 and method 440 described with reference to FIGS. 22 and 23.

The duct route can then be used to develop a detailed transmission line installation plan, for installing the transmission line 10 through the duct D. The transmission line installation plan can be generated by an installation plan generator running on the control unit 120, or another computing device, which may be local or remote from the site S, and can be generated at the time of installation or in advance of the installation. In some embodiments, the installation plan generator receives the route map data, and also receives inputs such as: specifications of the duct, specifications of the transmission line, the configuration (or possible configuration(s)) of the transmission line installation system 100, and environmental characteristics.

Specifications of the duct include, for example, internal diameter of the duct, the composition of or frictional characteristics of the duct's interior coating or surface, whether the duct contains interior ribs, ridges, or other features or textures, and the like, the number of duct segments, the length of each duct segment, the quantity and location of hand holes, and the like. Specifications of the transmission line include, for example, type, outer diameter, specific weight, stiffness, minimum bend radius, break point, composition of or frictional characteristics of the transmission line's outer coating or surface, cross-sectional shape (circular, hexagonal, etc.). The inputs can be provided individually, or can be selected by identifying a brand and model number of the duct or transmission line, for example, and the installation plan generator can then retrieve the specifications from a database. The database can be stored locally or remotely, such as on a local computer-readable storage device, or a remote server or cloud storage system. Other techniques can be used to input the information, such as scanning a barcode (or other machine readable code) associated with the duct or transmission line, reading a tag, such as an RFID tag, and the like.

The configuration of the transmission line installation system 100 is defined as an input to the installation plan generator, such as to identify the types and specifications of transmission line conveying apparatuses that are available, their locations or possible locations along the duct route, and the availability and specifications of any other components. The information allows the installation plan generator to determine the capabilities of the transmission line installation system 100, such as what air pressures can be provided by the compressors 114, a range of possible speeds and acceleration of the reel stand 106. The availability and specifications of components such as air heaters, an air coolers, moisturizers, and lubricators (including types of lubricators and characteristics of the selected or available lubrications) are also provided in some embodiments. A type of and specifications of one or more transmission line carriers can also be defined, such as one or more line or cable carriers, shuttles, chutes, or projectiles that can be used with line blowing installations.

Environmental characteristics can also be defined, such as the air temperature and humidity of the air, or expected or possible ranges of same.

The installation plan generator then uses the duct route and other inputs to predict whether the transmission line 110 can be successfully installed in a single pass through the entire length of the duct, and in some embodiments a success score is generated that indicates the likelihood that the installation will be successful based on the duct route and inputs. In some embodiments the installation plan generator predicts that the installation will be successful if the success score is greater than a threshold value.

The installation plan generator generates the installation plan 105 based on the duct route, configuration of the transmission line installation system, and other inputs. The installation plan defines installation settings to be used by the transmission line installation system 100 to successfully install the transmission line. The settings can be defined for each component of the system, and the settings can be defined to change over the course of the run, such as based on timing predictions or based on the location of the transmission line within the duct route. The installation plan is then used to synchronize and coordinate the operation of each of the transmission line installation system 100 components to successfully complete the installation of the transmission line 110 through the duct in a single pass. For example, the installation plan can define installation settings such as transmission line speed, air pressure, air temperature, air humidity, lubricant type, mode (e.g., prime, continuous, etc.) and injection rate, and changes in one or more of these settings throughout the duration of the installation.

In some embodiments the installation plan generator includes software to confirm installation distance. The software is used to determine achievable installation distances but designed to allow the user to select and adjust parameters of the duct run to change outcomes. For example, the user can select whether to remove bends or change bend radiuses to influence installation pull tension requirements or CFM and push force requirements. The user can suggest a fix to one or multiple bends in a run to make the run passable. In some embodiments the software can give exact location of the bend or multiple bends that need to be changed or fixed in order to achieve a successful installation.

The transmission line conveying system 104 is then used to install the transmission line 110. For example, an end of the cable is inserted into the duct D. The transmission line conveying system 104 then operates to push or pull the cable through the duct D, including the multiple duct segments D1, D2, and D3. In some embodiments, the transmission line conveying system 104 also or alternatively utilizes air or liquid to blow the transmission line 110 through the duct D. When the geometry of the duct, and other specifications and characteristics of the duct, transmission line, and environment are known, the transmission line installation system 100 can precisely control, synchronize, and adjust the operation of each component of the transmission line installation system 100 in order to optimize the installation and to ensure that the installation is successfully completed. This greatly reduces the chance that the cable does not reach the end of the duct, and thereby eliminates all of the additional effort, time, and expense that is incurred when a cable does not reach the desired destination. Furthermore, multiple conveying apparatuses such as line blowers 118 or line pullers (not shown in FIG. 1) can be used, and can be synchronized to work together to accomplish the installation of a long transmission line into the ducts D in a single pass.

In some embodiments, aspects of the operation of the transmission line installation system 100 are performed utilizing artificial intelligence (AI) and machine learning (ML) techniques. Artificial intelligence is the theory and development of computer systems able to perform tasks that normally require human intelligence, such as visual perception, speech recognition, decision-making, and translation between languages. Machine learning is the use and development of computer systems that are able to learn and adapt without following explicit instructions, by using algorithms and statistical models to analyze and draw inferences from patterns in data. For example, in some embodiments the generation of the installation plan 105 is performed using one or more machine learning techniques. In another example, the adjustment, in real time in one example, of the installation plan 105 can also be performed using one or more machine learning models. Machine learning statistical models can be trained by providing training data, which can include for example, records of past installations that have been attempted (including successful installations and unsuccessful installations). The records can include any available data collected by the transmission line installation system 100, such as the duct route, configuration of the transmission line installation system, the environmental characteristics, and so on. Once trained on the training data, the statistical models can then be used for generating the installation plan 105 or for making adjustments, in real time in one example, to the installation plan 105 during a transmission line installation. It should be noted that the utilization of artificial intelligence and machine learning is not limited to the embodiments stated above and may be applied to other aspects of the disclosure. For instance, artificial intelligence and machine learning may be utilized in the example method 460 of installing a transmission line according to the transmission line installation plan 105, which will be described in detail below with reference with FIG. 25.

The synchronization and cooperation among the various system 100 components 113 eliminates the need to figure eight the transmission line at each hand hole H, and greatly reduces the total amount of time required to install the transmission line 110. As discussed in the Background herein, it can take 90 minutes to 2 hours of time to lay the cable in a figure eight pattern. For a 10,000 foot run, divided into 1,000 foot segments, there is a need to figure eight the cable 9 times. Therefore, by eliminating just the need to figure eight the cable, the total time and labor required to install a single run of cable can be reduced by 13.5 to 18 hours. This does not include the time required to move and re-setup the installation equipment for each additional segment of the run, which results in even further time and labor savings. Further, by eliminating the need to figure eight the cable, damage caused by bending and handling of the cable is also eliminated.

Installing a cable in multiple stages has numerous drawbacks, including the need to figure eight the cable, store the cable overnight on the ground, route traffic around it, and in some cases maintain a security guard overnight to ensure the cable's safety. These drawbacks are overcome by at least some embodiments of the system 100. It can also result in a reduced risk for the contractor employees and the cable, a more labor efficient contractor crew during installation, and a reduction in cable warranty issues.

Turning to the specific examples shown in FIG. 1, the transmission line source 102 is the source of the transmission line 110 that is to be installed at the site S. In some embodiments the transmission line source 102 includes a reel stand 106 on which a transmission line reel 108 storing the transmission line 110 is stored. An examples of the transmission line source 102 is illustrated and described in further detail with reference to FIG. 5.

As described above, the transmission line installation system 100 operates to install the transmission line 110 into a conduit, such as the duct D.

The transmission line conveying system 104 is a machine that operates to install a transmission line 110 into the duct D. Examples of transmission line conveying systems 104 include line blower systems 112 and line puller systems. The example shown in FIG. 1 shows a line blower system 112 including one or more line blowers 118, but other embodiments can utilize other transmission line conveying systems 104, such as a line puller system comprising one or more line pullers. In some embodiments a transmission line conveying system 104 includes a combination of one or more line blowers and one or more line pullers. Additionally, in some embodiments a line blower system 112 includes a line puller, and in some embodiments a line puller system includes a line blower. The transmission line conveying system 104 can also include one or more other transmission line conveying apparatuses, alone or in combination with those mentioned herein, such as a line pusher, or any other machine capable of advancing a transmission line through a duct.

In the illustrated example, the line blower system 112 includes compressors 114 and line blowers 118. The compressor 114 provides a source of pressurized air to the line blower 118, and in some embodiments also includes a compressor module 115 that operates to detect qualities of the air and conditions the air prior to delivery to the line blower 118. An example of the compressor 114 is illustrated and described in further detail with reference to FIGS. 6-7. In some embodiments the line blower 118 also includes a moving drive assembly that operates to push the transmission line 110 into the duct D and cooperates with the flow of pressurized air to advance the transmission line 110 through the duct D.

Figure 3:
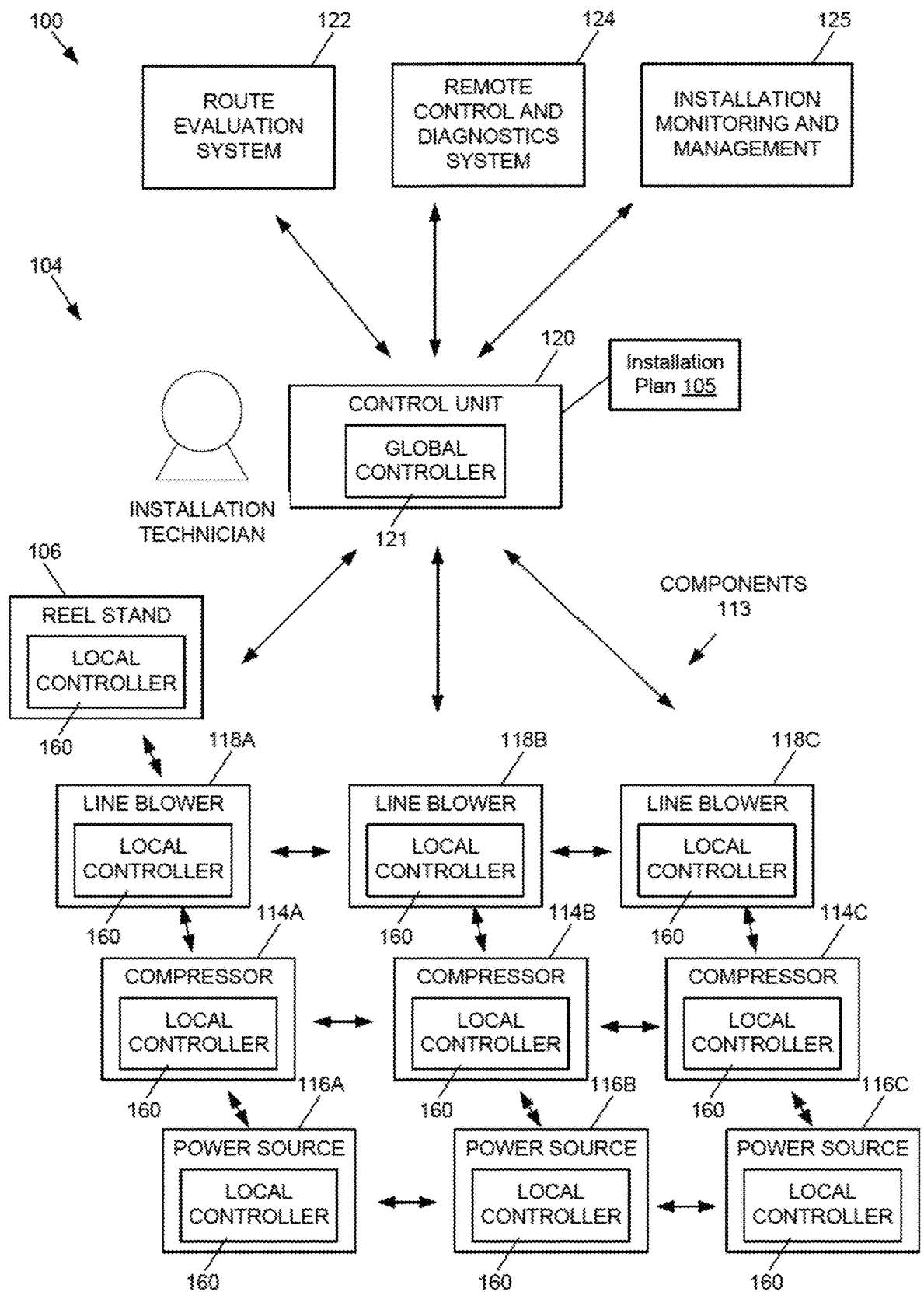
FIG. 3 is a block diagram illustrating exemplary communications within an example of the transmission line installation system shown in FIGS. 1 and 2.

In some embodiments the compressors 114 include a compressor module 115. The compressor module 115 includes air throughput ports that act like a bypass through which the pressurized air from the compressor 114 can pass through. The compressor module 115 includes sensors to analyze qualities of the air as it moves through the throughput ports and before it is delivered to the line blower 118, and to transmit the detected data to one or more other components (e.g., local controllers), the global controller, or the control unit, or remotely, such as to the installation monitoring and management system 125 (FIG. 3). In some embodiments the sensors detect one or more of air pressure, temperature, and humidity. Further, in some embodiments the compressor module 115 can operate to modify the quality of the air, such as to adjust one or more of the air pressure, temperature, humidity, moisture, and lubrication. Adjustment can occur at the compressor 114 or at another compressor. Additionally, the detected data can also be used to adjust other components, by their local controllers, the global controller, or the control unit.

In some embodiments the line blower system 112 also includes a power source to power electrical components of the compressor 114 and line blower 118. The power source can be part of the compressor 114 or line blower 118, or separate. The power source is a source of energy for the transmission line conveying system 104. In some embodiments the energy is electrical energy. Examples of electrical power sources include batteries, connections to mains power, a generator, or the like. In other embodiments the energy can be in the form of hydraulic or pneumatic energy.

The line blower 118 is a machine that operates to advance the transmission line 110 through the duct by providing a flow of pressurized air into the duct. The pressurized air helps to propel the transmission line 110 through the duct by means of distributed viscous drag and can further generate a pulling force at the distal end of the transmission line to further assist in advancing the transmission line 110 through the duct. For example, in some embodiments a carrier (shown in FIG. 15) having a diameter greater than that of the transmission line 110 is attached to the forward/distal end of the transmission line 110. The carrier acts to block or resist air flow through the duct, creating a pressure differential on either side of the carrier. This pressure differential presses on the carrier propelling it and the foreword end of the transmission line 110 along the duct.

Preferably, the motive force generated by the blower head 252 includes a pushing force generated by frictional engagement of the transmission line 110 with a moving drive assembly 360. The blower head 252 includes a transmission line drive assembly 360, which frictionally engages the transmission line 110 so as to provide a motive pushing force. In some embodiments, the transmission line drive assembly 360 is hydraulically driven by a hydraulic pressure source 354 linked by hydraulic lines to the drive assembly 360.

An example of the line blower 118 is illustrated and described in further detail with reference to FIGS. 8-11.

In an alternative embodiment, the transmission line conveying system 104 includes a line puller system 119 (not shown in FIG. 1. A line puller system is a machine configured to pull a transmission line through the duct. In its most basic configuration, the line puller system utilizes an elongate member such as a wire, rod, tape, cord, or the like (collectively included within the term "line") which extends through the duct. The transmission line source 102 is positioned at one end of the duct, and the system is arranged at the opposite end of the duct. The transmission line 110 at the transmission line source 102 is then fastened to an end of the elongate member. The line puller then pulls on the elongate member which in turn pulls on the end of the transmission line 110 to advance the elongate member through the duct. Other components such as blowers can also be used with the puller to generate a distributed viscous drag between the air and the transmission line that further assists in advancing the transmission line through the duct, similar to the operation of the line blower systems described herein.

In some embodiments a catcher is positioned at the far end of the duct to catch any objects that pass through the duct and come out the distal end. The catcher includes openings through which air can easily pass, and a mesh or other type of material that stops the object from exiting the catcher. One example of a catcher is a radio basket catcher. Another example is an OPT catcher device. A catcher is another example of a component 113, which can be in wired or wireless communication with the control unit 120 or other components 113. In one example embodiment the catcher includes a detector that catches and detects when a leading end of a transmission line has reached the end of the duct. In some embodiments the catcher includes a communication device that automatically sends a message indicating that the transmission line has reached the end of the duct. Upon receipt of the message by the control unit 120 or other components 113, the transmission line installation system 100 determines that the transmission line installation has been completed and terminates the installation automatically, such as by turning off or deactivating the transmission line conveying system 104 (e.g., blower and/or line puller), reel stand, and any other components involved in the installation upon receipt of the message The control unit 120 is a computing device that provides an interface between the installation technician and the transmission line installation system 100. In some embodiments the control unit 120 receives control inputs from the installation technician, such as to start and stop an installation. In some embodiments the control unit 120 provides status information to the installation technician, such as to convey the current status of the installation and to show the progress that has already been made. The control unit 120 is in data communication with one or more other components of the transmission line installation system 100, such as the transmission line conveying system 104. An example of the control unit 120 is illustrated and described in further detail with reference to FIGS. 20-21.

Figure 2:
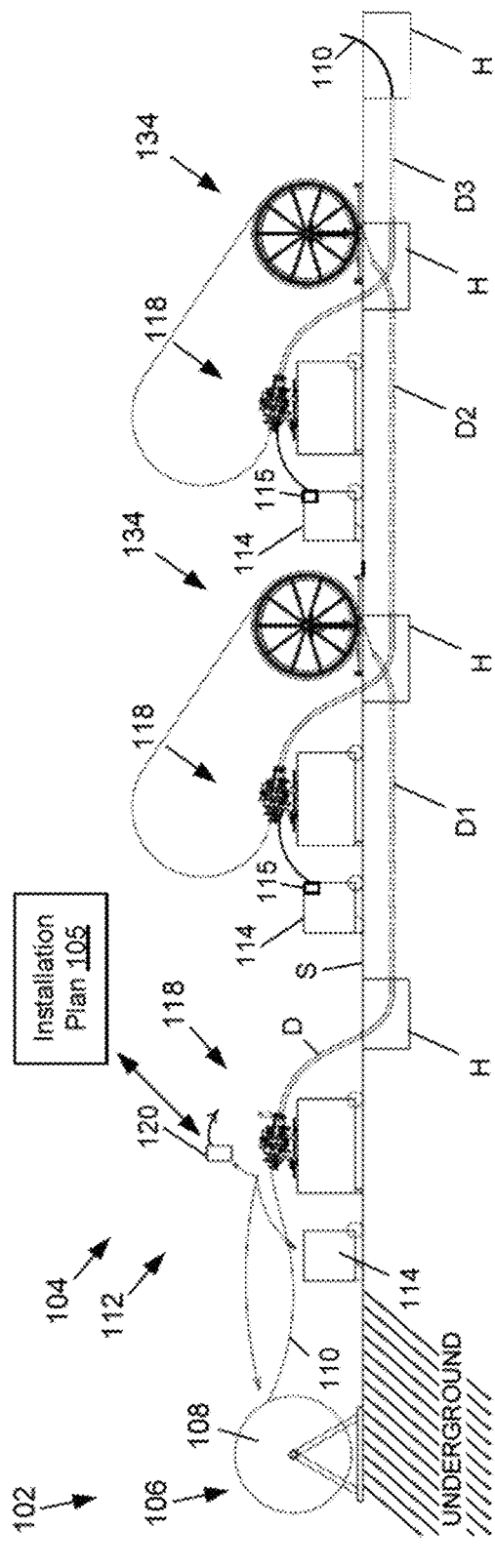
FIG. 2 is a schematic diagram illustrating another example of the transmission line installation system shown in FIG. 1.

FIG. 2 is schematic diagram illustrating another example of the transmission line installation system 100 being used to install a transmission line at a site S. This example is similar to the example shown in FIG. 1, and therefore only the differences are discussed in detail here.

One of the differences of the example shown in FIG. 2 is that the line blowers 118 are illustrates as being positioned above ground and outside of the hand holes H. This configuration may be preferred in some situations, and may result in quicker and easier setup because the line blowers 118 do not have to be lowered into and positioned in the hand holes, and can instead be kept on carts or other stands or platforms as desired.

Another difference shown in FIG. 2 is that the example transmission line installation system 100 further includes or more slack loop devices 134. When installing transmission lines 110, it is often desired that some amount of excess transmission line 110 be maintained. There are several reasons for this. One reason is that the excess allows for expansion and contraction of the transmission line 110 due to temperature fluctuations. Another reason is that it provides a little bit of excess in case the transmission line 110 or individual fibers or conductors need to be cut in the future.

The slack loop device 134 can be motorized or non-motorized, but in at least some embodiments it is a non-motorized wheel, such as a capstan, mounted on a stand or other platform that can freely rotate as transmission line 110 moves along it. An example of the slack loop device 134 is a mid-assist capstan. The wheel can have a horizontal or vertical axis of rotation. In some embodiments the slack loop device 134 is non-motorized and manually operated. In other embodiments, the slack loop device 134 can itself include a local controller, as another component 113 of the system 100, which can be synchronized with or controlled by other components, or by the control unit 120 or a global controller. In some embodiments the slack loop device 134 includes one or more sensors, such as a line counter. As shown, the transmission line 110 can be at least partially wrapped around the slack loop device 134 to form a slack loop. After installation is completed, the slack loop can then be stored in the hand hole, or at the start or end of the run, or at any one or more of these locations. Although the slack line loop is schematically illustrated as freely extending up into the air after passing the slack loop device 134 and into the line blower 118, in typical applications the transmission line route is more direct between the slack loop device 134 and the line blower 118, and may be supported or guided by one or more additional components, such as conduits, wheels, or the like.

FIG. 3 is a block diagram illustrating exemplary communications within an example of the transmission line installation system 100. Similar to the example shown in FIGS. 1 and 2, the example transmission line installation system 100 includes the transmission line conveying system 104, such as including line blowers 118 (118A, B, and C). Some embodiments further include one or more of a route evaluation system 122, a remote control and diagnostics system 124, and an installation monitoring and management system 125. The example transmission line conveying system 104 includes the control unit 120 and a plurality of components 113, such as line blowers 118 (including line blower 118A, 118B, and 118C), compressors 114 (including compressor 114A, 114B, and 114C), and power sources 116 (including power source 116A, 116B, 116C), or other possible components (including a line puller 119, compressor module, figure-eight machine, horizontal-directional drilling machine, lubricator, transmission line cleaner, air heater, air cooler, moisturizer, humidifier, dryer, static charge elimination device, etc.). In some embodiments the control unit 120 includes and operates as a global controller 121 and the components include local controllers 160.

A fluid injection machine is another example of a component 113. An example of a fluid injection machine is lubricating machine, which is operable to add (apply or inject) lubricant onto the transmission line 110 or into the duct D. The lubricating machine can be arranged at the start of the run to apply lubricant to the transmission line 110 before it enters the duct, or to inject lubricant into the starting end of the duct. The lubricating machine includes a pump or other lubrication applicator, and includes a local controller operable to interact with the control unit 120 and/or other components 113, and to control the operation of the lubricating machine, such as to adjust the amount of lubricant being added to the transmission line 110 or duct D, or to turn on or off the addition of lubricant. In some embodiments the lubricating machine has various types of lubricant and can select between those types depending on the conditions, and even adjust the lubricant on the fly as installation proceeds. In another possible embodiment, the fluid injection machine can be integrated into a line blower 118, as illustrated and described in further detail with reference to FIG. 11. In some embodiments, the fluid injection machine can be integrated with and combined with a moisturizer unit and/or an injection fluid tank.

A transmission line cleaner is another example of a component 113, which is operable to clean a transmission line before it enters the transmission line conveying system 104. The transmission line cleaner typically includes one or more cleaning mechanisms (motorized or non-motorized), such as including The transmission line cleaner can also include sensors to detect foreign objects such as sand, mud, water, and the like, and determine whether and an extent of cleaning that is required, and then activates the cleaning mechanism to perform the appropriate cleaning. Cleaning mechanisms can include brushes, wipers, and water or other liquid baths. As with other components 113, the transmission line cleaner includes a local controller to permit communication with other components 113, the control unit 120, and operates to control the operations of the cleaning mechanism itself. In some embodiments the cable cleaner is positioned before an optical detector (discussed herein) that reads markings on the exterior of the transmission line. The cleaning removes any obstructions on the markings that might otherwise interfere with the reading by the optical detector.

Some embodiments include a tether mechanism. A tether mechanism operates similarly to a line puller, but instead of pulling the transmission line toward it, it operates instead to provide a back pressure to provide more precise speed control to the transmission line, such as when using a blower to advance the transmission line through the duct. The tether mechanism typically includes an elongate member (e.g., a tape or cable) that is connected to the transmission line (directly or with a coupler). In some embodiments the elongate member is connected to the line carrier. The line puller 119 is an example of a tether mechanism when it is operated in reverse. In another embodiment, the tether mechanism can include a brake or other controllable slip interface that is operable to apply a braking force to control a speed at which the transmission line is advanced through the duct D.

The control unit 120 operates as the primary user interface with the installation technician. The control unit 120 prompts the user, such as the installation technician or other user, to provide inputs to control the overall operation of the transmission line conveying system 104, such as start or stop inputs, and to define an installation plan including settings for the system. In some embodiments the control unit includes both a local communication device as well as a network communication device such as a cellular modem or Wi-Fi communication device. The local communication device can be either a wired or wireless communication system, such as a wired serial communication device (such as a universal serial bus ("USB") device), or a wireless device (such as utilizing Wi-Fi or BLUETOOTH communication), which allows the control unit to communicate with the components 113 and their local controllers 160. The network communication device enables the control unit 120 of the transmission line conveying system 104 to communicate across the Internet or other network, such as with one or more of the route evaluation system 122, the remote control and diagnostics system 124, and the installation monitoring and management system 125.

In some embodiments, the control unit 120 receives or generates an installation plan 105. The transmission line installation system 100 then operates to install the transmission line 110 (shown in FIGS. 1-2) according to the installation plan 105. In some embodiments the control unit 120 synchronizes the operation of the components 113 according to the installation plan 105, and in other embodiments at last part of the installation plan is distributed to the various components 113 so that they can operate according to the installation plan 105. During the course of the installation, data is collected and distributed by the components 113 (such as sensor data, and data defining the status and progress of the installation), providing feedback. Communications between the components and the control unit 120 is used to maintain synchronization between the components. If adjustments are needed, the adjustments are communicated and the components make those adjustments. For example, if the transmission line speed is to be adjusted, any components involved in maintaining the speed are informed of the adjustment, and similarly, if the transmission line speed changes (whether intended by the system 100 or not) the change in speed is communicated to the components so that appropriate adjustments can be made.

The local controllers 160 can communicate with the control unit 120 and/or other local controllers 160. The local controllers 160 are coupled to other sensors or controllable devices within the components 113, and therefore are capable of receiving or generating data associated with the components 113, and are also able to control any controllable devices such as motors, pumps, and the like.

The communications can be used to transmit control commands or data. Control commands are issued by one controller to another controller and instruct the other controller to adjust an operation, such as to speed up or slow down, start or stop, increase or decrease a pressure, or other controllable operation.

Data communication is used to transmit information within the system. An example of a data transmission may include a temperature, speed, pressure, humidity, tension or force, or other information. Data may be generated by a sensor or may simply identify a current status or operational parameter of one of the components (e.g., indicating that the device is turned on, or indicating that the device is currently set to operate at a particular speed, etc.). Data received from one controller by another controller can be used by that other controller to react accordingly, such as to adjust its own operation, or may be used by the control unit to send one or more commands to the components 113.

In some embodiments the control unit 120 and plurality of components 113 are configured to communicate with each other according to a predefined communication protocol to automatically identify each other and to make use of resources provided by the connected components. For example, when a first component 113 is added to the transmission line installation system, the first component 113 and the global controller 121 communicate with each other to identify each other and determine the resources (including features and functionality) that are now available to the transmission line installation system 100 as a result. When additional components 113 are added the components are similarly identified. The transmission line installation system 100 can therefore operate in such a way that it utilizes the resources available to it, and similarly can identify any problems or deficiencies in the current system configuration and make recommendations to the operator to change the configuration if needed. When an installation plan is developed, as discussed herein, the plan can be customized based on the specific configuration of the system at that time. Similarly, other parts such as the duct itself, the transmission line or transmission line reel, and the like can also be identified by the transmission line installation system, such as by reading an RFID tag or communicating with a local controller associated with those parts, to identify characteristics of the parts.

In some embodiments the control unit 120 and the components 113 are fully operable individually regardless of whether or not they are connected with the control unit 120 or other components 113. When connected they cooperate with each other to utilize the resources of the others, and when disconnected they operate with whatever resources are available.

In various implementations the transmission line installation system 100 can operate in various different control and communication modes. Several examples include: (1) a master/slave control model in which the control unit 120 operates as a global controller 121, where the control unit 120 is the master device and the local controllers 160 operate as slave devices; (2) a global controller 121 and local controller 160 model utilizing peer-to-peer communication in which the global controller 121 performs an advisory role and the local controllers 160 are capable of operating independently under the advice of the global controller 121; and (3) a peer-to-peer model where the local controllers 160 cooperate but independently control their own components 113, and where the control unit 120 does not attempt to control the individual operations of the components 113, but rather performs the role of a primary interface with the installation technician, to provide the local controllers with instructions received from the installation technician. Other communication and control modes are also possible. As one further example, the global controller 121 can be part of one of the components 113, such as the first line blower 118A. In yet another example, the role of a controller 160 as the global controller 121 can be passed from one component 113 to other components during the course of an installation. For example, in some embodiments a line blower 118A local controller 160 is the global controller while the leading edge of the transmission line 110 is within the duct segment D1 that it controls, and then the global controller status switches to the local controller 160 of the line blower 118B once the transmission line moves into the next duct segment D2. This can be beneficial because the line blower 118 associated with the current duct segment may have the most current information about the status of the leading edge of the transmission line, and the other components can provide support to that blower 118 in accordance with its instructions.

In some embodiments the global controller 121 includes one or more of a processing device, a memory device, a communication device, a power supply, a display device, and an input device. The communication device can be a wired communication device or a wireless communication device. Data communication can occur through any one of a variety of standard wired or wireless data communication protocols. Examples of wired communication devices include modems, USB devices, serial and other I/O communication devices. Examples of wireless communication devices include cellular communication devices, Wi-Fi (IEEE 802.11x) communication devices, BLUETOOTH communication devices, and long range (LoRa) communication devices. The display device generates a user interface for the installation technician, such as a graphical user interface. The input device receives inputs from the installation technician. A touchscreen display can be utilized which includes both the display device and the input device.

The installation monitoring and management system 125 permits a supervisor or other people at a remote location to monitor and manage the transmission line installation system 100, and in some embodiments multiple other transmission line installation systems 100 at other sites. In some embodiments the installation monitoring and management system 125 monitors a status of the transmission line installation system 100, such as the configuration of the system during setup, and the operation of the system during a transmission line installation. In some embodiments the installation monitoring and management system 125 performs fleet management functions, to assign technicians to installation teams, dispatch the teams to project sites, and monitor the progress of the installations. System 125 can also manage schedules, such as to display schedules for the coming days or weeks, and provide historical analysis, reporting, and heuristic data.

Figure 4:
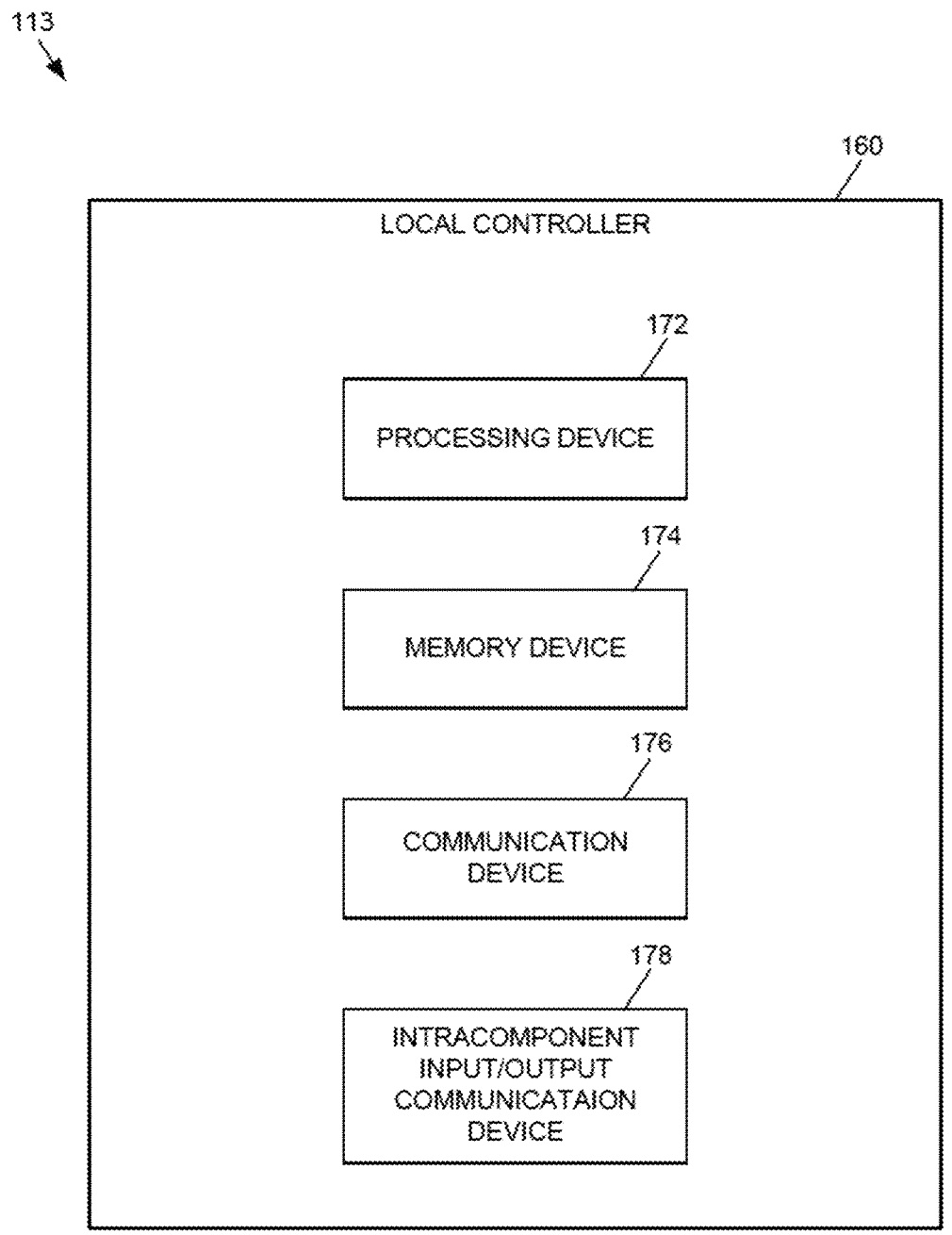
FIG. 4 is a schematic block diagram illustrating an example of the local controller of a component of the transmission line installation system shown in FIGS. 1 and 2.

FIG. 4 is a schematic block diagram illustrating an example of the local controller 160 shown in FIG. 3. In this example, the local controller 160 includes a processing device 172, a memory device 174, a communication device 176, and an intracomponent input/output communication device 178.

The same or similar local controller 160 can be used with any of the components 113 of the transmission line installation system 100. Examples of the components 113 that can include the local controller 160 include the compressors 114, power sources 116, line blowers 118 (or other transmission line conveying apparatus), (all shown in FIG. 3), an air heater, an air cooler, an air humidifier, an air dryer, a static charge elimination device, a moisturizer, and a lubricator. Other components of the transmission line installation system 100 may also include a local controller if data communication, synchronization, or control of the component is desired. In some embodiments the control unit 120 can include a local controller, for example, in some embodiments the control unit 120 is integrated with another component, such as the line blower 118A.

The local controller 160 controls the overall operation of the component 113, and communicates through the communication device 176 with one or more other components 113 of the transmission line installation system 100. For example, in some embodiments the local controller 160 receives commands in the form of messages or instructions from the control unit 120 through the communication device 176. Examples of such commands include start, stop, and speed adjustments (a particular speed setting, an instruction to increase the speed, or an instruction to decrease the speed, etc.). Further, in some embodiments the local controller 160 also sends messages or instructions to other components through the communication device 176. For example, measured data or current or historical settings can be transmitted by the local controller 160 to other components.

The processing device 172 operates to process data instructions to perform functions of the component 113. The memory device 174 stores data instructions, which when executed by the processing device 172, cause the processing device to perform those functions. The memory device 174 does not include transitory media carrying data signals. An example of the memory device 174 is a non-transitory computer readable storage device as described in further detail herein.

The communication device 176 is a device that communicates with other devices via wired or wireless data communication. In some embodiments the communication device 176 communicates with one or more of the control unit 120 and other components of the system 100.

The communication device 176 can utilize wireless or wired communication devices. Examples of wireless communication devices include cellular communication devices, Wi-Fi (IEEE 802.11x) communication devices, and BLUETOOTH communication devices. Wired communication devices include modems, USB devices, serial and other I/O communication devices and techniques.

The intracomponent input/output communication device 178 operates to communicate with and control subsystems, sensors, or other electronic or controllable devices within the component 113, utilizing wired or wireless communication or control signals. For example, the intracomponent input/output communication device 178 is coupled to and controls mechanical, pneumatic, or electronic components such as motors, brakes, sensors (e.g., temperature, moisture, transmission line tension, speed, line counter, etc.).

Examples of processing devices, memory devices (including computer-readable storage devices), and communication devices are described herein with reference to an example computing device, and also with reference to the local controllers, and such descriptions similarly apply to the processing device 172, memory device 174, and communication device 176 of the example local controller 160 shown in FIG. 4.

Figure 5:
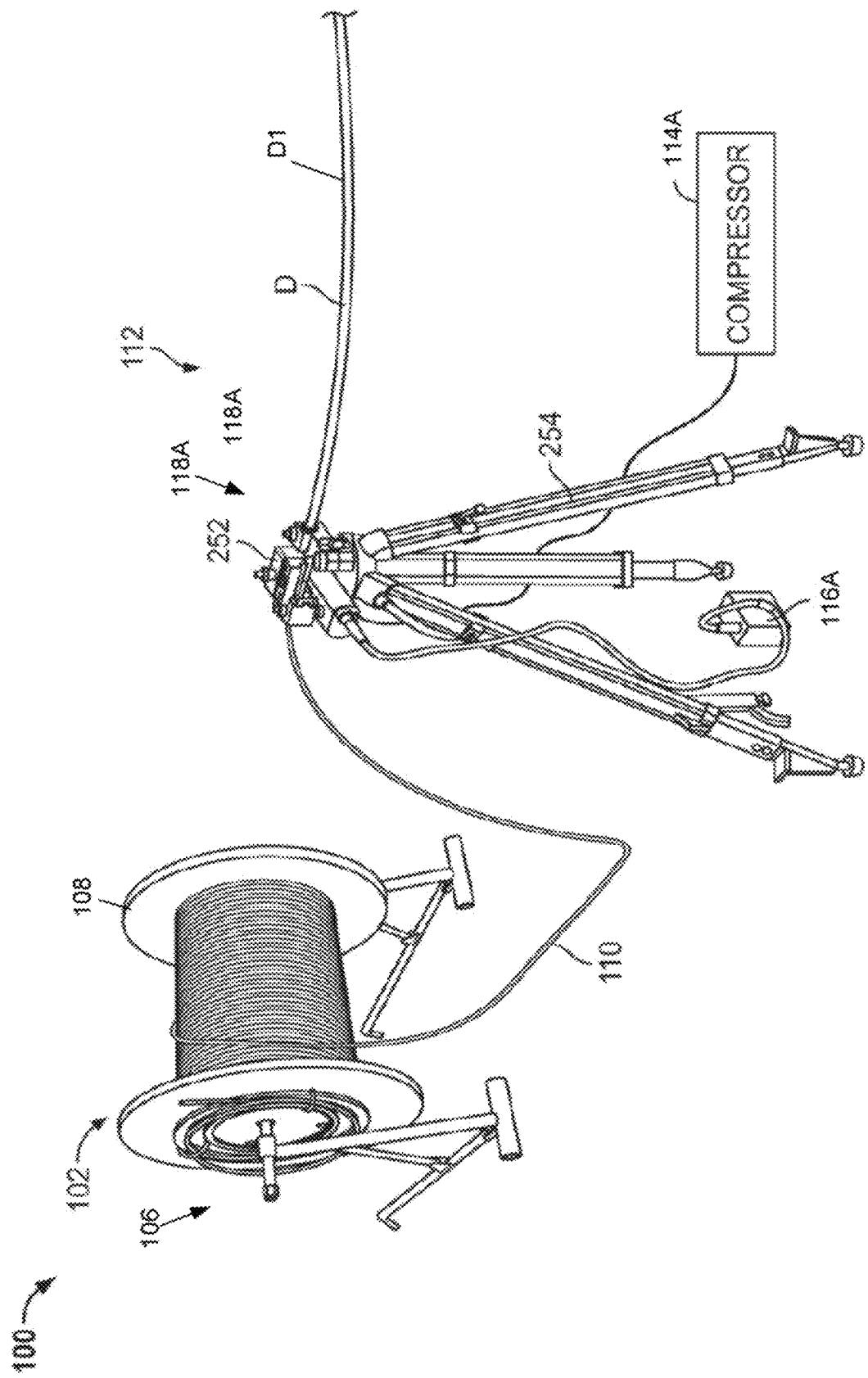
FIG. 5 is a perspective view illustrating portions of the transmission line installation system shown in FIGS. 1 and 2.

FIG. 5 is a perspective view illustrating portions of the transmission line installation system 100, and in particular an example of the transmission line source 102, transmission line 110, and a portion of the transmission line conveying system 104. The example transmission line source 102 includes the reel stand 106 with a transmission line reel 108. The example transmission line conveying system 104 includes the line blower system 112 including the line blower 118A, compressor 114A, and power source 116A. The example line blower 118A also includes a blower head 252 and a stand 254.

As discussed above, the reel stand 106 supplies the transmission line 110 to the line blower system 112, which operates to advance the transmission line 110 through the duct D to install the transmission line 110 in the duct. In this example, the line blower 118A is connected to the beginning end of the duct, and more specifically to the beginning of the first segment D1 of the duct D. The line blower 118A operates to receive the transmission line 110 from the transmission line source 102 (reel stand 106 and reel 108) and to advance the transmission line through the first segment of the duct, and subsequently into adjacent segments of the duct, in cooperation with additional components 113, such as additional transmission line conveying apparatuses (e.g., line blowers 118B, 118C, etc.). The line blower 118A also operates to monitor advancement of the transmission line 110 through the first segment of the duct, such as by monitoring the speed at which the transmission line 110 is being fed into the duct D, and the distance that the leading edge of the transmission line has travelled, such as using a line counter.

In some embodiments the line blower 118A includes a blower head 252. The blower head 252 includes a duct clamp, which secures the beginning end of the duct segment D1 to the output of the blower head 252, where the transmission line and pressurized air (and in some embodiments, moisture and/or lubricant) are input into the duct. The blower head 252 can be arranged in several different installation configurations, and in this example is shown supported on the ground by a stand 254. In another possible configuration, the blower head 252 can be mounted onto a mobile cart, such as having a frame structure and wheels. In yet another configuration, the blower head 252 can be mounted onto a support configured to be placed into hand hole. The blower head 252 receives electrical power from the power source 116A and pressurized air from the compressor 114A. The pressurized air is received by the blower head 252 and a valve of the blower head 252 controls the injection of the air into the duct D.

Parts of the example line blower system 112 are illustrated and described in further detail with reference to FIGS. 8-19. More specifically, an example compressor 114 is shown in FIGS. 6-7 and an example line blower 118 is shown in FIGS. 8-12.

Figure 6:
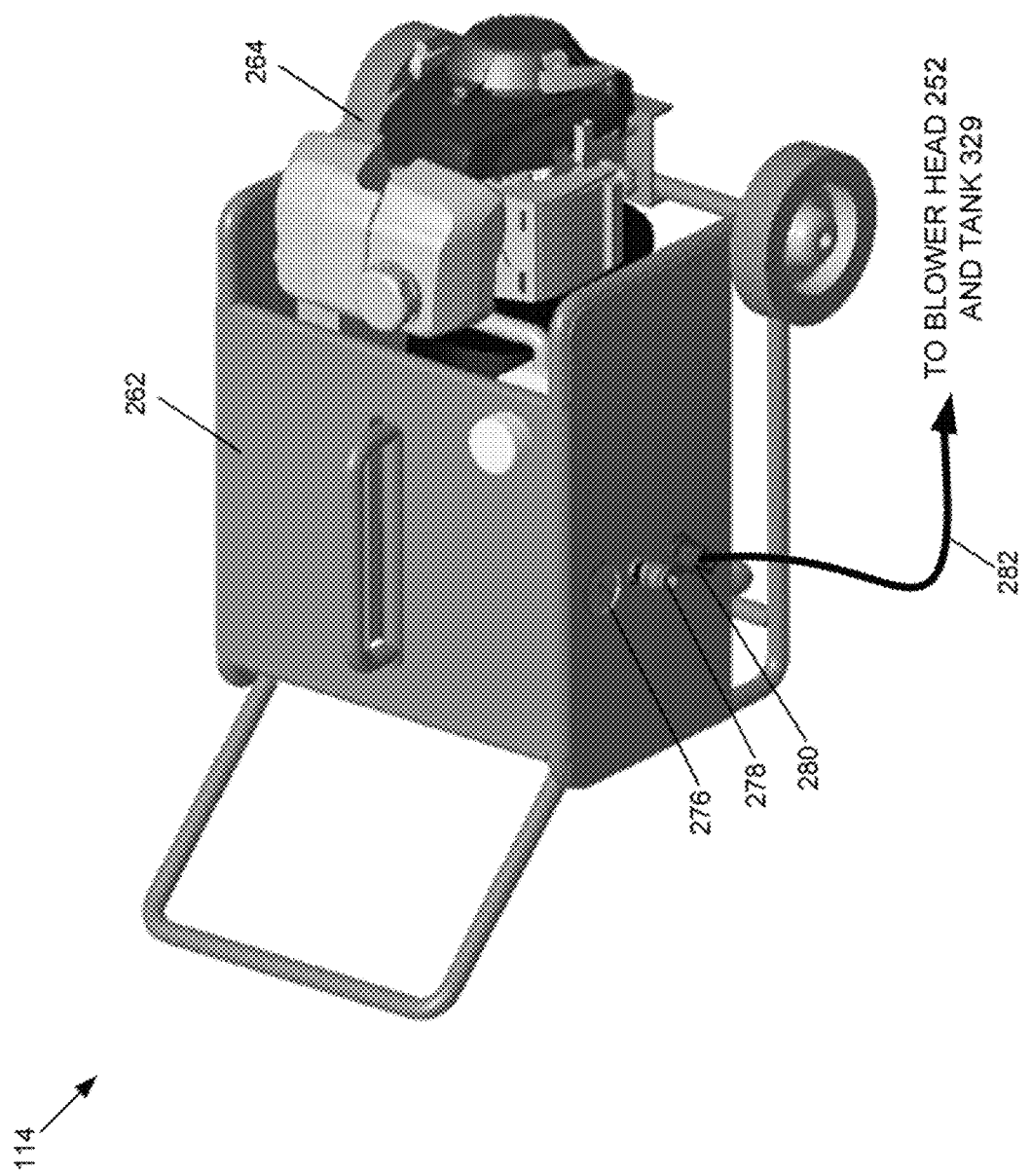
FIG. 6 is a perspective view of an example compressor of the transmission line installation system shown in FIGS. 1 and 2.
Figure 7:
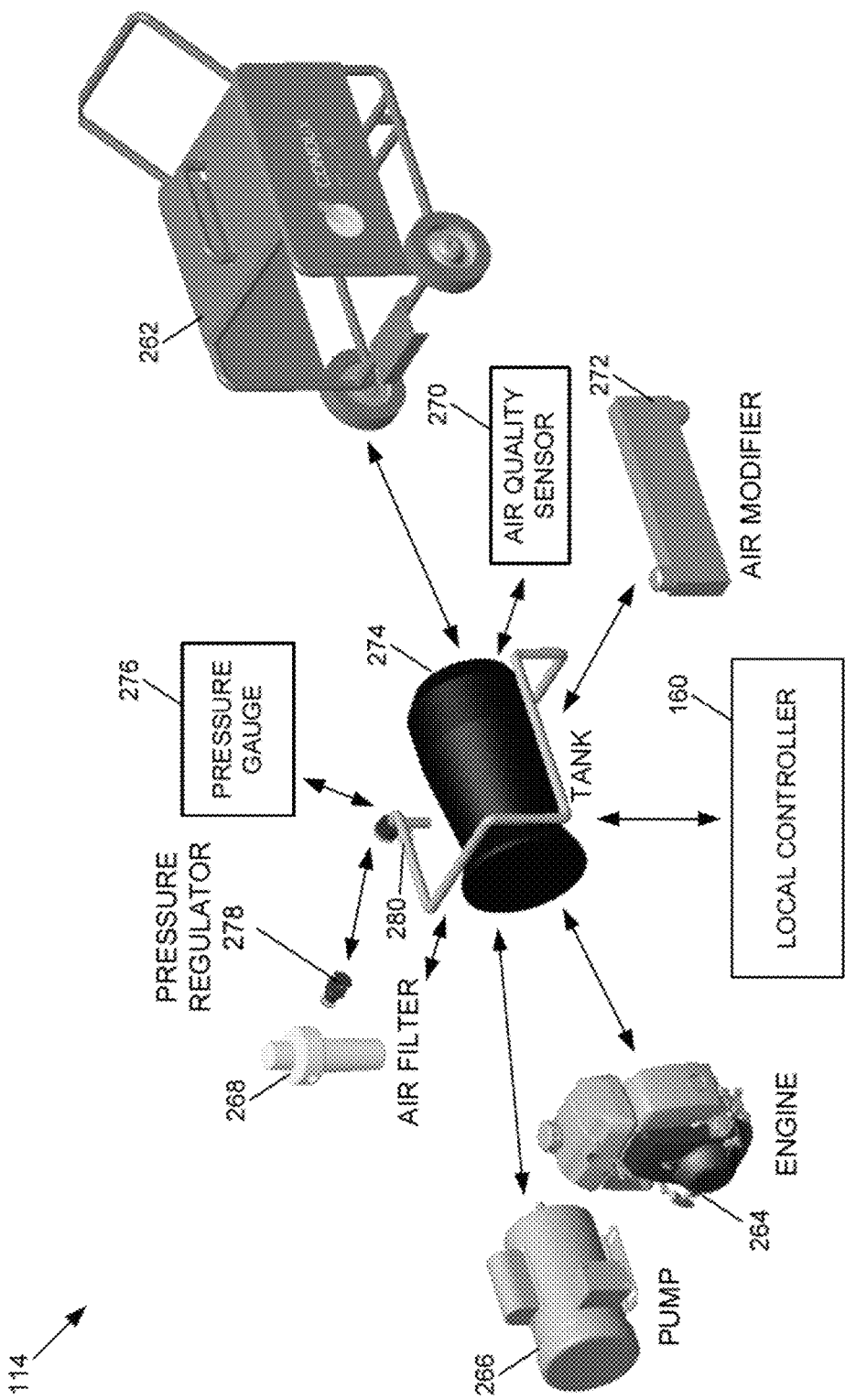
FIG. 7 is an exploded perspective view and block diagram of the example compressor shown in FIG. 6.

FIGS. 6-7 illustrate an example of the compressor 114. FIG. 6 is a perspective view and FIG. 7 is an exploded perspective view and block diagram of the example compressor 114. In this example, the compressor 114 includes a mobile cart 262, an engine 264, a pump 266, an air filter 268, an air quality sensor 270, an air modifier 272, a tank 274, a pressure gauge 276, a pressure regulator 278, an air output 280, an air hose 282, and a local controller 160.

The compressor 114 is a machine that provides a source of pressurized air to the blower head 252 (shown in FIG. 5). The pressurized air is then supplied by the line blower 118 into the duct to help propel the transmission line 110 through the duct during the installation process. A variety of possible air compressors can be used, and FIGS. 6-7 illustrate one possible example.

The mobile cart 262 is a wheeled platform that supports the rest of the compressor 114 components, to allow for more easily moving and transporting the compressor 114 to, from, and around a site S. In this example the mobile cart 262 has a handle, frame, and wheels.

The engine 264 is provided to generate power when another power source is not readily available. In some embodiments the engine 264 is a gasoline engine, which is connected to an electrical generator that generates electrical energy to operate the pump 266. In other embodiments the engine 264 is mechanically coupled to the pump (such as through a transmission) to operate the pump directly. The gasoline engine 264 is powered by a fuel such as gasoline and generates power by capturing energy generated by combustion.

The pump 266 is a machine that pushes air. The pump 266 receives input air and pushes it into the tank 274, such as using one or more of a piston, rotary vane, or rotary screw type pump.

One of the byproducts of compressing air is that heat is generated. Excessive heat can negatively impact the installation of a transmission line 110 by causing condensation, and/or increasing friction through the softening of the transmission line jacket, or even causing the jacket to melt. Accordingly, some embodiments include an air modifier 272 (discussed in further detail below), such as an air cooler, that can be used to cool the input air either before or after passing through the pump 266. Some embodiments include an after cooler. In some embodiments the air modifier includes an air conditioner that utilizes a refrigerant to cool the air. In some embodiments the air modifier includes a humidifier or moisturizer to inject water (in any suitable form, such as liquid, vapor, or steam). Additionally, in some embodiments the ambient air may be too cold. For example, so cold that it would cause the water injected into the humidified air to freeze. As a result, in some embodiments the air modifier 272 is or includes an air heater that heats the compressed air. It is also possible in some embodiments that one or more air modifiers 272 (e.g., a heater, a cooler, a moisturizer, and/or a humidifier) are components 113 that are separate from the compressor, and that themselves can include their own local controller 160 as described herein. For example, the air modifier 272 can be positioned along an air line (e.g., 282) between the compressor 114 and the blower head 252. Some embodiments of the compressor 114 do not include an air modifier 272.

The air filter 268 receives input air from the environment and passes that air through a filter media that removes contaminants such as dust from the input air before providing the air to the pump 266.

An air quality sensor 270 is provided in some embodiments to detect one or more qualities of the input air. In one example embodiment, the air quality sensor 270 is a temperature sensor. In another example embodiment, the air quality sensor 270 is a humidity sensor. Some embodiments include multiple air quality sensors, such as a temperature and humidity sensor. In some embodiments the air quality sensor 270 is coupled to the air modifier 272, and/or the local controller 160. The air quality sensor 270 can be used to detect one or more qualities of the input air before or after the air modifier 272 and before or after the pump 266, or can include multiple sensors to detect one or more qualities of the input air before and after the air modifier 272 and/or the pump 266. In some embodiments the air modifier 272 includes the air quality sensor 270.

Some embodiments include an air modifier 272, which operates to modify the input air. In some embodiments the air modifier 272 is an air cooler, such as an air conditioner. The air cooler reduces the temperature of the input air, such as using a refrigerant using a refrigeration cycle. In some embodiments the air cooler reduces the air from the original temperature to a desired temperature that is less than the original temperature.

In some embodiments the air modifier 272 is an air dryer that operates to remove water from the input air. In some embodiments this function is a byproduct of passing the input air through the air cooler, and in other embodiments an additional or alternative air dehumidifier is used. In some embodiments the air modifier 272 reduces the humidity of the input air from an original humidity to a desired humidity that is less than the original humidity.

In some embodiments, the air modifier 272 is an air humidifier or moisturizer that operates to add water (as liquid, vapor, or steam) to the input air. In some embodiments the air modifier 272 injects a spray of water vapor into the input air to increase the humidity of the input air from an original humidity to a desired humidity that is greater than the original humidity.

Another example of an air modifier 272 is a static charge elimination device.

The tank 274 is a storage receptacle configured to store compressed air prior to delivery to the blower head 252.

The pressure gauge 276 is provided to measure the pressure of the air. In some embodiments the pressure gauge 276 measures the air pressure within the tank 274. In other embodiments the pressure gauge 276 measures the air pressure along the air output line.

The pressure regulator 278 operates to control the air pressure supplied to the air output 280. The pressure regulator 278 can supply an air pressure to the air output that is less than the air pressure in the tank 274. In some embodiments the pressure regulator 278 is controllable by the local controller 160, control unit 120, and/or global controller 121) to select and adjust the desired air pressure delivered to the output 280.

The air output 280 is a coupling where the air hose 282 can be connected, and where the pressurized air is output from the compressor 114. In some embodiments the air output 280 includes a quick connect coupling, for example.

The air hose 282 is an air supply line that can deliver air from the air compressor to the blower head 252. The air hose 282 typically includes couplings on either end configured for connection to the air output 280 and a pressurized air input port on the blower head 252 and injection fluid tanks 329A and 329B (shown in FIG. 11).

The local controller 160 of the compressor 114 operates to control operations of the compressor 114 and to communicate with other local controllers 160, and the control unit 120. An example of local controller 160 is shown in FIG. 4.

In some embodiments the transmission line installation system 100 can also include a compressor module separate from the compressor 114. In some embodiments the compressor module is a separate component 113 that includes its own local controller.

Figure 8:
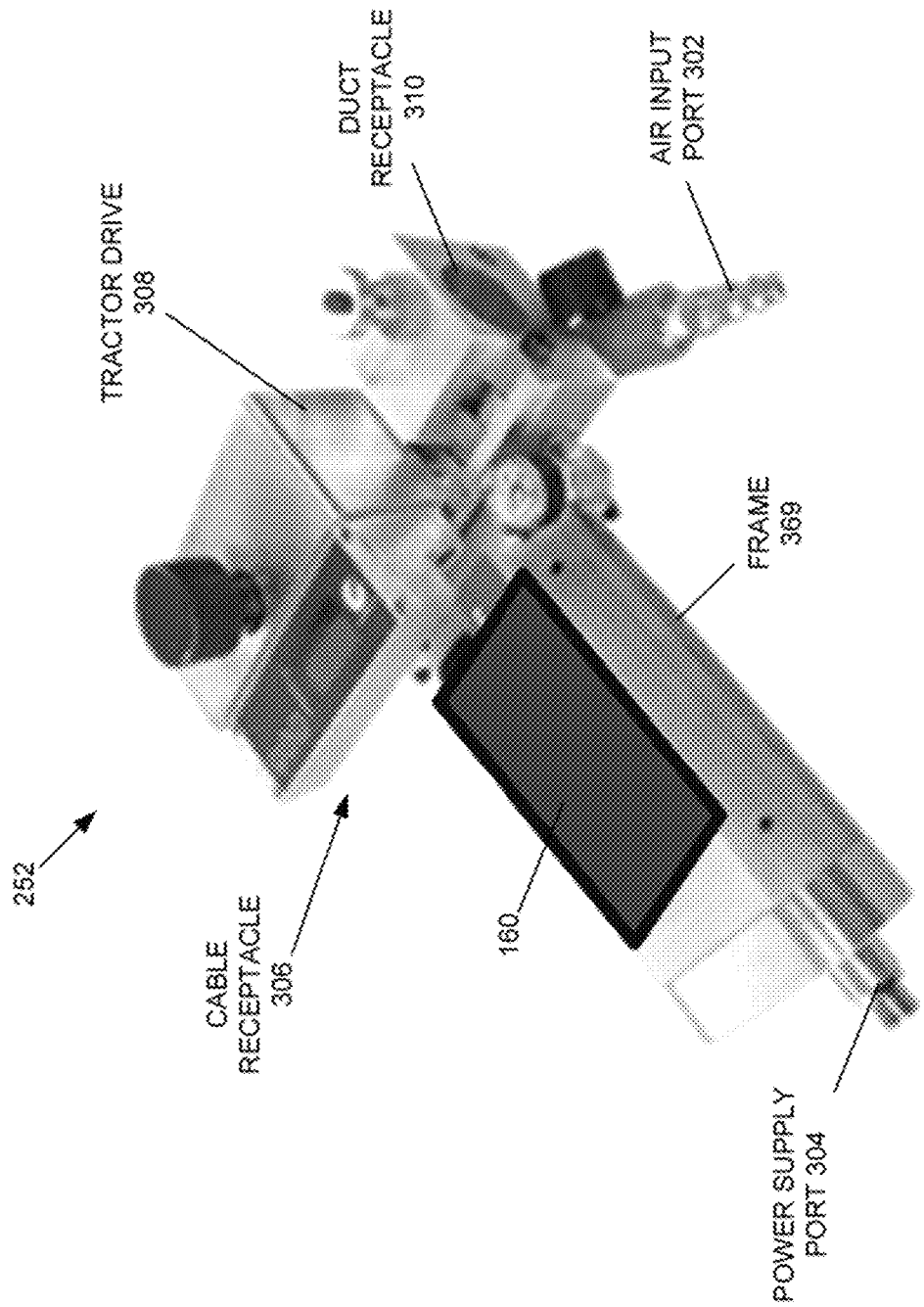
FIG. 8 is a perspective view of an example blower head of the transmission line installation system shown in FIGS. 1 and 2.
Figure 9:
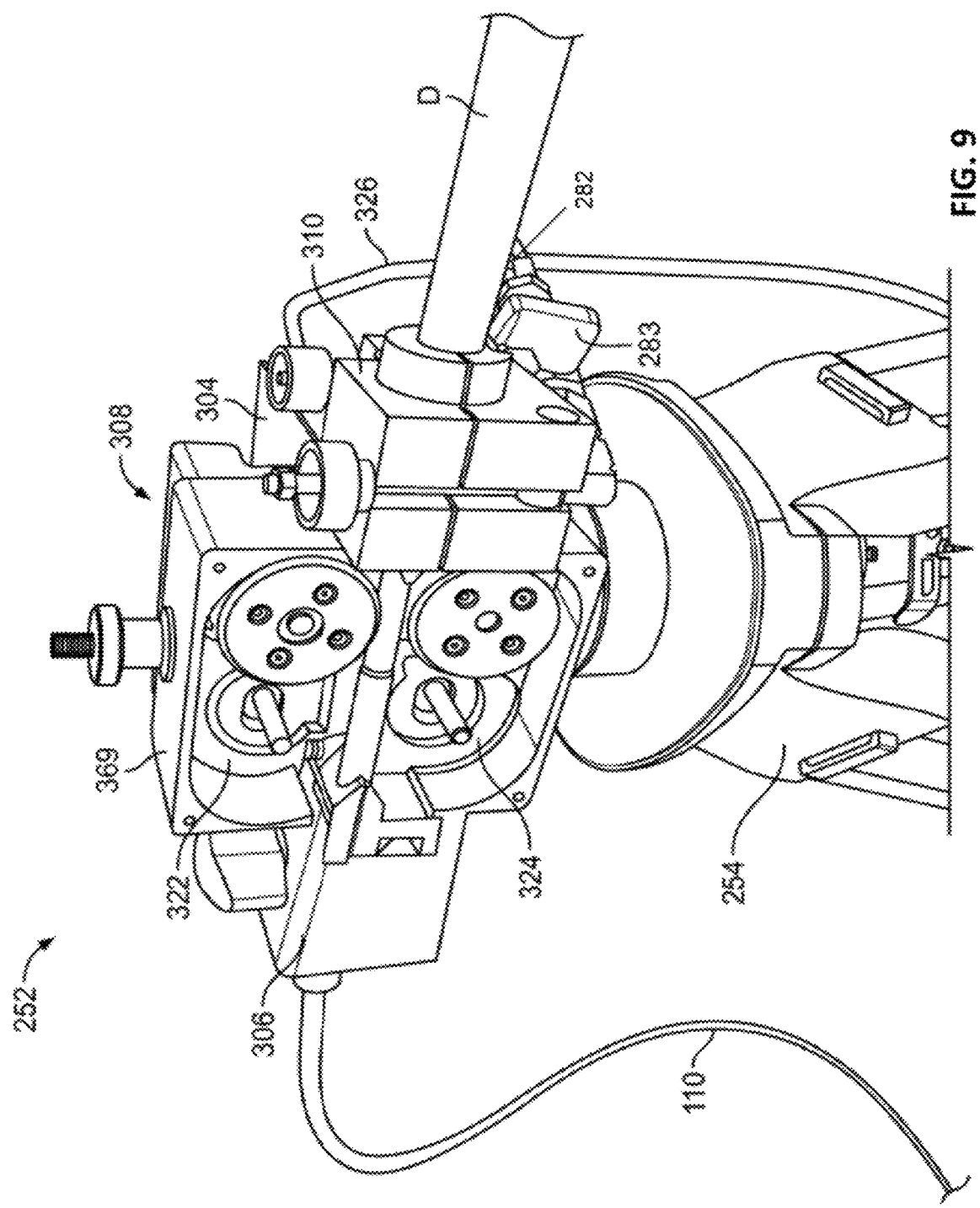
FIG. 9 is another perspective view of another example of the blower head shown in FIG. 8.
Figure 10:
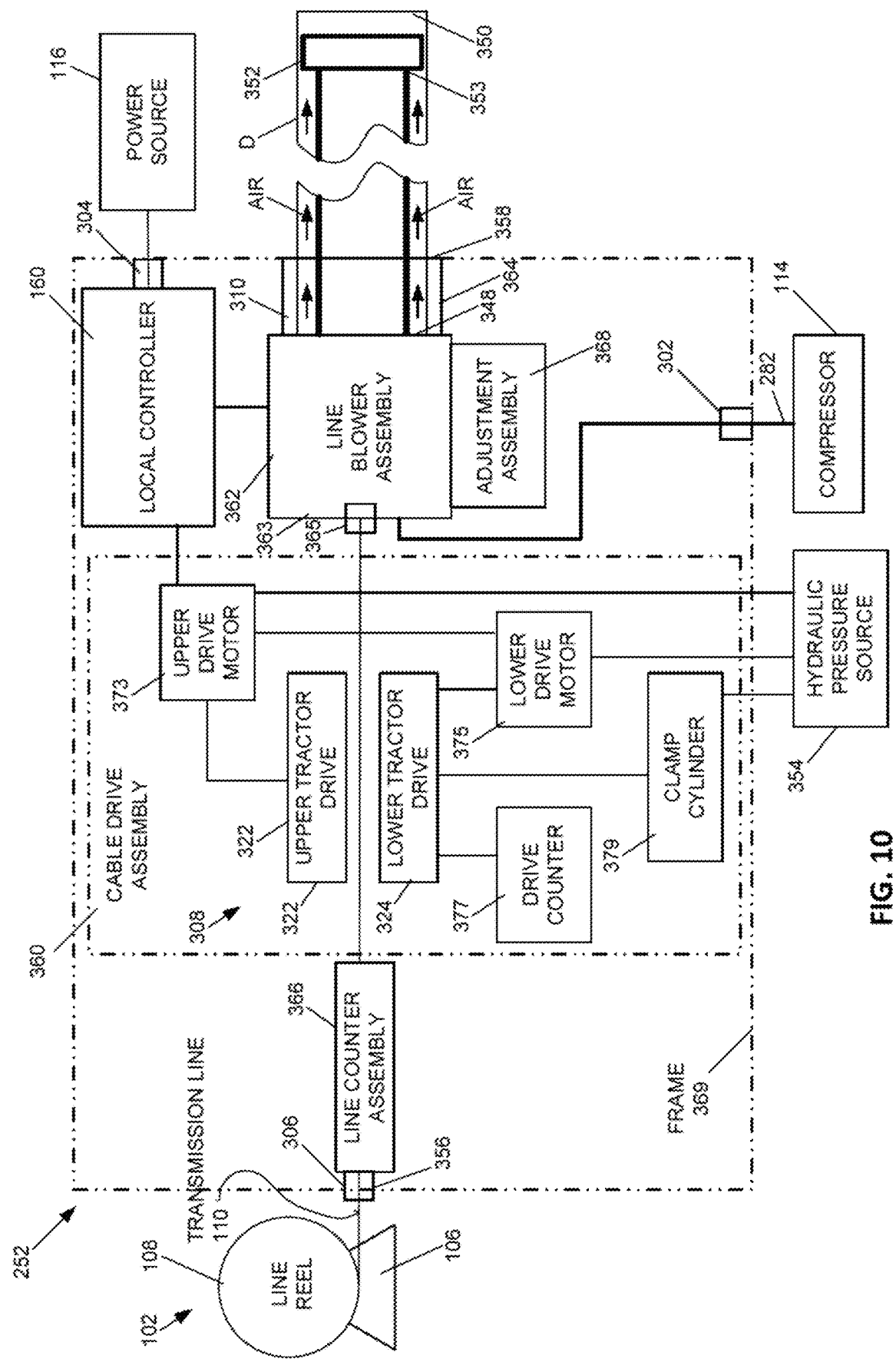
FIG. 10 is a block diagram of another example of the blower head shown in FIG. 8.
Figure 11:
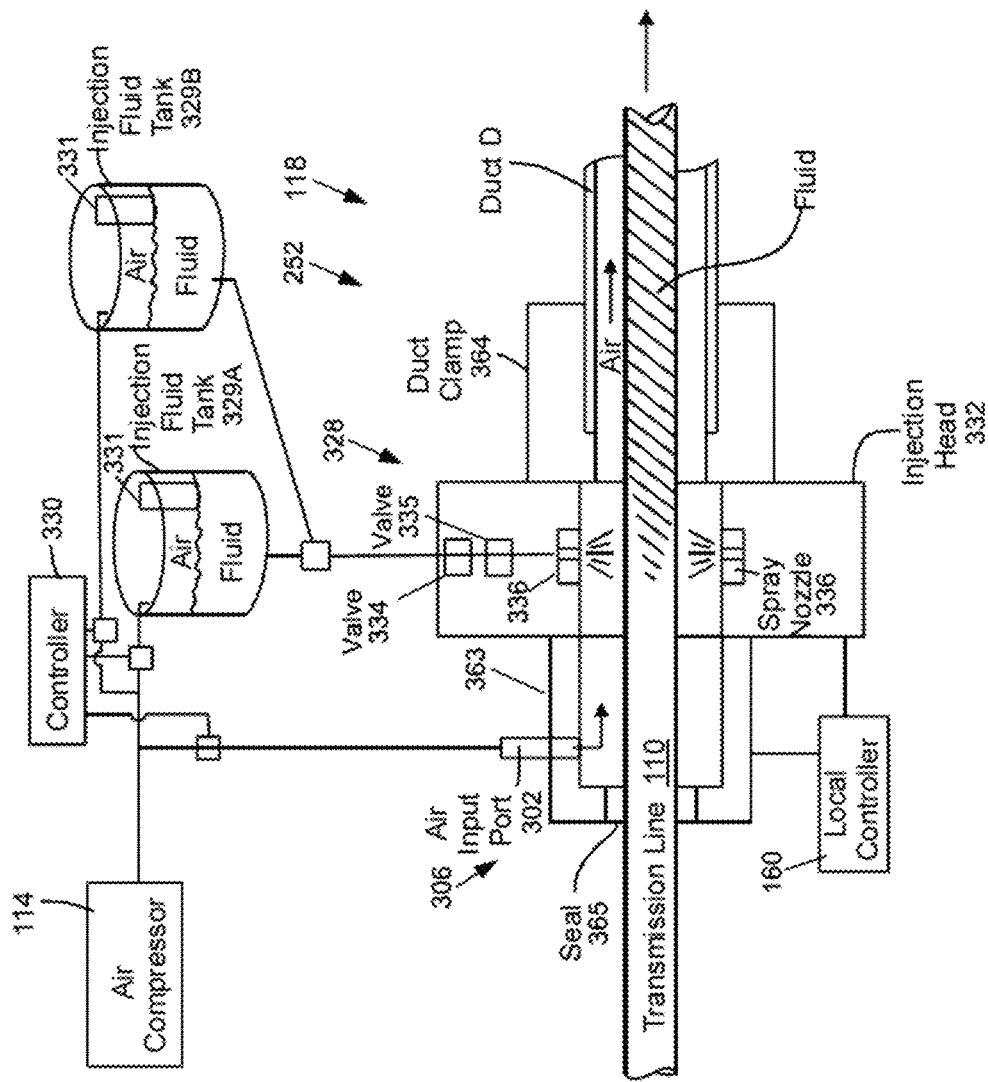
FIG. 11 is a schematic block diagram of another example blower head, including a fluid injector.
Figure 12:
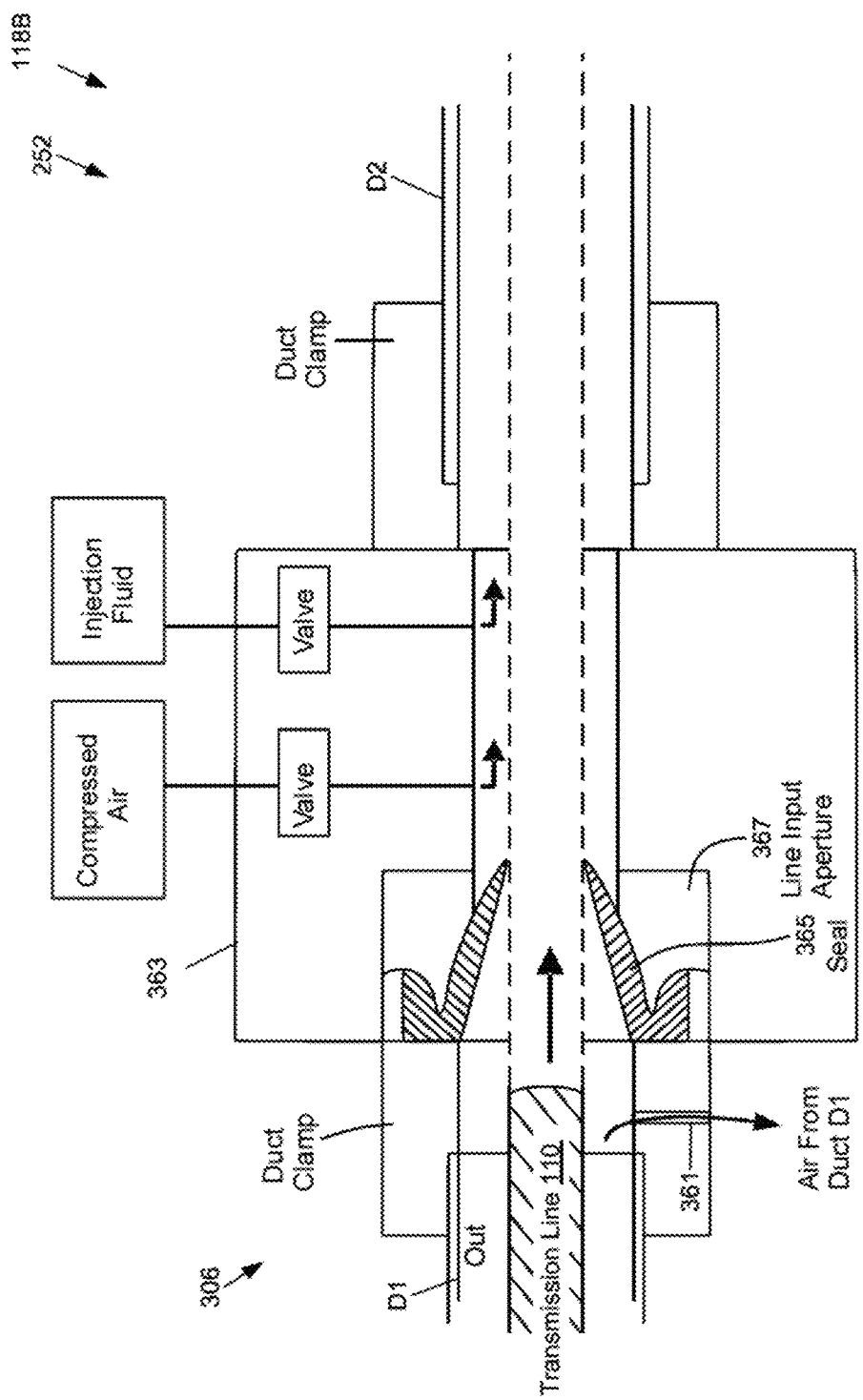
FIG. 12 is a schematic cross-sectional diagram illustrating an example flex seal for a blower head.

FIGS. 8-12 illustrate an example blower head 252. FIG. 8 is a perspective view of the blower head 252. FIG. 9 is a perspective view of another example blower head 252 with a cover piece removed to show interior components of a tractor drive. FIG. 10 is a block diagram of an example blower head 252. FIG. 11 is a schematic block diagram of an example blower head 252 having a fluid injector. FIG. 12 illustrates a portion of a mid-run line blower 118B.

The example shown in FIG. 8 illustrates several parts of an example blower head 252, including an air input port 302, a power supply port 304, a transmission line receptacle 306 (hidden from view in FIG. 8), a tractor drive 308, a duct receptacle 310, the local controller 160 including a display device (such as a touch sensitive display), and the frame 369. Examples of the blower head 252 are described in further detail with reference to FIGS. 9-12.

The example shown in FIG. 9 illustrates another example of the blower head 252, and in particular illustrates several parts more clearly because a cover piece is removed to show interior components, including the tractor drive 308. Shown in FIG. 9 are the transmission line 110, duct D, power supply port 304, transmission line receptacle 306, tractor drive 308 including the upper tractor drive 322 and lower tractor drive 324, duct receptacle 310, power cable 326, and the stand 254. The parts are discussed in further detail with reference to FIG. 10.

FIG. 10 is a schematic block diagram of the example blower head 252. As in prior examples, this example of the blower head 252 includes the air input port 302, power supply port 304, transmission line receptacle 306, tractor drive 308 including the upper tractor drive 322 and the lower tractor drive 324, and the duct receptacle 310.

The duct D is shown including a proximal end 348 and a distal end 350. The transmission line 110 is provided by the transmission line source 102 (such as including a reel stand 106 and transmission line reel 108). In some embodiments a carrier 352 is fastened at a distal end 353 of the transmission line 110. The compressor 114, power source 116, and a hydraulic pressure source 354 are also shown.

Some embodiments of the blower head 252 further include one or more of an inlet 356 and outlet 358, a transmission line drive assembly 360, a line blower assembly 362, an air block 363, a seal 365, a duct mount assembly 364 (also sometimes referred to as a duct clamp), a transmission line counter assembly 366, an adjustment assembly 368, and a frame 369. Some embodiments of the transmission line drive assembly 360 include the upper and lower tractor drives 322, 324, upper and lower drive motors 373 and 375, a drive counter 377, and a clamp cylinder 379.

The blower head 252 generates motive force(s) for the installation of the transmission line 110 to be pulled from the transmission line reel 108, or other transmission line source, and inserted into an interior of duct D. The duct D can be any of a variety of known ducts, such as polyethylene, suitable for receiving and storing the transmission line 110. Once installed in the duct, the transmission line 110 can subsequently be used, such as for transmission of light or electrical signals, or power. As discussed, herein, the transmission line 110 can be any of a variety of known cables or wires used for transmitting energy or signals, including fiber optic cable having one or more optical fibers contained therein, and preferably having a circular outer perimeter. The blower head 252 accepts the transmission line 110 at the inlet 356, and the transmission line 110 exits the blower head 252 at the outlet 358. The duct D extends from the blower head 252 to the distal end 350, which can be several hundred feet or less away from the blower head 252, or several thousand feet or more away from the blower head 252.

Preferably, the motive force generated by the blower head 252 includes a pushing force generated by frictional engagement of the transmission line 110 with a moving drive assembly 360. The blower head 252 includes a transmission line drive assembly 360, which frictionally engages the transmission line 110 so as to provide a motive pushing force. In some embodiments, the transmission line drive assembly 360 is hydraulically driven by a hydraulic pressure source 354 linked by hydraulic lines to the drive assembly 360.

In some embodiments the motive force further includes a pulling force generated by air pressure. The blower head 252 preferably also includes the line blower assembly 362, which allows for pressurized air to enter the duct D. The carrier 352 attached to the distal end 353 of the transmission line 110 slideably and sealably closes off duct D from the atmosphere sufficient to create a pressure difference adjacent to the carrier 352. Line blower assembly 362 is linked to the compressor 114, which generates appropriate air pressure. The air hose 282 and a valve 283 (FIG. 9) link the compressor 114 with the line blower assembly 362. The valve 283 can be manually or electronically adjustable. An electronically adjustable valve is electronically connected to the local controller, which can adjust the valve between open and closed positions, or to various partially opened positions, to adjust the air flow through the blower and into the duct D. Air pressure within the duct D between the carrier 352 and the blower head 252 causes the carrier 352 to move toward the distal end 350 of the duct D where it exits the duct D. The pressurized air within the duct D, behind the carrier 352, flows along sides of the transmission line 110 which can generate a motive pulling force at the distal end 353 of the transmission line 110. The flow of air can also generate a pillow of air that helps to space the transmission line 110 from the interior surface of the duct D to reduce frictional contact between the transmission line 110 and the duct. Further if the carrier does not completely seal the duct, the air will flow along the duct at a faster speed than the transmission line 110. This creates a distributed viscous drag between the air flow and the transmission line 110 that further helps to propel the transmission line 110 along the duct by pulling on the transmission line 110 along the entire length of the transmission line 110. A further advantage of this is that it reduces the required pushing and pulling forces that are localized to the distal and proximal ends of the transmission line, which if too great can result in damage to the transmission line 110.

In some embodiments the blower head 252 preferably further includes the transmission line counter assembly 366, which monitors the speed of the transmission line 110 during operation. Preferably, the transmission line counter assembly 366 also monitors the length of the transmission line 110 passing through blower head 252 from the transmission line reel 108. Similar to the line counter discussed herein for the reel stand 106, the blower can similarly include an optical counter that reads markings on the exterior of the transmission line as it passes through the blower head 252. The length is communicated to and received at the local controller 160, for communication to other components or the control unit 120. In some embodiments the transmission line counter assembly 366 is used to detect slip of the transmission line within the blower head 252. Slip typically occurs between the transmission line and the drive system of the blower, such as the upper and lower tractor drives 322, 324. One way to detect slip is to compare the measurements read by the transmission line counter assembly 366 with other speed or distance measurements in the system, such as the blower distance measurement, or from the reel. When the speeds or distances do not match (or deviate by more than a particular amount), the system can determine that the transmission line is slipping in the blower head 252. Remedial action can then be taken, such as to reduce the air pressure, alert the operator, or other remedial action.

In some embodiments the blower head 252 also includes a frame 369, which can be supported by legs, a cart, or other stand for supporting the frame 369 at a convenient level above the ground. Such supporting structure also includes wheels in some embodiments, for conveniently moving the blower head 252 between locations. Frame 369 also supports the transmission line drive assembly 360, the line blower assembly 362, and the transmission line counter assembly 366. The frame 369 also supports the local controller 160 which monitors and/or controls operation of various of the parts of blower head 252. The frame 369 allows for the various assemblies to be conveniently used and transported together as a unit.

The line blower assembly 362 includes the air block 363 which links both the transmission line 110 received from the transmission line drive assembly 360, and the compressor 114 with duct D. The duct mount assembly 364 at the duct receptacle 310 forms a portion of line blower assembly 362, and securably mounts the duct D to the blower head 252. The adjustment assembly 368 arranged below the line blower assembly 362 also forms a portion of the line blower assembly 362, and allows for vertical adjustment of the air block 363 and the duct mount assembly 364 relative to the frame 369. The adjustment is with respect to the transmission line drive assembly 360. Such vertical adjustment allows for different diameter transmission lines to be installed by the blower head 252. As the diameter of the transmission line 110 is varied, the location of the central axis of the transmission line 110 will vary as it exits the transmission line drive assembly 360. Such variance in height is adjusted in order to allow for proper sealing in the air block 363.

A seal 365 is provided at a line input aperture into the air block 363, and operates to prevent compressed air from within the air block 363 from escaping around the transmission line 110. The seal 365 fills a gap between the line input aperture of the air block 363 and the transmission line 110. Examples of the seal 365 are illustrated and described in further detail with reference to FIGS. 12-19.

Some embodiments further include a mechanical valve adjacent the seal 365 that can be opened and closed under the control of the local controller 160. The mechanical valve is opened to allow passage of the transmission line 110 into the line blower assembly 362. Once the trailing end of the transmission line 110 enters the line blower assembly 362, the mechanical valve is closed to prevent air from escaping through the transmission line input aperture when the transmission line 110 is not present. The mechanical valve can be operated electrically, pneumatically, or hydraulically. Additionally, in some embodiments a transmission line presence sensor is used to determine when the transmission line has passed through the valve. The sensor can be electronic, optical, or mechanical, for example, and upon detection that the transmission line has passed through the valve, the valve is actuated to close the valve and prevent air from escaping therethrough.

In some embodiments the transmission line drive assembly 360 includes the upper and lower tractor drives 322, 324. Preferably, each is driven by a hydraulic, pneumatic, or electric motor, 375, 373. Each tractor drive 322, 324 includes a moveable member. In some embodiments, an endless chain in each tractor drive 322, 324 is driven by the hydraulic motors 373, 373, respectively, so as to frictionally engage the transmission line 110 and apply the motive pushing force to the transmission line 110. In the illustrated embodiment, the tractor drives 322, 324 oppose each other and are aligned in the vertical direction. Other moveable drive members besides opposed endless chains are possible including wheels and/or belts. Further, the moveable members can be arranged in V-shape, for example.

The lower drive counter 377 monitors movement of the lower tractor drive 324, which is indicative of the speed of transmission line drive assembly 360, and correspondingly indicative of the speed of the transmission line 110 as it enters the duct D. Such speed monitoring is important for preventing excessive relative speed between the transmission line drive assembly 360 and the transmission line 110 during slippage. Additionally, the speed monitoring is also important so that it can be communicated to other components 113, such as to synchronize their operations (such as to keep several line blowers 118A, 118B, 118C all operating at the same speed). The speed is communicated from the lower drive counter 377 to the local controller 160 which receives the speed measurement. The speed can then be communicated from the local controller 160 to other components or the control unit 120. Alternatively, the speed monitoring can be used to adjust the blower head 252 speed so that it matches an instructed speed. For example, if the local controller 160 receives an instruction from another component 113, control unit 120, or a global controller 121 to adjust to a certain speed of operation, the speed measurement can be used to determine whether the speed needs to be increased or decreased to match the instructed speed, and to confirm once the instructed speed has been achieved.

In some embodiments the transmission line drive assembly 360 further includes a hold down system, such as a hydraulic clamp cylinder 379, linked to the hydraulic pressure source 354 by a hydraulic line. The hydraulic clamp cylinder 379 generates a predetermined normal force on the transmission line 110 between the upper and lower tractor drives 322, 324. Some slip is acceptable. Too much slip can cause transmission line jacket damage. Too much slip may also limit the usefulness of the blower head 252 if insignificant push forces are generated. The duct D usually contains some irregularities, joints and bends that can keep transmission line 110 and carrier 352 from moving smoothly. Unless an appropriate normal force is generated (not too much slip), the pushing force may be inadequate to overcome the irregularities, and slip may occur too often, causing unnecessary transmission line jacket damage or insignificant transmission line push force. On the other hand, a normal force which is too high risks crush damage to the transmission line 110, and inadequate slippage, such that column damage will be more likely to occur as the transmission line drive assembly 360 continues to move the transmission line 110 when transmission line 110 is being slowed or stopped within the duct D. When slip does occur under high normal force loads, transmission line jacket damage may result. By providing for a predetermined normal force with the blower head 252, predetermined slip levels can be monitored. This results in an appropriate level of slip, so as to not cause too many shutdowns of the blower head 252 when transmission line damage is not significantly at risk, but excessive slip is noted, and can be used to shut off the blower head 252 to prevent damage.

The blower head 252 balances the benefits and risks associated with the drive assembly 360, which generates a pushing force from a moving member frictionally engaged with the transmission line 110. The blower head 252 reduces or avoids transmission line damage (crush, column, and slippage), but allows for sufficiently long runs of continuous transmission line to be installed. Such balance comes from monitoring and controlling the normal force applied to transmission line 110, the speed of transmission line 110, and the speed of transmission line drive assembly 360.

In some embodiments the local controller 160 of the blower head 252 includes control subsystems that operate to perform one or more of: monitoring and controlling the speed of the upper and lower tractor drives 322, 324; monitoring the speed of the transmission line 110; monitoring and controlling system air pressure; monitoring air temperature, monitoring air humidity, monitoring lubrication on the transmission line 110, and monitoring and controlling the hold down system, such as the clamp cylinder 379.

Some embodiments of the blower head 252 further include a buckle sensor configured to detect buckling or the transmission line 110.

FIG. 11 is a schematic block diagram of an example blower head 252 of a line blower 118, and including a fluid injector 328. The example blower head 252 includes the transmission line receptacle 306, air block 363 with an air input port 302, fluid injector 328 having an injection head 332 with a valve 334, a check valve 335, and spray nozzles 336, and duct clamp 364. Also shown are the local controller 160, transmission line 110, duct D, air compressor 114, one or more injection fluid tanks 329 (including tank 329A and 329B), and a controller 330.

In this example, the blower head 252 can be used to apply a fluid onto the transmission line 110, or into the air entering the duct D, or both. The fluid is stored in an injection fluid tank 320, which can be part of the blower head 252, line blower 118, or a separate tank in fluid communication with the blower head 252, such as with a hose.

An example of the fluid that can be stored in one or more of the injection fluid tanks 329 and applied by the injection head 332 is a lubricant. When a lubricant is used, the fluid injector 328 can be referred to as a lubricator. In some embodiments multiple injection fluid tanks 329A and 329B are available that contain different lubricants or moisturizers with different properties. The injection fluid supplied to the injection head 332 can be selected from among the various available options based on the desired properties under the current conditions. In some embodiments the controller 330 (which is, for example, a local controller of the air compressor 114 or of the fluid injector 328) or local controller 160 select the lubricant. The injection fluid selection can be selected and changed during the course of a transmission line installation, as conditions change.

In this example, an end of the duct D is clamped into the duct clamp 364 and forms an air-tight seal between the blower head 252 and the duct D. The transmission line 110 is received into the transmission line receptacle 306 where it passes through the seal 365 and into the air block 363. Compressed air is received into the air block 363 from the air compressor 114 and is directed adjacent the transmission line 110 and into the duct D. In some embodiments the compressed air is also supplied to the injection fluid tank 329 to pressurize the tank, which operates in cooperation with a supplemental pressure device 331, to pressurize the fluid to a level greater than the pressure in the blower head 252 (the pressure differential created thereby sometimes being referred to as the delta p pressure differential), to cause fluid to flow to the injection head 332 when the valve 334 is opened. The check valve 335 prevents backflow of fluid into the injection fluid tank 329.

The fluid injector 328 can operate in a prime mode and in a run mode. When in the prime mode, the fluid injector 328 supplies fluid into the duct D before the transmission line 110 installation begins, to inject the fluid into the duct D. When in the run mode, the fluid injector 328 applies the fluid to the transmission line 110 or into the air around the transmission line 110. The fluid injector 328 can operate continuously or in a desired pattern (e.g., at certain time or distance intervals).

The fluid injector 328 includes the injection head 332 with one or more spray nozzles 336, a valve 334, and a check valve 335. To inject fluid, the local controller 160 instructs the injection head 332 to open valve 334. Pressurized fluid from the injection fluid tank 329 then flows into the injection head 332, through the check valve 335, and through the spray nozzles 336 into the air block 363, where the fluid enters the air and/or sprays onto the transmission line 110. From there, the fluid passes into the duct D and accompanies the transmission line 110, such as to lubricate the transmission line 110 and duct D to reduce heat and friction.

Figure 16:
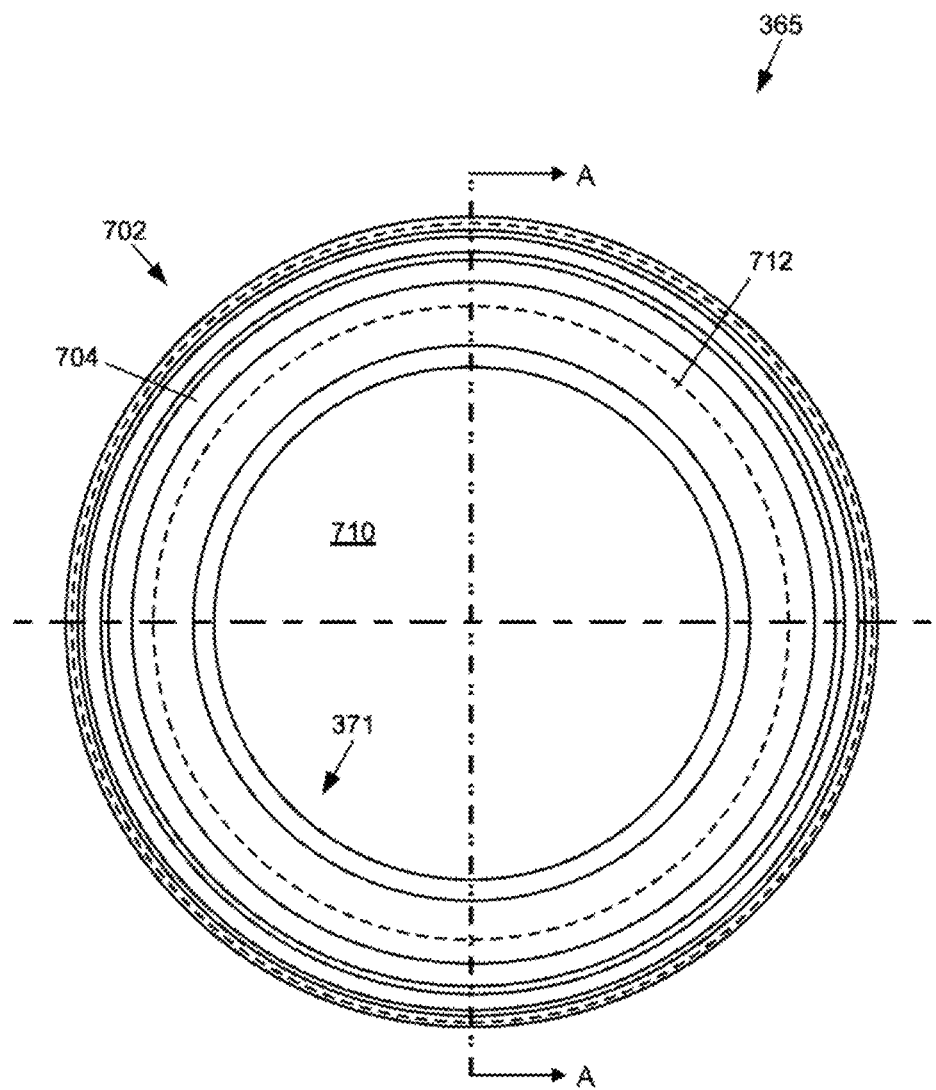
FIG. 16 is a rear elevational view of the example flex seal shown in FIG. 12.
Figure 17:
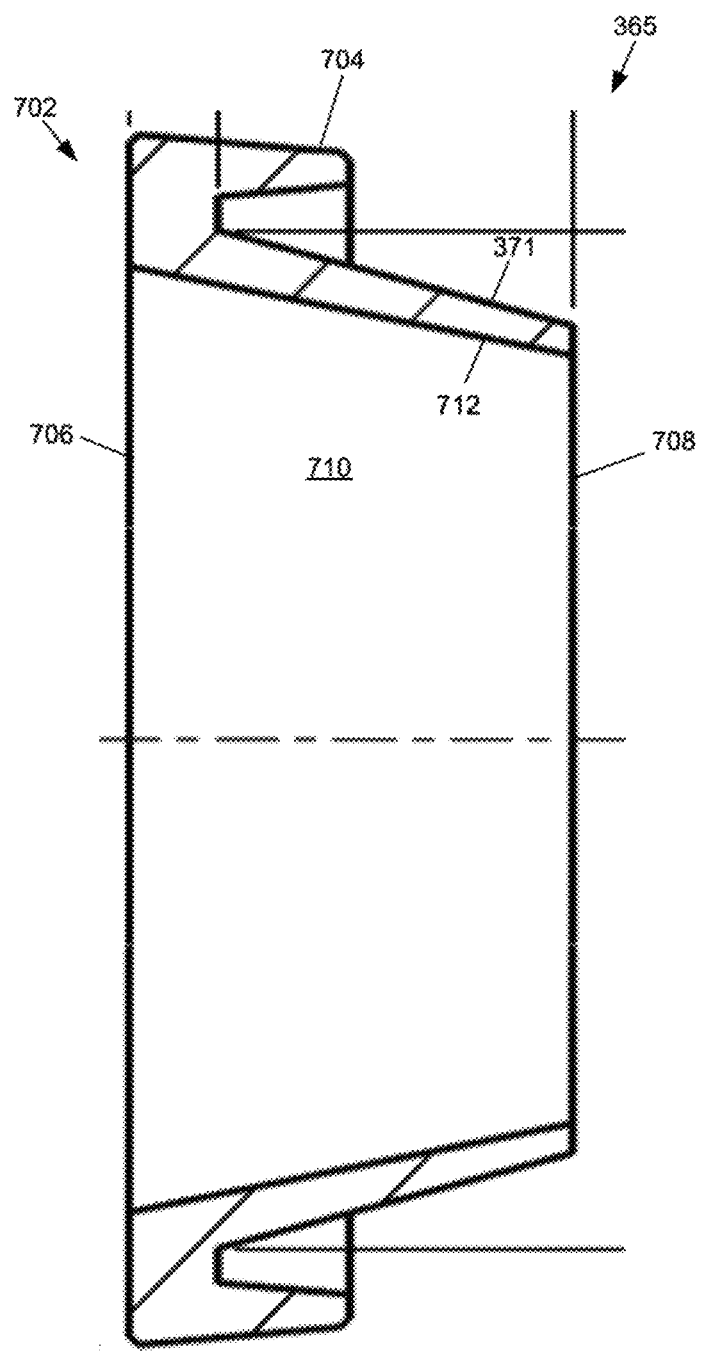
FIG. 17 is a cross-sectional view of the example flex seal shown in FIG. 12, taken along line A-A of FIG. 16.
Figure 18:
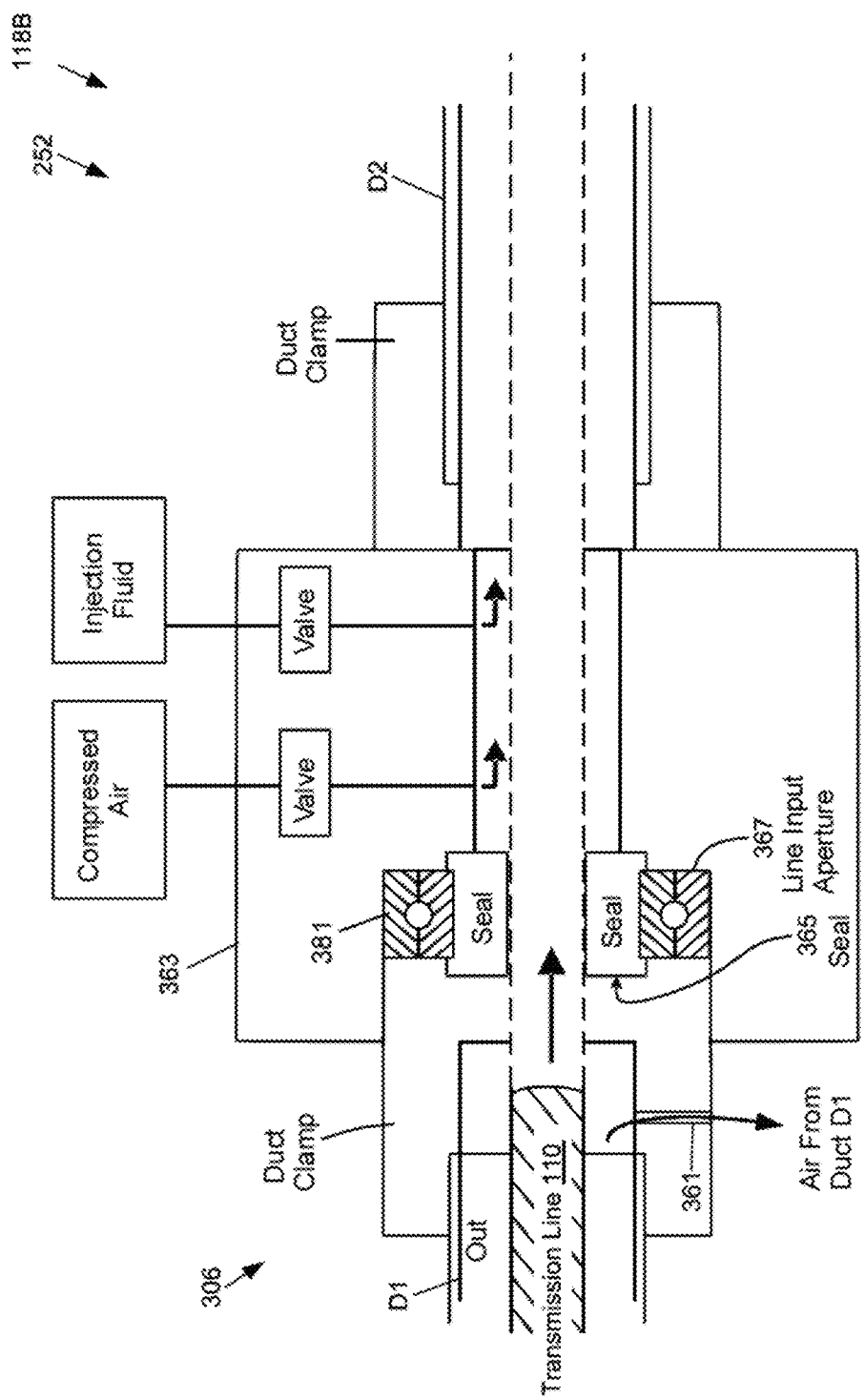
FIG. 18 is schematic cross-sectional diagram illustrating an example rotational seal for a blower head.
Figure 19:
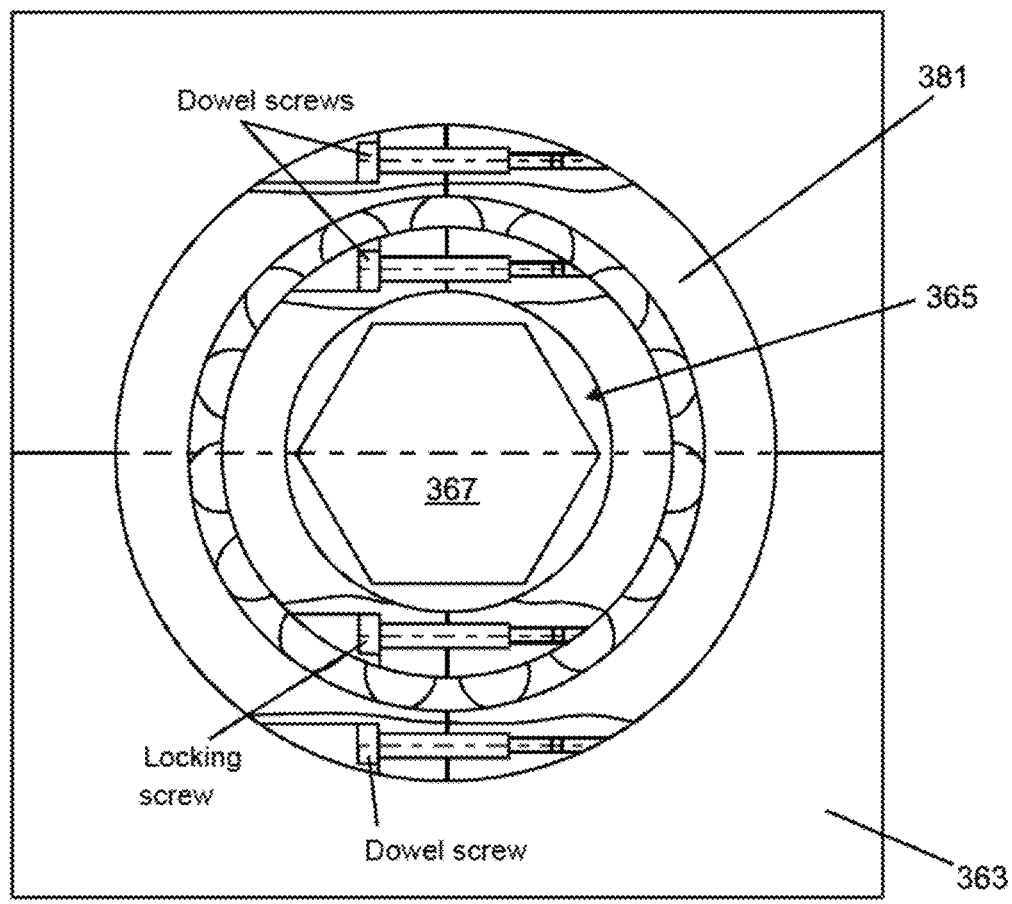
FIG. 19 is a front elevational view of an example rotational seal.

FIGS. 12-19 illustrate examples of the seal 365 shown in FIGS. 10-11 that can be used to seal a transmission line input aperture of an air block 363 of the blower head 252. FIGS. 12-17 illustrate an example of a flexible seal, and FIGS. 18-19 illustrate an example of a rotational seal. It should be noted that the examples of the line blower 118B illustrated in FIGS. 12 and 18 are by no means limiting, other embodiments of the line blower 118B are within the scope of the disclosure. For instance, additional examples of the line blower 118B are illustrated and described below with reference to FIGS. 30-40.

When blowing air into a duct, it is desirable that most or all of the air supplied actually flows into the duct, and is not lost by leaking out of the blower. One of the places where a leak can occur is at the transmission line input aperture, where the transmission line enters the blower head. If a gap is formed between the input aperture and the transmission line, the pressurized air inside of the blower head can leak out around the transmission line, which can undesirably and significantly reduce the pressure and rate of air flow into the duct. Accordingly, an air seal 365 can be used to reduce or prevent air from leaking out around the transmission line.

FIG. 12 is a schematic cross-sectional diagram illustrating portions of a line blower 118B, and particularly illustrating the position of the line blower 118B between two duct segments D1 and D2, and also illustrating an example seal 365, in the form of a flexible seal.

The line blower 118B is an example of a mid-run blower that can be positioned at an intermediate position along the full length of a duct D, such as between two adjacent segments of the duct—in this case, duct segments D1 and D2. The line blower 118B can be configured in a similar manner as the line blowers and blower heads illustrated and described herein with reference to FIGS. 8-11, and so those details are not repeated herein, and FIG. 12 is a simplified diagram that does not repeat all of those components.

An end of the duct segment D1 is fastened to the blower head 252 by the duct clamp, in a similar manner to the duct clamp 364 previously described herein.

The blower head 252 includes an air block 363 which is configured to contain compressed air received from an air compressor 114, which pressurized the air block 363. Injection fluid can also be received, as described with reference to FIG. 11.

When the transmission line 110 has completed its passage through the duct segment D1, it emerges from the duct D1 and is directed toward the transmission line input aperture 367. The transmission line input aperture 367 is an example of a lead in guide system, and more specifically an example of an air block lead in guide system. Air from duct D1 is released through one or more vent apertures 361.

The input aperture 367 and seal 365 have a tapered (funnel-shaped) cross-sectional shape that is larger at the front, and decreases in size toward the end of the aperture 367 to guide the leading end of the transmission line 110 toward the central aperture of the blower head 252 and toward the duct D2.

Once the transmission line 110 in received into the seal 365, the seal 365 fills a gap between the transmission line 110 and the line input aperture 367 of the air block 363 prevents air from blowing out of the air block 363 through the gap, and keeps it contained within the air block 363. The configuration of the seal 365 includes a flexible inner body that can accommodate transmission lines of various cross-sectional shapes, such as the example shown in FIG. 13.

Figure 13:
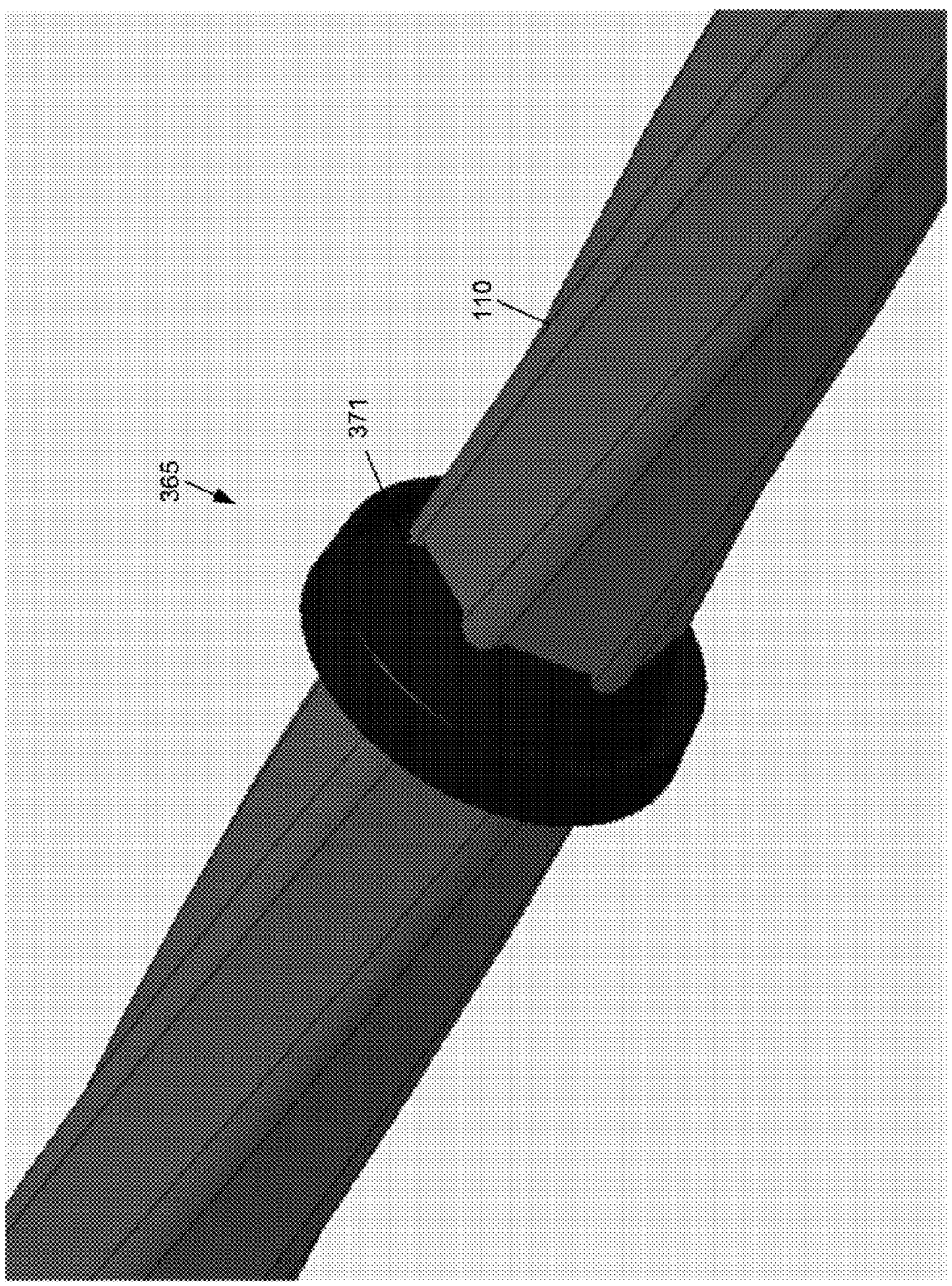
FIG. 13 is a perspective view of the example flex seal shown in FIG. 12, and showing a non-circular transmission line passing therethrough.

FIG. 13 is a perspective view showing an example of how the example flex seal 365 responds to the receipt of a non-circular shaped transmission line 110.

The configuration of the seal 365 includes a flexible inner body 371 that can accommodate transmission lines of various cross-sectional shapes. At rest, the flexible inner body 371 has an inner aperture that is sized to be less than the outer dimension of the transmission line 110. The material of the inner body 371 can stretch, and when the transmission line 110 passes through it, the material stretches and conforms to the shape of the exterior of the transmission line, to provide an air-tight seal between the transmission line and the blower head 252, which can work with various sized and shaped transmission lines, including circular, squared, triangular, hexagonal, octagonal, other polygonal shapes, or other shapes (e.g., elliptical or oblong, etc.). Additionally, some transmission lines have a shape with an orientation that rotates along the length of the transmission line (as in the example transmission line 110 shown in FIG. 13). The seal 365 can similarly accommodate such transmission lines, because the flexible inner body can simply reshape as the transmission line 110 passes therethrough. In other words, even though the seal 365 is arranged in a fixed orientation, the shape of the opening can rotate as it is stretched and deformed by the passing transmission line 110.

Figure 14:
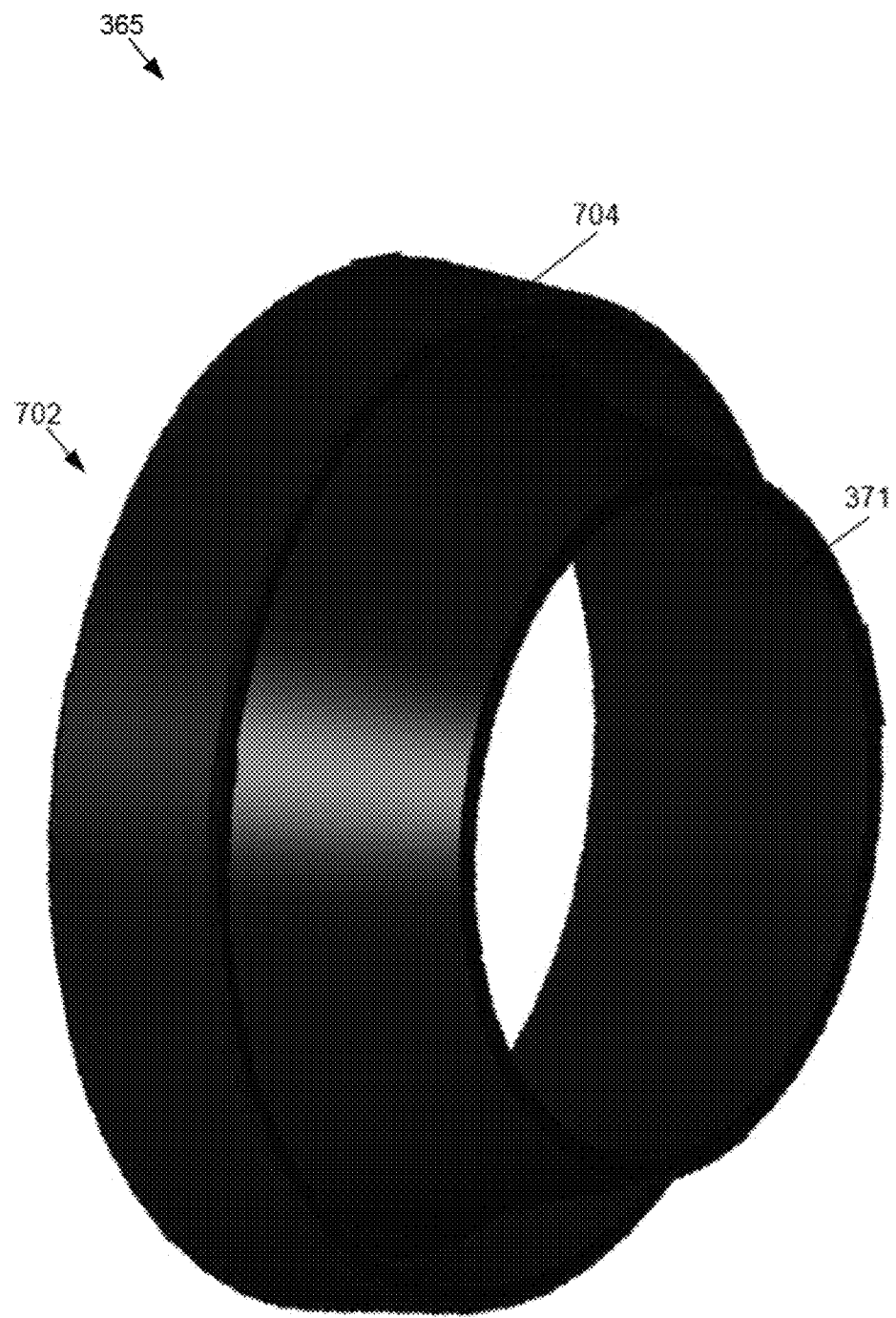
FIG. 14 is a rear perspective view of the example flex seal shown in FIG. 12.
Figure 15:
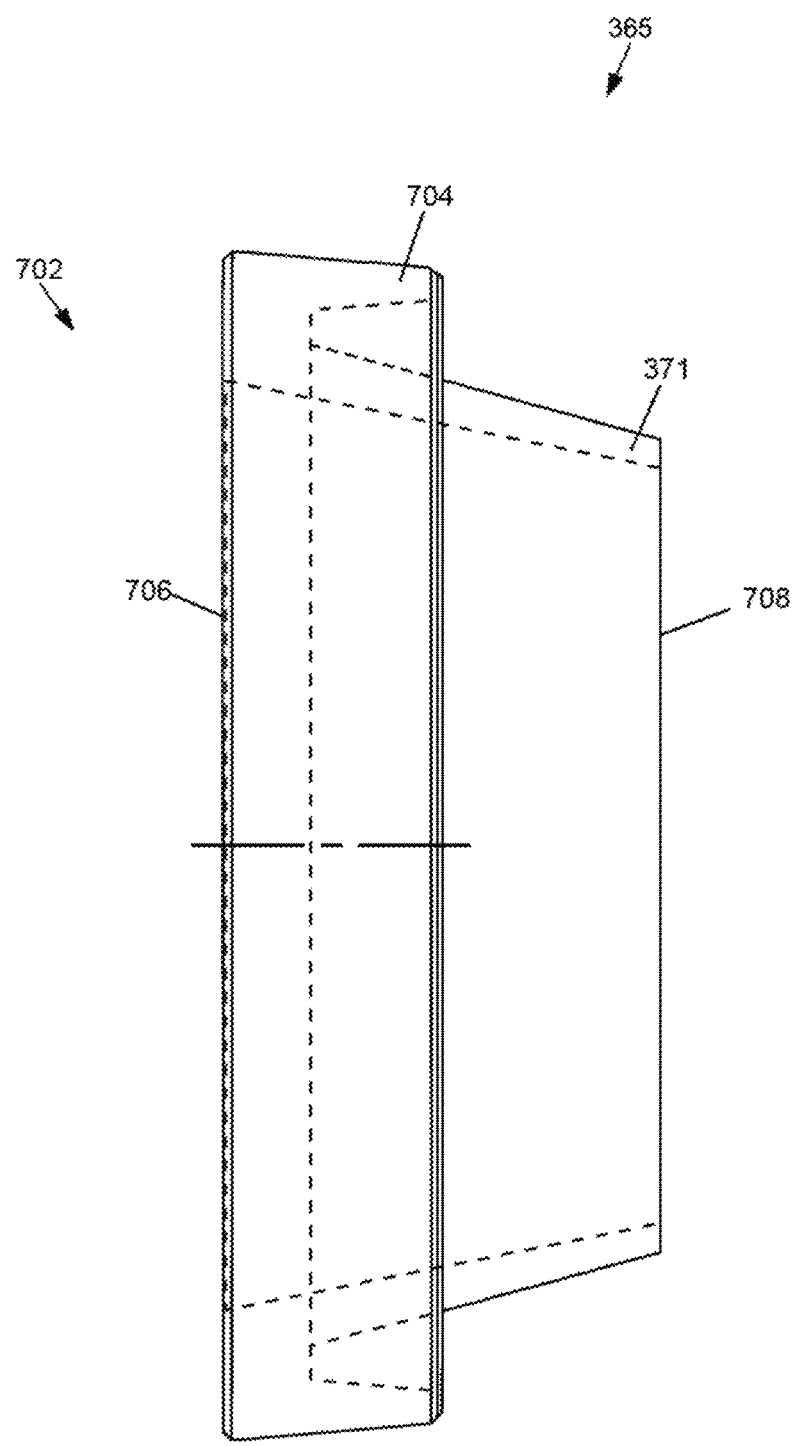
FIG. 15 is a side view of the example flex seal shown in FIG. 14.

FIGS. 14-17 illustrate several views of the example seal 365 shown in FIGS. 12 and 13. FIG. 14 is a rear perspective view, FIG. 15 is a side view, FIG. 16 is a rear elevational view, and FIG. 17 is cross-sectional side view taken along line A-A of FIG. 16.

The seal 365 includes a body 702 having an inner body 371 and a securing flange 704. The inner body 371 and the securing flange 704 are joined together at a forward end 706 of the body. The securing flange 704 extends rearward forming a flange that can be used to secure the seal 365 to the line input aperture 367 to prevent the seal 365 from moving rearward (along the advancement direction of the transmission line 110) as the transmission line 110 passes therethrough.

The inner body 371 has a tapered sidewall 712 and defines an inner aperture 710 that extends through the body 702 and the inner body 371 from the forward end 706 to the rearward end 708. The aperture 710 has a dimension at the forward end 706 that is greater than the dimension at the rearward end 708. A smooth gradually tapered shape of the inner aperture 710 and sidewall 712 acts like a funnel to direct the transmission line into the air block 363 of the blower head 252.

FIGS. 18-19 illustrate another example of the seal 365, in the form of a rotational seal. FIG. 18 is a schematic cross-sectional diagram, similar to FIG. 12, but showing the example rotational seal 365. FIG. 19 is a rear elevational view of the rotational seal 365. In this example, the rotational seal has a shape that corresponds to the exterior cross-sectional shape of a transmission line 110, and is particularly suited for transmission lines that have an orientation of a cross-sectional shape that rotates along a length of the transmission line 110, such as the example transmission line 110 previously shown in FIG. 13. In this embodiment, the rotational seal is mounted so that it can rotate as the transmission line 110 passes through it, so that a good seal can be maintained in all orientations of the cross-sectional shape. When such a transmission line 110 passes through the rotational seal 365 it causes the seal 365 to rotate or twist due to the lay and memory of the transmission line 110. In one example embodiment, the seal is mounted to the air block 363 with a rotational coupling 381, such as a ball bearing coupling. The rotational coupling 381 includes a portion that is fixedly mounted to the air block 363, and an opposite portion that is permitted to rotate around the line input aperture. In some embodiments the housing enclosing the rotational coupling 381 is separable to permit the seal 365 to be removed and replaced with another seal 365 depending on the particular size and shape of the transmission line 110. The seal 365 is selected to conform to the exterior surface of the transmission line 110.

Figure 20:
FIG. 20 is a perspective view illustrating an example of the control unit of the transmission line installation system shown in FIGS. 1 and 2.

FIG. 20 is a perspective view illustrating an example embodiment of the control unit 120. In this example the control unit 120 is a smartphone or tablet computing device. An example of the control unit 120 is illustrated and described in further detail with reference to FIG. 21.

The control unit 120 is a computing device that provides an interface between the installation technician and the transmission line installation system 100. In some embodiments the control unit 120 receives control inputs from the installation technician, such as to start and stop an installation, to adjust settings or the installation plan, or to define the current configuration of the transmission line installation system 100, the type or properties of the duct D, the type or properties of the transmission line 110, or current environmental factors. In some embodiments the control unit 120 provides status information to the installation technician, such as to convey the current status of the installation and to show the progress that has already been made. The control unit 120 is in data communication with one or more other components of the transmission line installation system 100, such as the transmission line conveying system 104.

Figure 21:
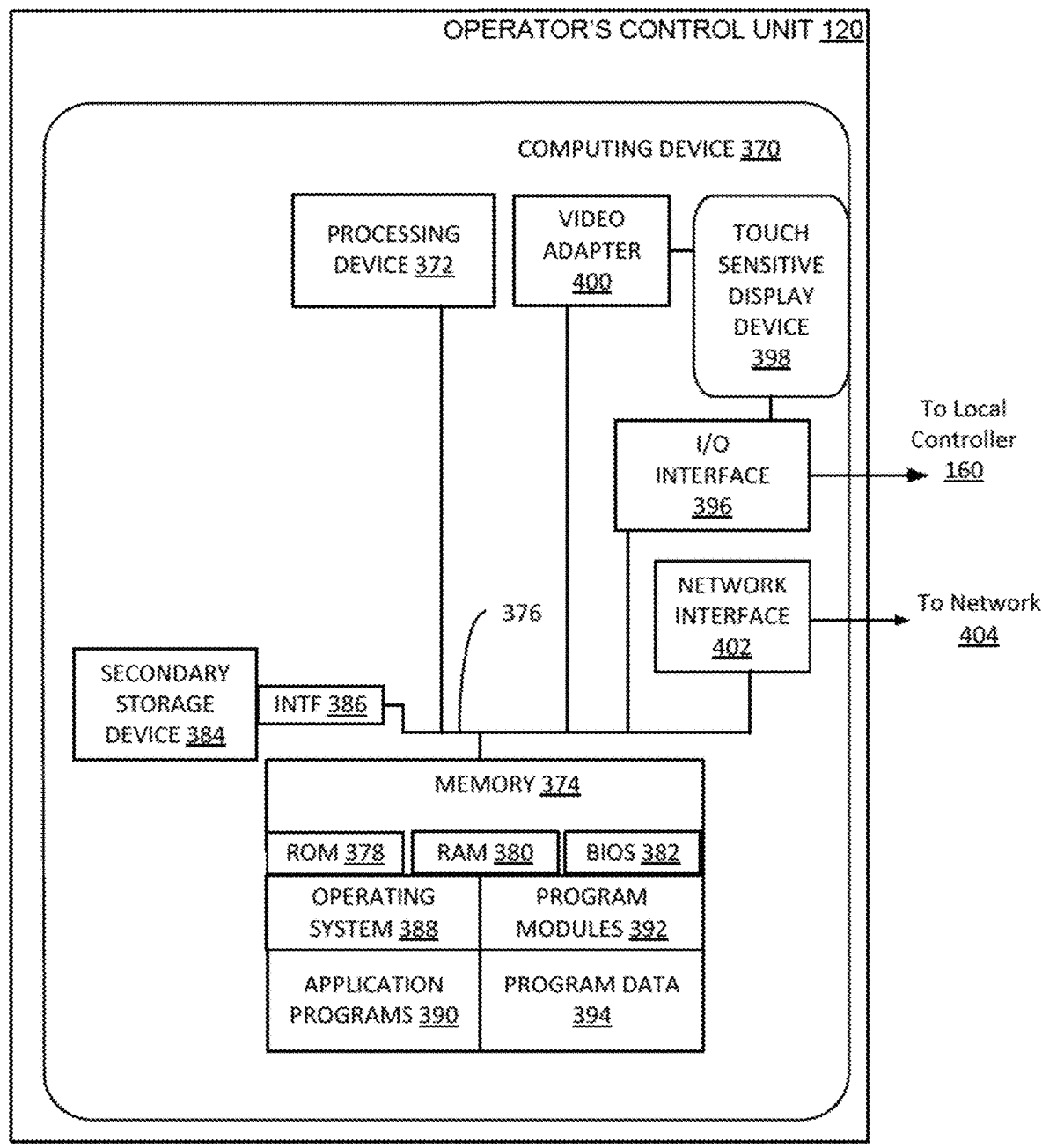
FIG. 21 is a schematic block diagram illustrating another example of the control unit shown FIG. 19.

FIG. 21 is a schematic block diagram illustrating an example of the control unit 120. FIG. 21 illustrates an exemplary architecture of a computing device that can be used to implement aspects of the present disclosure, including any of the plurality of the computing devices described herein, including the control unit 120, global controller 121, and any other computing device involved in the transmission line installation system 100.

Further, the computing device can also be implemented as part of any one or more of the transmission line installation system 100 components discussed herein, such as a portion of the reel stand 106, the transmission line conveying system 104 (including the compressor 114, the power source 116, and/or the transmission line blower 118. The computing device can be used to execute the operating system, application programs, and software modules (including the software engines) described herein. By way of example, the computing device will be described below as an example of the control unit 120. To avoid undue repetition, this description of the computing device will not be separately repeated herein for each of the other computing devices, including those listed above, but such devices can also be configured as illustrated and described with reference to FIG. 21.

In this example, the control unit 120 includes a computing device 370. The computing device 370 can be used to execute the operating system, application programs, methods, and software modules, and to perform any one or more of the functions of the control unit 120, described herein.

The computing device 370 includes, in some embodiments, at least one processing device 372, such as a central processing unit (CPU). A variety of processing devices are available from a variety of manufacturers, for example, Intel or Advanced Micro Devices. In this example, the computing device 370 also includes a system memory 374, and a system bus 376 that couples various system components including the system memory 374 to the processing device 372. The system bus 376 is one of any number of types of bus structures including a memory bus, or memory controller; a peripheral bus; and a local bus using any of a variety of bus architectures.

Examples of computing devices suitable for the computing device 370 include a server computer, a desktop computer, a laptop computer, a tablet computer, a mobile computing device (such as a smart phone, an iPod® or iPad® mobile digital device, or other mobile devices), or other devices configured to process digital instructions.

The system memory 374 includes read only memory 378 and random access memory 380. A basic input/output system 382 containing the basic routines that act to transfer information within computing device 370, such as during start up, is typically stored in the read only memory 378.

The computing device 370 also includes a secondary storage device 384 in some embodiments, such as a hard disk drive, for storing digital data. The secondary storage device 384 is connected to the system bus 376 by a secondary storage interface 386. The secondary storage devices 384 and their associated computer readable media provide nonvolatile storage of computer readable instructions (including application programs and program modules), data structures, and other data for the computing device 370.

Although the exemplary environment described herein employs a hard disk drive as a secondary storage device, other types of computer readable storage media are used in other embodiments. Examples of these other types of computer readable storage media include magnetic cassettes, flash memory cards, digital video disks, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 384 or memory 374, including an operating system 388, one or more application programs 390, other program modules 392 (such as the software engines described herein), and program data 394. The computing device 370 can utilize any suitable operating system, such as Microsoft Windows™, Google Chrome™, Google Android, Apple OS, Apple iOS, Linux, and any other operating system suitable for a computing device.

In some embodiments, a user provides inputs to the computing device 370 through one or more input devices, such as the touch sensitive display 398. Other input devices can also be used, such as a keyboard, mouse, pointer control device (such as a touch pad, touch stick, joy stick, etc.), microphone, and any other suitable input device. The input devices are often connected to the processing device 372 through an input/output interface 396 that is coupled to the system bus 376. Wireless communication between input devices and the interface 396 is possible as well, and includes infrared, BLUETOOTH® wireless technology, IEEE 802.11x Wi-Fi technology, cellular, or other radio frequency communication systems. Therefore, in some embodiments the I/O interface is a wireless communication device.

One or more input/output interfaces 396 can be used for communicating with other components of the transmission line installation system 100, such as the transmission line source 102, and transmission line conveying system 104. The input/output interface can include AC, DC, or digital input output interfaces, including for example USB and other i/o interfaces, and can also or alternatively include one or more communication devices such as a wireless communication device, wired network communication device (e.g., a modem or Ethernet communication device), or other wired communication devices (e.g., serial bus). The I/O interface 396 can communicate with the local controllers 160 of other components of the transmission line installation system 100, for example. In some embodiments the communication includes communication of data and commands. Examples of data include sensor data, such as a temperature, humidity, transmission line length, transmission line speed, reel feed speed, and other data describing current operating conditions. Examples of commands include start, stop, setting adjustments, and the like.

In this example embodiment, a display device 398, such as a monitor, liquid crystal display device, projector, or touch sensitive display device, is also connected to the system bus 376 via an interface, such as a video adapter 400. In addition to the display device 398, the computing device 370 can include various other peripheral devices (not shown), such as a wireless headset, speakers, and a printer.

When used in a local area networking environment or a wide area networking environment (such as the Internet), the computing device 370 is typically connected to a network 404 through a network interface 402, such as an Ethernet interface, or by a wireless communication device, such as using cellular or Wi-Fi communication. In some embodiments the network interface 402 is a cellular modem that can access the Internet through a cellular network. The network interface 402 can communicate with remote systems, such as the route evaluation system 122 (including computing devices 128 and 130) and the remote control and diagnostics system 124 (including computing device 132), all of which are shown in FIG. 1.

The computing device 370 typically includes at least some form of computer readable media. Computer readable media includes any available media that can be accessed by the computing device 370. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 370. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 20 is also an example of programmable electronics, which may include one or more such computing devices, and when multiple computing devices are included, such computing devices can be coupled together with a suitable data communication network so as to collectively perform the various functions, methods, or operations disclosed herein. Additionally, the term computing device used herein includes multiple computing devices cooperating to perform one or more functions or sets of functions.

In some embodiments the computing device 370 includes or is connected to a location determining device, such as a global positioning system (GPS) receiver.

Figure 22:
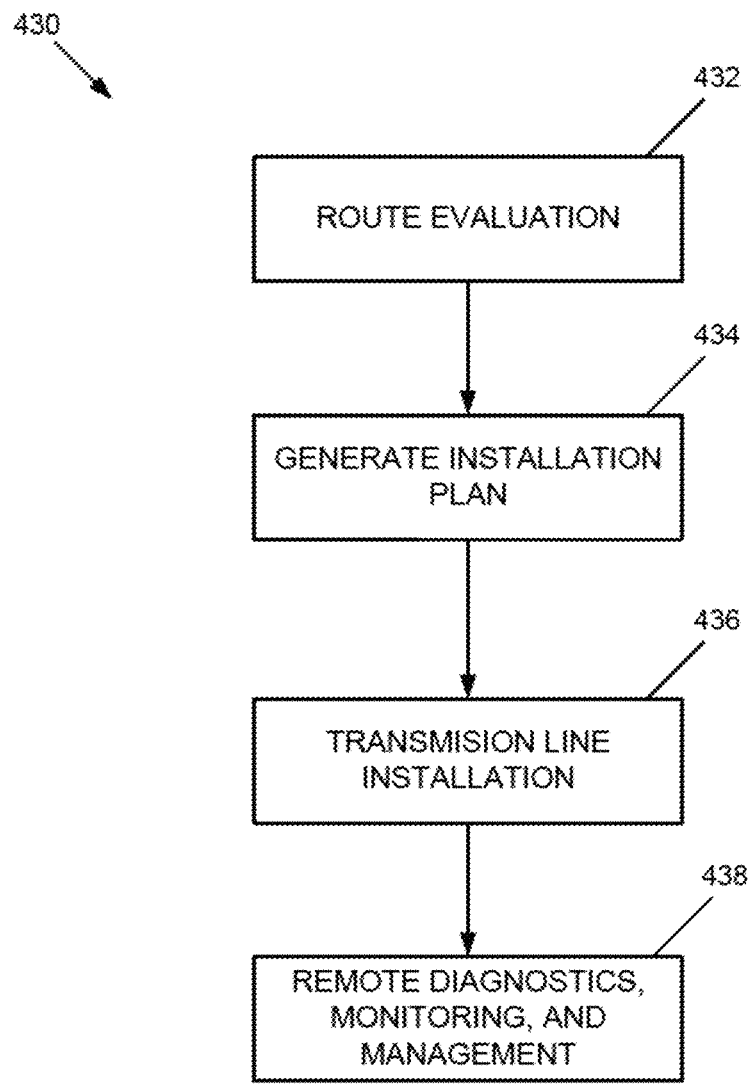
FIG. 22 is a flow chart illustrating an example method of installing a transmission line.

FIG. 22 is a flow chart illustrating an example method 430 of installing a transmission line 110. In this example the method 430 includes a route evaluation operation 432, an installation analysis and setup operation 434, a transmission line installation operation 436, and a remote diagnostics, monitoring, and management operation 438. Other embodiments can involve more or fewer than these operations.

The route evaluation operation 432 is performed to evaluate a route prior to transmission line installation. In some embodiments, the operation 432 involves separately characterizing a plurality of route segments, and then combining the characterizations of the multiple segments together to generate a full route characterization. Route evaluation can utilize one or more of a duct mapping device and a duct internal diameter profiling device, which can be passed through the duct to analyze the configuration and route of the duct. Examples of the route evaluation operation 432 and the duct mapping and duct internal diameter profiling devices are illustrated and described in further detail with reference to FIG. 23, and an example duct internal diameter profiling device is illustrated and described in further detail with reference to FIGS. 27-28.

The operation 434 is performed to generate a transmission line installation plan for installing a transmission line through the full route. In some embodiments, the installation plan is generated by separately determining segment installation plans for each segment of the route, and then combining the segment installation plans together to generate the full route transmission line installation plan. The installation plan includes operational settings for each component 113 of the transmission line installation system 100. An example of the setup operation 434 is illustrated and described in further detail with reference to FIG. 24.

The transmission line installation operation 436 is performed to install the transmission line 110 through the full route based on the transmission line installation plan. An example of the transmission line installation operation 436 is illustrated and described in further detail with reference to FIG. 25.

The operation 438 is provided to perform one or more of: remote diagnostics, monitoring, and management of the transmission line installation and transmission line installation system. In one example, the operation 438 provides remote technical assistance, to assist the installation technician(s) in troubleshooting an installation, or otherwise getting assistance from a remote computing device and, if needed, a remote technician. In another example, the operation 438 provides remote monitoring or management, such as to permit a supervisor or headquarters to control, manage, or monitor the transmission line installation and transmission line installation system 100.

Some embodiments include an installation monitoring and management system that can perform the operation 438. In some embodiments, the operation 438 is performed by the installation monitoring and management system comprising at least one processing device; and at least one computer readable storage device, storing data instructions, that when executed by the processing device, cause the processing device to perform one or more operations. One example of the system is a server computing device, or a computing device remote from the installation system 100. The program instructions can cause the processing device to do one or more of: manage installation resources including at least human installers and installation equipment by assigning the resources to projects, and tracking the locations of the resources; monitor and manage a transmission line installation system by communicating with the transmission line installation system across a data communication network to: receive installation status data from the transmission line installation system, the status data being provided in real time during the installation and providing updates on the status of installation of a transmission line through a duct; and send commands to the transmission line installation system to adjust the operation of the transmission line installation system; manage a project schedule; and perform historical analysis by saving data regarding prior transmission line installations, and using the data to predict resources and materials that will be needed for projects on the project schedule.

Figure 23:
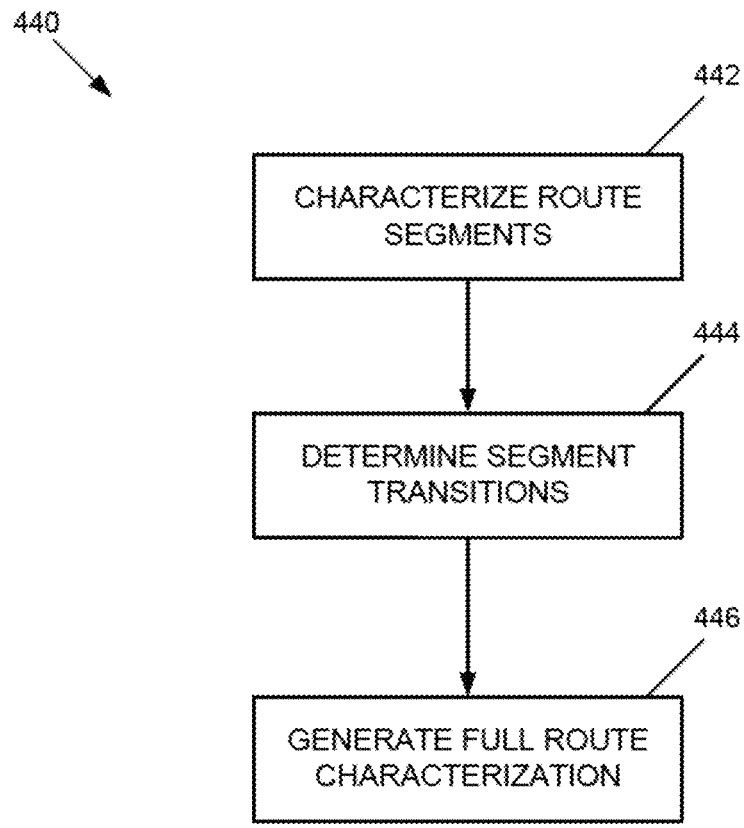
FIG. 23 is a flow chart illustrating an example method of characterizing a route from a plurality of route segments.

FIG. 23 is a flow chart illustrating an example method 440 of characterizing a route from a plurality of route segments. The method 440 is an example of the operation 432 shown in FIG. 22. In this example, the method 440 includes operations 442, 444, and 446. Other embodiments of method 440 can include more, fewer, or different operations than those of the example shown in FIG. 23.

Operation 442 is performed to characterize segments of the route. In other words, individual segments of the route are evaluated and characterized separately, to determine the characteristics of each segment. Route evaluation and characterization can be accomplished using the route evaluation system described herein, such as by passing a duct mapping device through each segment of the route, and collecting and storing the data defining the segment characteristics. The characteristics of each segment can be stored as three-dimensional map data, for example. A location of each of the start and end points of the segment can also be stored. The process is repeated for each segment.

An example of a route evaluation system that can perform the route evaluation and segment characterization is described in further detail in PCT Publication WO 2018/090043 (the '043 application), filed on Nov. 14, 2017 and in PCT Publication WO 2016/176467, filed on Apr. 28, 2016, the disclosures of which are hereby incorporated by reference in their entireties. As one example, a duct mapping device (such as the route evaluation device shown in FIG. 27 of the '043 application) is passed through the duct, and includes sensors (such as one or more of an accelerometer, gyroscope, global positioning system receiver, and the like (and may have multiple of these, such as one or more three-axis accelerometers), which map the movement and/or position of the duct mapping device as it moves through the duct D. A detailed three-dimensional map of the duct D route can then be generated, such as including a series of X, Y, and Z coordinates defining the position of the duct D at frequent intervals along the route. The route evaluation system can therefore generate a detailed route map defining the position and features of the duct D route along the full length of the duct.

In some embodiments the duct mapping device provides the route geometry including, for example, the degrees of bends, the radius of the bends, the cumulative amount of bends, whether a minimum bend radius of the cable is exceeded, and X, Y & Z GPS coordinates of the duct taken at certain intervals, such as at a sampling rate of 100 Hz intervals.

Other examples of duct mapping devices that can be utilized for route evaluation and segment characterization are the mapping tools available from Reduct NV, of Schelle, Belgium, including the ABM-30 gyro mapping tool, ABM-40 MEMS-based mapping probe, the ABM-80 and ABM-90 wheeled mapping tools, the DR-2 fiber optic gyroscope mapping probe, DR-3 mapping tool, and DR-4 multi-purpose pipeline mapping system.

Route evaluation and segment characterization can also be performed using a duct internal diameter (ID) profiling device. The duct ID profiling device can be passed through a duct or duct segment and can measure the shape and internal size of the duct. An example of the profiling device 480 is illustrated and described in further detail with reference to FIGS. 27-28.

In some embodiments the duct ID profiling device is separate from the duct mapping device. In other embodiments, the duct ID profiling device is part of the duct mapping device. In yet another embodiment, the duct mapping device and duct ID proofing device can be physically connected together (e.g., end-to-end), so that they can analyze the duct simultaneously in a single pass through the duct or duct segment.

Operation 444 is then performed in some embodiments to determine segment transitions. This can include, for example, prompting a user to input details regarding a type of transition that will be used to connect the end of a segment to the start of the next segment. FIGS. 1 and 2 illustrate two different types of segment transitions. For example, FIG. 1 shows a direct transition where the line blower 118 is positioned in the hand hole, and the end of one duct segment is connected directly to the line blower 118, with the starting of the other duct segment being connected directly to the other end of the line blower 118. In this example, the transition does not add a substantial additional distance to the full route. FIG. 2 shows a slack loop transition in which a slack loop is positioned within the transition, and the line blower 118 is positioned outside of the hand hole. In this example, the slack loop intentionally adds length to the route, which must be accounted for in determining the full route. Additionally, the slack loop also adds bends and inclines to the route that also need to be accounted for. Other transitions are also possible.

Therefore, once the transition has been identified, the operation 444 also characterizes the transition, such as determining a length of the transition, and other route characteristics through the transition. Different transitions can be defined between adjacent route segments, preferably matching the actual physical configuration of the route (or an estimate thereof) that will be used for the transmission line installation.

Operation 446 is then performed to generate the full route characterization. In some embodiments the operation 446 includes combining the characteristics of the multiple segments together (e.g., end to end) to generate the full route characterization. In some embodiments, the transitions are also combined with the segments, to insert the transition between two respective segments and define how the transmission line will move from the end of the one segment and into the start of the next segment. In some embodiments the result of operation 446 is to generate a single three-dimensional map including map data that defines the full route, including the route of each segment, and the transitions between the segments. The full route characterization can then be stored in a computer-readable storage device.

In some embodiments the method 440 also includes determining duct specifications. Determining duct specifications can be performed by prompting a user to input specifications of the duct, such as dimensions, materials, and features (e.g., ribbed or non-ribbed) of the duct, or by identifying a type of duct from a list and retrieving the specifications from a database. Further examples of duct specifications include the inner diameter, the amplitude of undulations, the period of undulations, and a coefficient of dynamic friction ($\mu$) of the inner surface of the duct.

If segments have different types of ducts, then separate duct specifications can be identified for each segment. The duct specifications can also be stored as part of the full route characterization.

Figure 24:
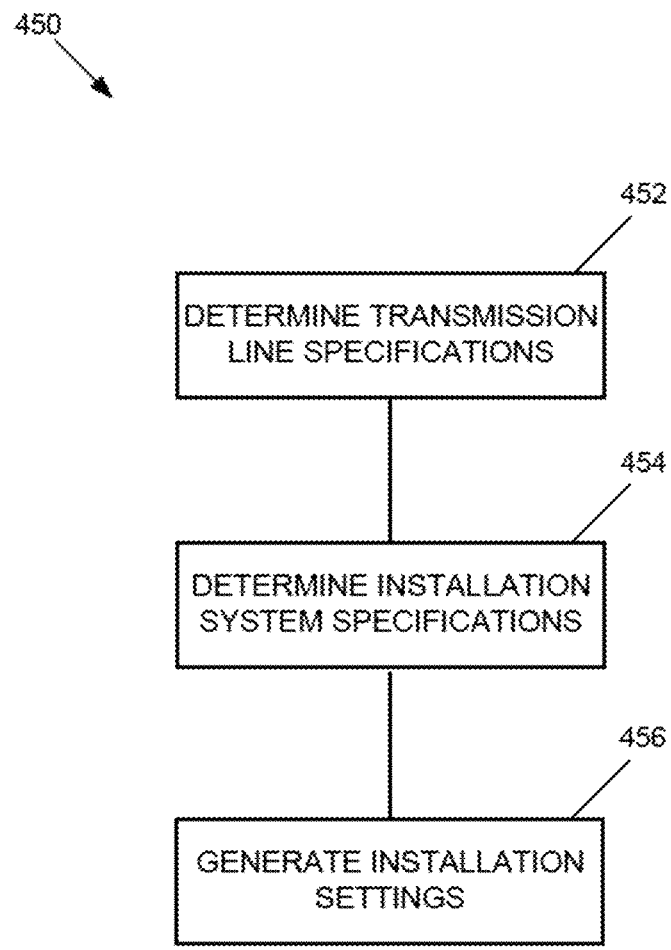
FIG. 24 is a flow chart illustrating a method of generating a transmission line installation plan.

FIG. 24 is a flow chart illustrating a method 450 of generating a transmission line installation plan. The method 450 is an example of the operation 434, shown in FIG. 22. In this example, the operation 434 includes operations 452, 454, and 456.

The operation 452 is performed to determine transmission line specifications. Similar to the duct specification determination discussed herein, the operation 452 is performed to determine the specifications of the transmission line that is to be installed into the duct.

The transmission line specifications are defined by data describing certain specifications of the transmission line that are relevant to the installation process. In some embodiments a user is prompted to manually provide the transmission line specifications. In other embodiments, the system prompts the user to provide or select a type or other information about the transmission line, such as a manufacturer's name and a model number of the transmission line (such as from a drop down menu or otherwise). A database containing transmission line specifications is then queried to automatically retrieve the transmission line specifications from the database for the identified duct.

Examples of transmission line specifications include the transmission line specific weight, the transmission line stiffness, and the transmission line outer diameter.

The operation 454 is performed to determine installation system specifications. For example, the operation 454 can determine what components 113 are included in the specific implementation of the transmission line installation system 100, and specifications and capabilities of those components. For example, if the air compressor 114 is being used, the operation 454 can determine the maximum pressure that the air compressor 114 can generate. If the line blower 118 is being used, the operation 454 can determine specifications and capabilities of the line blower 118 such as a maximum speed and a maximum drive force. Any other specifications and capabilities of the transmission line installation system described herein can be similarly determined.

The operation 456 is performed to generate the transmission line installation plan. The installation plan defines the settings and operating parameters that will be used to control and operate the transmission line installation system 100 throughout the process of installing the transmission line through the full route. The operation 526 utilizes at least some of the information gathered about the installation, such as the duct route characteristics, the duct specifications, the transmission line specifications, and the transmission line installation system specifications to generate the installation plan.

In some embodiments the installation plan defines the overall plan for the installation, such as the desired speed of the transmission line throughout the length of the route, the desired blower pressures to be used, and the like. The plan can include details such as an anticipated rate of acceleration of the transmission line at the start of the installation, and an anticipated deceleration of the transmission line at the end (or other points along the length) of the route. The installation plan can then be used, for example, to generate and distribute component-level instructions, such as by the global controller, to instruct each individual component during the installation process. In another possible embodiment, the installation plan can include the component-level instructions. In some embodiments the component-level instructions are distributed to each component prior to installation, so that each component contains its portion of the plan and can operate independently to execute the component-level installation plan unless or until changes are needed, such as due to a deviation being detected during the installation.

Once the transmission line installation plan is generated, it can be stored in a computer-readable storage device, and can be transmitted to or retrieved by the transmission line installation system 100 in advance of the installation, such as by downloading or storing the transmission line installation plan at the control unit 120 or global controller 121, which in turn can in some embodiments distribute part or all of the plan to local controllers of the components of the system 100.

In some embodiments, the transmission line installation plan is generated by first generating an installation plan for each segment of the route. To do so, the segment characterization is analyzed for each segment, and segment installation plans are generated that define preferred installation settings and operational parameters for each segment based on the segment characterization.

Transition installation plans are also generated that define the preferred installation settings and operational parameters to advance the transmission line through each transition between adjacent segments of the route.

The full route installation plan is generated by combining the individual segment installation plans, and in some embodiments, by further combining the transition installation plans. The process can include further adjustments to bridge between each segment or transition, such as to match starting and ending speeds. In some embodiments an iterative process is used, such that the settings at the end of one segment are used as the settings for the start of the next segment.

Part of generating the transmission line installation plan is predicting whether the installation will be successful. In some embodiments the user is alerted if it is predicted that the installation cannot be completed successfully. In some embodiments the installation plan will not be generated if settings resulting in a predicted successful installation cannot be identified.

Figure 25:
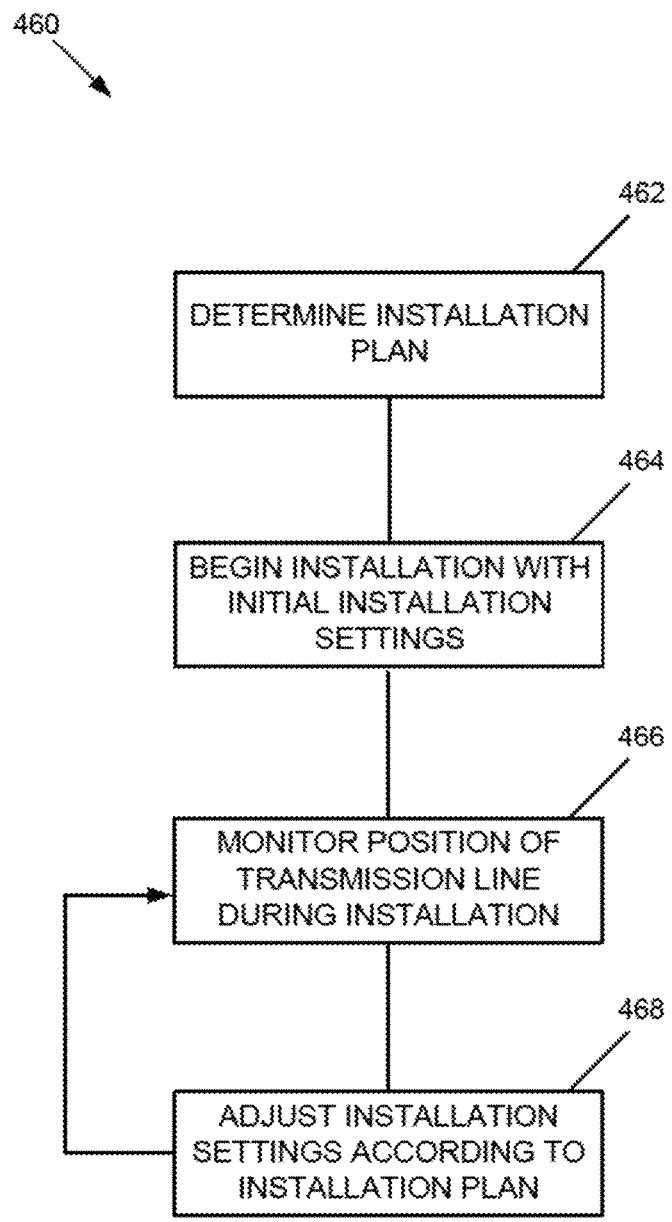
FIG. 25 is a flow chart illustrating an example method of installing a transmission line according to the transmission line installation plan.

FIG. 25 is a flow chart illustrating an example method 460 of installing a transmission line according to the transmission line installation plan. The method 460 is an example of the operation 436, shown in FIG. 22. In this example, the method 460 includes operations 462, 464, 466, and 468.

Operation 462 is performed to determine the installation plan. In some embodiments the installation plan is downloaded, input, provided, or otherwise communicated to the transmission line installation system 100, such as from the route evaluation system, or another computing device. The installation plan may be stored and loaded as a data file, or could be manually or otherwise input or transferred into the control unit 120 or global controller 121, for example.

The operation 464 is performed to begin installation of the transmission line using the initial installation settings defined in the installation plan. The installation plan defines initial settings for the installation, and the operation 464 begins the installation using those settings.

The operation 466 is then performed to monitor the position of the leading end of the transmission line during the installation. In some embodiments the position is monitored as a length along the length of the route. In another example, the position is monitored as a percentage of completion. As a further example, the position can be a two- or three-dimensional location, such as a GPS location, which can be determined for example based on the length of the transmission line that has been installed and the known route of the duct.

The operation 468 is performed to adjust the installation settings according to the installation plan. For example, as the leading end of the transmission line nears the next leg of the duct, the installation settings are adjusted in preparation for the transmission line to enter that next leg.

The process continues by repeating operations 466 and 468 until the installation has been completed through the full route of the duct, including through each segment and through each transition between the segments.

Further, some embodiments also include a feedback operation in which components throughout the system 100 can provide feedback on the status of the installation. If a variance is detected by one or more components, the variance can be communicated to the control unit 120, global controller 121, or to each component 113, to permit adjustments to be made. For example, if it is determined that the leading edge of the transmission line has slowed down from the speed defined by the installation plan for the current installation position, then the current speed can be communicated to cause the other components to reduce their speed to match the current speed. In this way the components are synchronized to work together to complete the installation. As mentioned above, artificial intelligence and machine learning may be utilized in one or more steps of the method 460.

Figure 26:
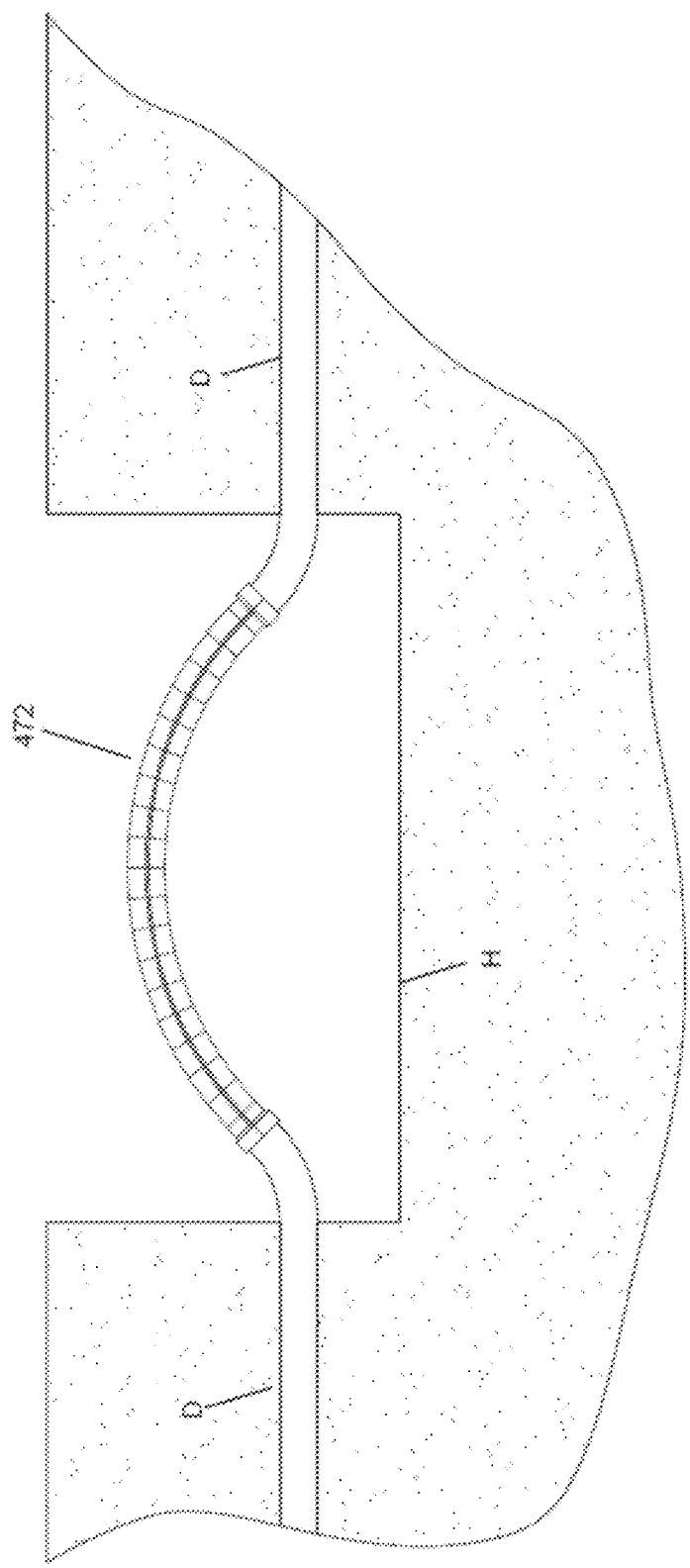
FIG. 26 illustrates an example flexible split pipe.

FIG. 26 illustrates a schematic side view of an example flexible split pipe 472 being used to connect two duct D segments together at a hand hole H.

In some duct routes an intermediate hand hole H may be positioned along a full length of a route. Due to the ability to install transmission lines at greater lengths using the transmission line installation system 100 described herein, it may be determined that the transmission line installation does not need to utilize additional equipment (e.g., components 113) at that location. The flexible split pipe 472 can therefore be used to couple the ends of the two duct D segments together to form a continuous passageway through the hand hole H, allowing and guiding the transmission line 110 and pressurized air to pass therethrough during the transmission line installation.

In some embodiments the flexible split pipe 472 is formed of a deformable material that allows it to be bent or shaped into a configuration that exceeds the minimum bend radius of the transmission line 110. The pipe 472 is split down its length for easy removal. The flexible split pipe 472 forms an air tight conduit that prevents the pressurized air from escaping, and directs the air from one duct segment into the other duct segment. The flexible split pipe 472 includes a slit along its length that can be opened and closed. A slit connector extending along the slit securely fastens the edges together during installation of a transmission line, the split pipe 472 forming an air tight coupling. Examples of the slit connector include a resealable (e.g. ziplock-type) joint, a zipper, and an adhesive. Other types of fasteners can be used, or combinations of fasteners, such as snaps, latches, straps, tape, double-sided tape, etc. After installation is completed, the slit connector can be released to open the slit so that the transmission line can slide out through the opening. The flexible split pipe 472 can be secured to ends of the duct D segments using couplers, such as pipe couplers to form an air tight seal between the pipe 472 and the duct D.

Figure 27:
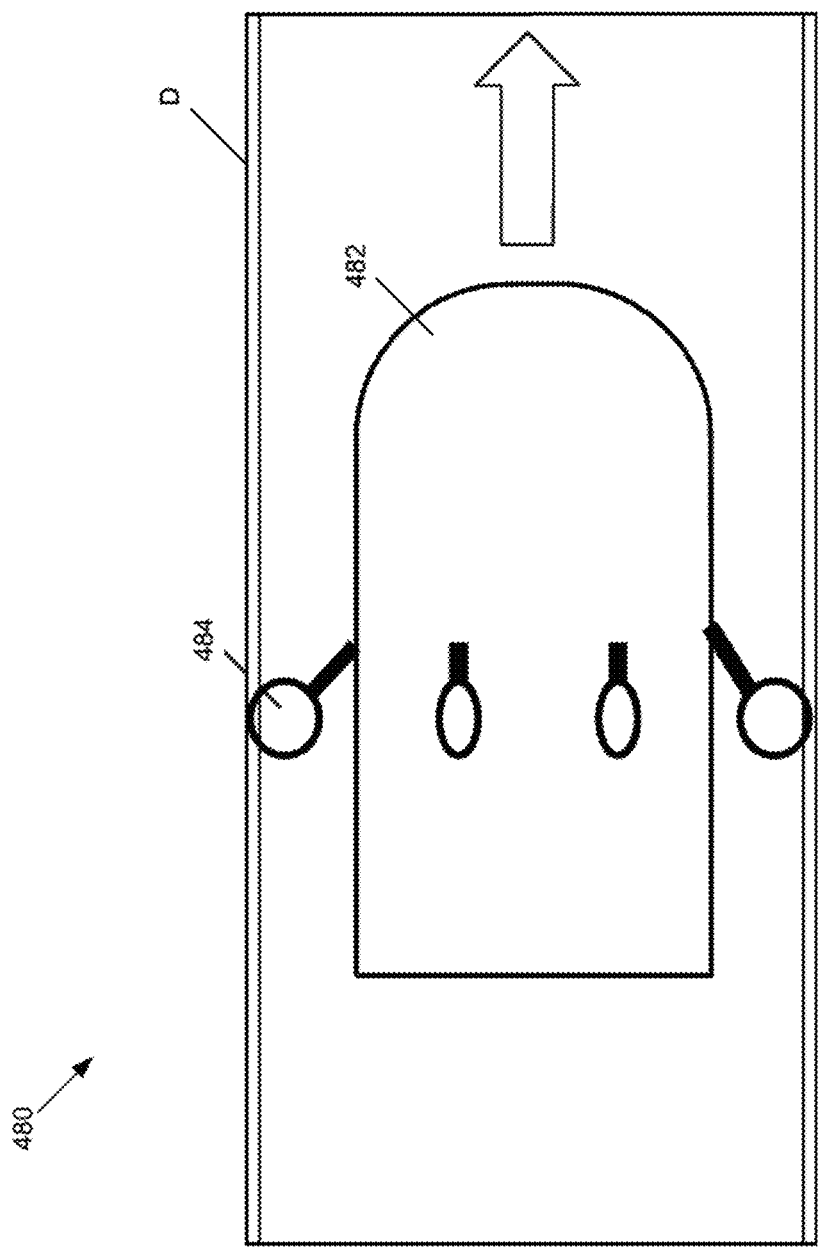
FIG. 27 is a schematic side view of a duct inner diameter profiling device.
Figure 28:
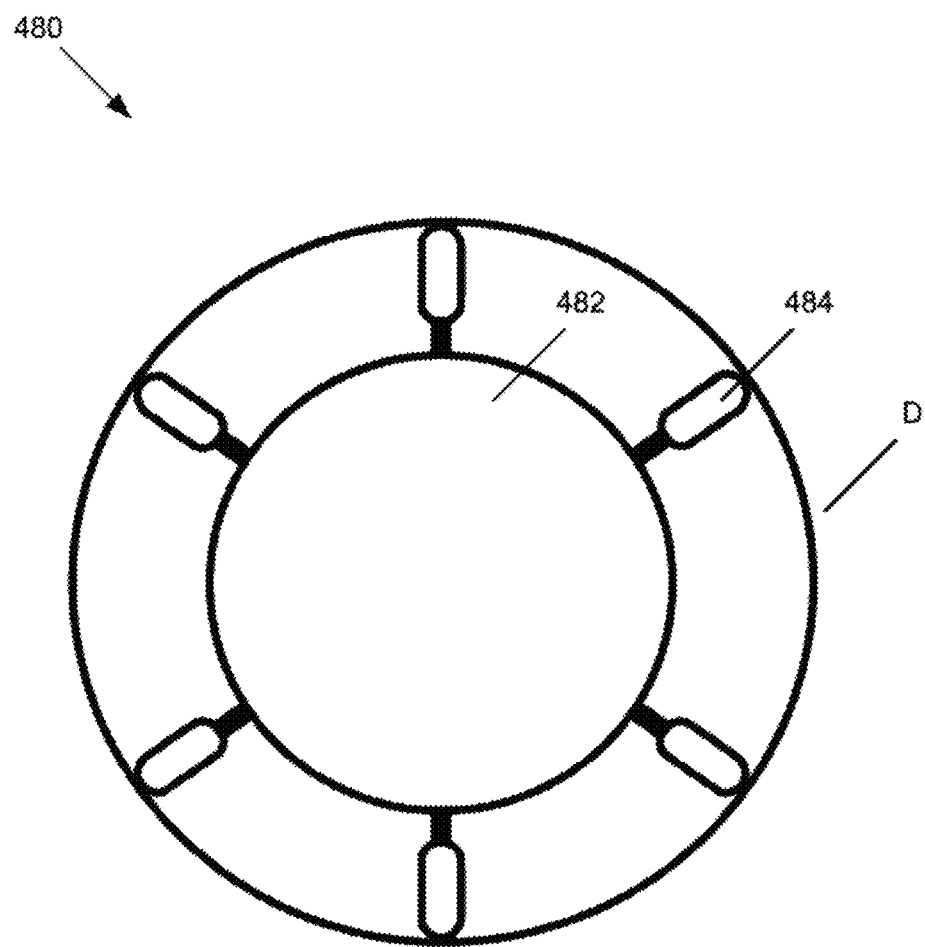
FIG. 28 is a front elevational view of the duct inner diameter profiling device shown in FIG. 27.

FIGS. 27-28 illustrate an example duct internal diameter (ID) profiling device 480. FIG. 27 is a schematic side view of the duct D and duct ID profiling device 480 and FIG. 28 is a front elevational view.

The route evaluation operation 432 described with reference to FIG. 22 (and the route segment characterization operation 442) can involve the use of the duct ID profiling device 480, which can be passed through the duct to analyze the interior of the duct D.

In one example, the duct ID profiling device 480 includes a body 482 and a plurality of articulating projections 484 that extend outward from the body 482. Examples of the projections 484 are fingers or other deflectable pins.

The profiling device 480 is passed through the duct D, such as by blowing or pulling, and as it passes through the duct D, the articulating projections 484 interact with the interior surface of the duct D, such as to measure the shape and/or size of the interior of the duct at that location.

The articulating projections 484 are at least initially extended, and slide or roll along the interior surface of the duct D. As the profiling device 480 moves through the duct, if the shape or size of the interior passageway within the duct changes (such as due to a portion of the duct being crushed, kinked, or due to the presence of an obstruction in the duct, a point impacted by a rock, or other duct deflections or deformations), the projections 484 are pressed down as a result of contact with the duct or obstruction. The duct ID profiling device 480 can therefore be used to determine the minimum inner diameter of the duct, and accordingly to determine the maximum outer diameter (OD) of cable (fill ratio) that can pass through a defective duct without binding up in the duct.

In one example embodiment, the duct ID profiling device 480 is a mechanical device, in which the articulating projections 484 are initially extended. When the mechanical device is passed through the duct, the duct or obstructions press down on the articulating projections 484, which then lock in an at least partially depressed position. Then, after the profiling device 480 is removed, a measurement can be taken across the device 480 (e.g. to measure the outer diameter across the outer edges of the articulating projections 484) to determine the minimum internal diameter of the duct D throughout the duct D or segment of the duct. The articulating projections 484 are then reset to their extended position before the next use.

In another possible embodiment, the duct ID profiling device 480 includes electronics including one or more sensors. In this example, the articulating projections 484 are coupled to the one or more sensors, such as a potentiometer or other sensors that detect and measure the movement of the articulating projections 484. Measurements can be taken and recorded at regular intervals within the duct, to measure both the size and shape of the duct as the profiling device 480 moves through the duct. The measurements can then be analyzed and combined with the route data (e.g., the three-dimensional map data) to provide an accurate picture of both the route, size, and any obstructions or deformation present within the duct. This information can then be analyzed in developing the transmission line installation plan.

The duct ID profiling device 480 can also be a duct ID proofing device. As a proofing device, the device 480 can be used to determine whether the duct route is contiguous and clear of obstructions. The device 480 can therefore function as a proofing device by passing it through the duct D and determining whether it successfully arrives at the other end. If so, the measurements can be used to determine the maximum OD of a transmission line that is likely to be able to be passed through the duct D.

Figure 29:
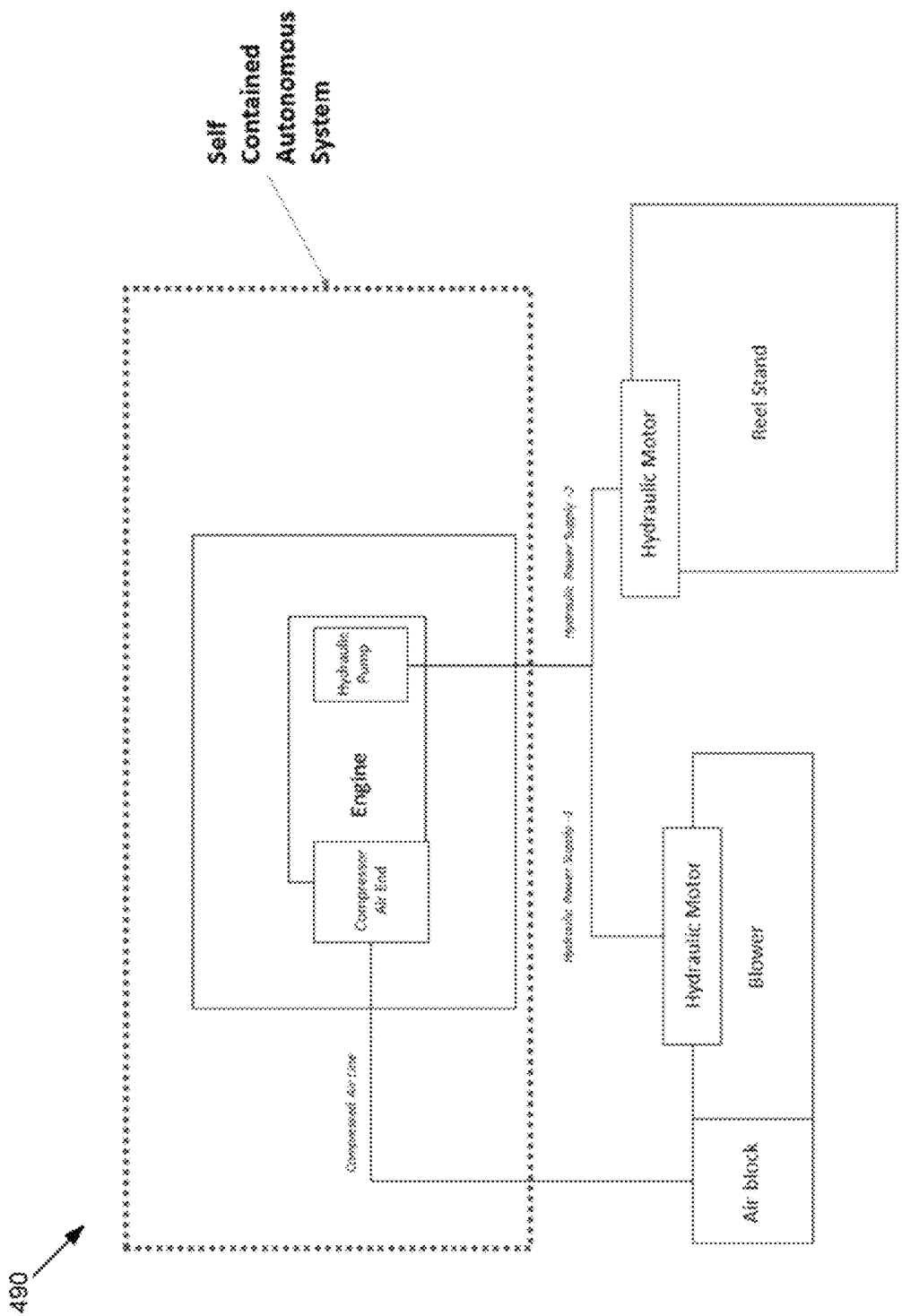
FIG. 29 is a schematic diagram illustrating an example power system.

FIG. 29 is a schematic diagram illustrating an example power system 490. The power system 490 includes multiple power sources within a single device or housing. The power system 490 reduces the number of components that need to be transported and setup at an installation site, for example.

In some embodiments the power system 490 is a self-contained autonomous system that is fully integrated with fluid compressor apparatus for supplying compressed air to the blowing equipment and also provides a power source for hydraulically operated systems.

The power system 490 can be used to provide power to various components that need compressed air or hydraulics for operation, such as a line blower and a motorized reel stand.

In some embodiments, the system 490 comprises a plurality of sub-systems including one or more of: a fluid compressing unit, a hydraulic pump, an auxiliary motor, a control unit, and an input signal and receiving module.

In some embodiments the system has a monitoring unit to receive feedback signal indicating rotational speed of motors, fluid pressure signal and flow signal indications to calculate push force exerted.

One example of the system 490 is illustrated in FIG. 29, which illustrates an example system 490 supplying power to a reel stand and line blower. In this example, the system 490 includes an engine, air compressor, and hydraulic pump. Further, some embodiments include a controller, which may be a local controller or the control unit 120 or global controller 121. The controller controls at least the system 490, communicates with other components of the system 100, and synchronizes the operation of the system 490 with other system 100 components 113.

Some embodiments of system 490 further include an air modifier, for modifying the compressed air before delivery to the line blower. Examples of various possible air modifiers are discussed herein.

Examples of the transmission line installation system 100 described herein can be operated with varying degrees of human involvement. In some embodiments, certain operations of the transmission line installation process are automatically performed, without requiring human involvement to initiate or perform the operations. For example, because components 113 (including the control unit 120) can bi-directionally communicate with each other, the control unit 120/global controller 121 can control the other components 113 and receive feedback from the components, so that the installation can proceed according to the installation plan without requiring humans to communicate and manually adjust the operation of such components. In other possible embodiments, other control structures/modes are also possible, such as peer-to-peer communication, in which components cooperate to accomplish the installation plan, and share data and bi-directionally communicate to synchronize their operations. Some embodiments operate autonomously, such that once the installation plan is determined and installation begins, the installation can proceed without direct human control of the system 100 or components 113. Other embodiments involves human interaction for certain operations. Such operations are manual operations in which a human is directly involved in the operation, such as to initiate the operation; select or adjust settings for the operation while the installation is underway; manually grasp, move, guide, or manipulate the components, the transmission line, or control interfaces of the system 100, components 113, or transmission line 110.

In certain embodiments, the transmission line installation system 100 utilizes bidirectional communication between components 113 (including the control unit 120/global controller 121). In some embodiments the communication occurs in real-time. Real-time communication involves communications that take place during the transmission line installation process. In some embodiments the real-time communication allows the components to remain synchronized, by receiving data and adjusting operations based on the data. Real-time is not instantaneous, and requires some amount of time for detecting or generating, processing, transmitting, and receiving the data. In some embodiments the real-time communication of data occurs in less than 10 seconds, 5 seconds, or 1 second from the time that a sensor has taken a measurement or from the time that the data has been generated, for example.

As used herein, the term hand hole is used to refer to a location where a junction between two adjacent duct segments can be accessed. The term applies equally to other types of access locations, such as manholes, above ground enclosures, and the like.

Although the present disclosure refers to examples of transmission line installation systems, the hardware, methods, principles, and concepts can also be used in other systems and implementations. For example, in some embodiments are directed to an installation system. One example of an installation system is a transmission line installation system. Other examples of installation systems and other suitable applications include a conduit installation system, for installing a duct or other conduit, a microtrenching system, a horizontal directional drilling system, a power cable pulling system, a cable plowing system, and a pipe locating system. The installation system includes a plurality of components, each of which includes at least a local controller configured to interact with the component, and a communication device configured to communicate with a control unit 120 and/or local controllers 160 of other components 113.

Figure 30:
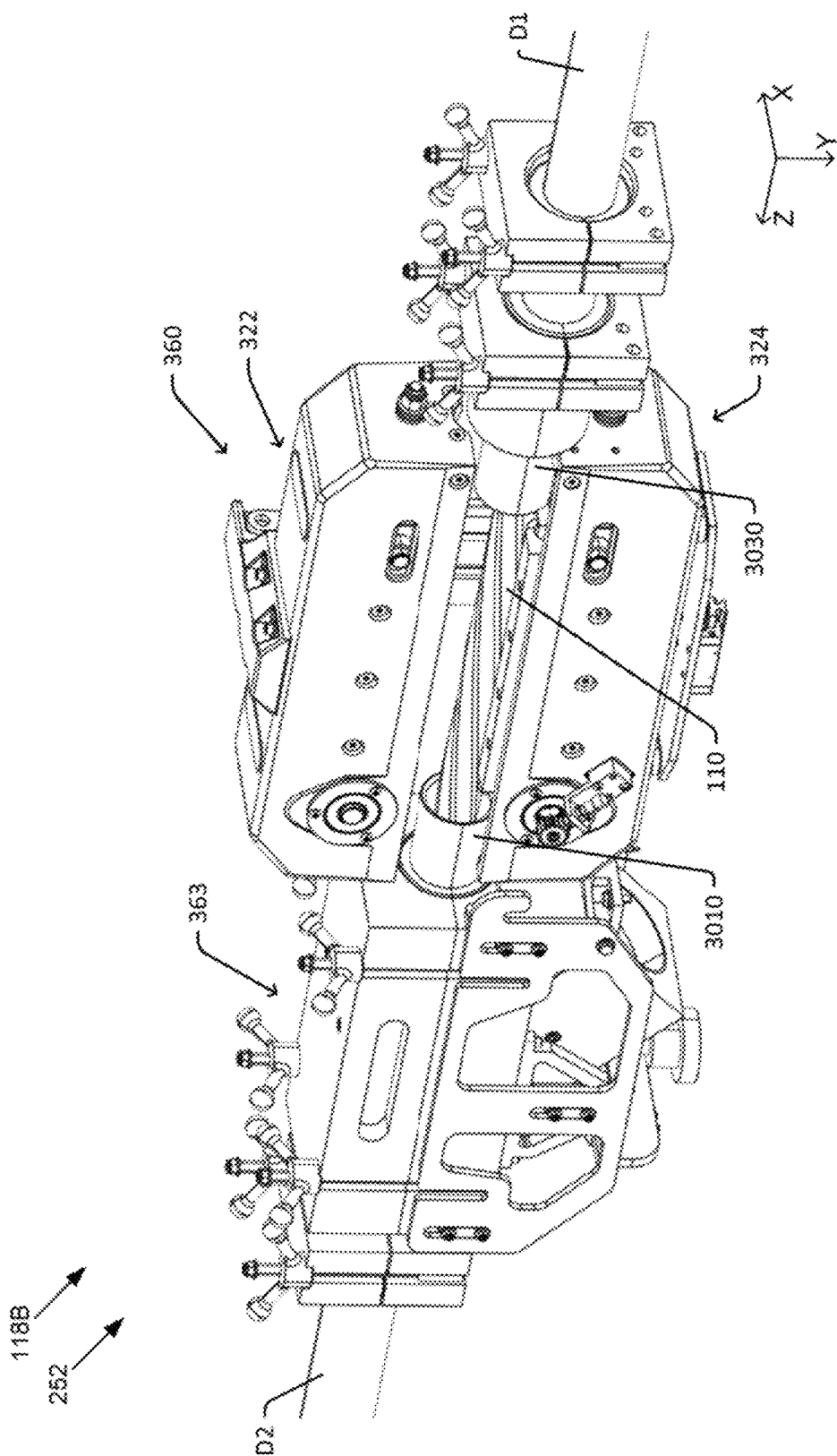
FIG. 30 is a side perspective illustrating another example line blower.
Figure 31:
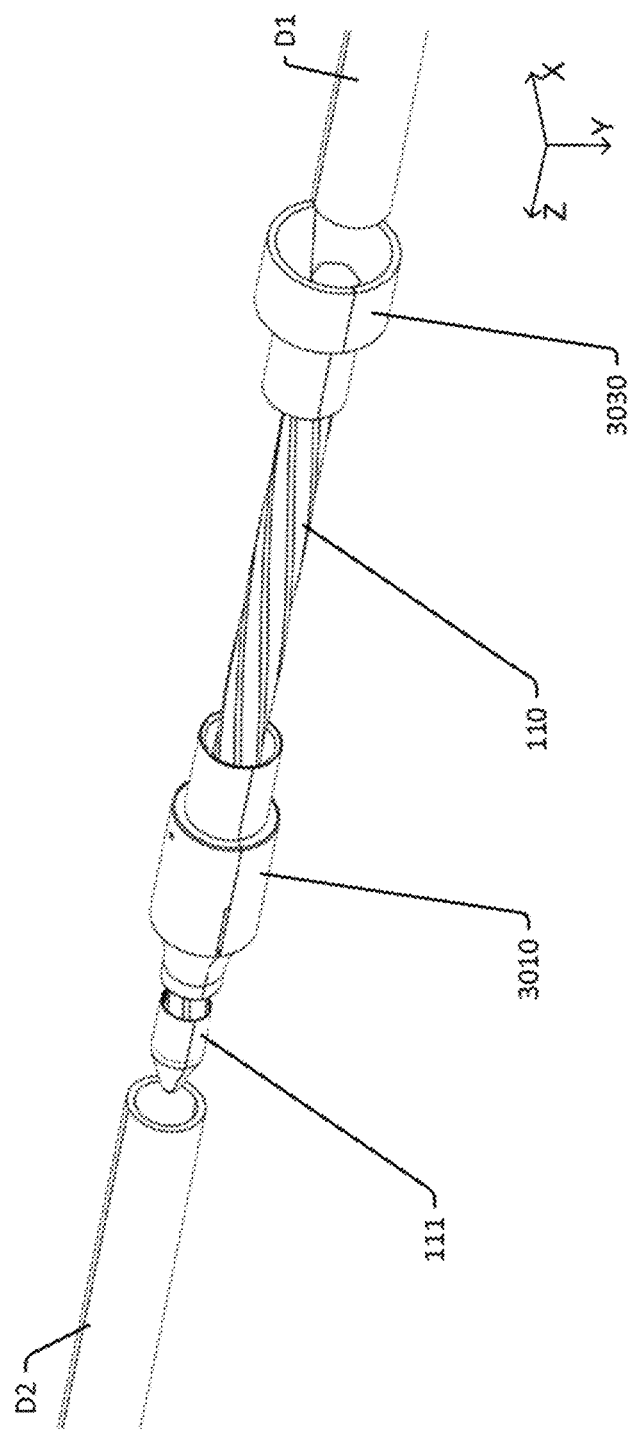
FIG. 31 is a side perspective view of a blower lead in guide structure, an air block lead in guide structure, a duct segment D1, a duct segment D2, and a transmission line of FIG. 30.
Figure 32:
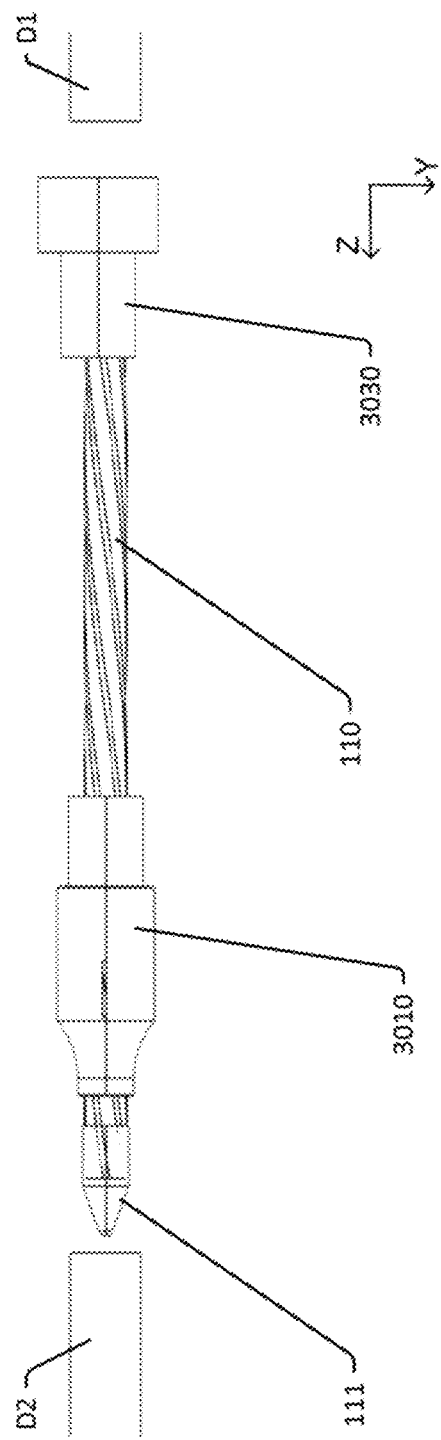
FIG. 32 is a side view of the blower lead in guide structure, the air block lead in guide structure, the duct segment D1, the duct segment D2, and the transmission line of FIG. 30.
Figure 36:
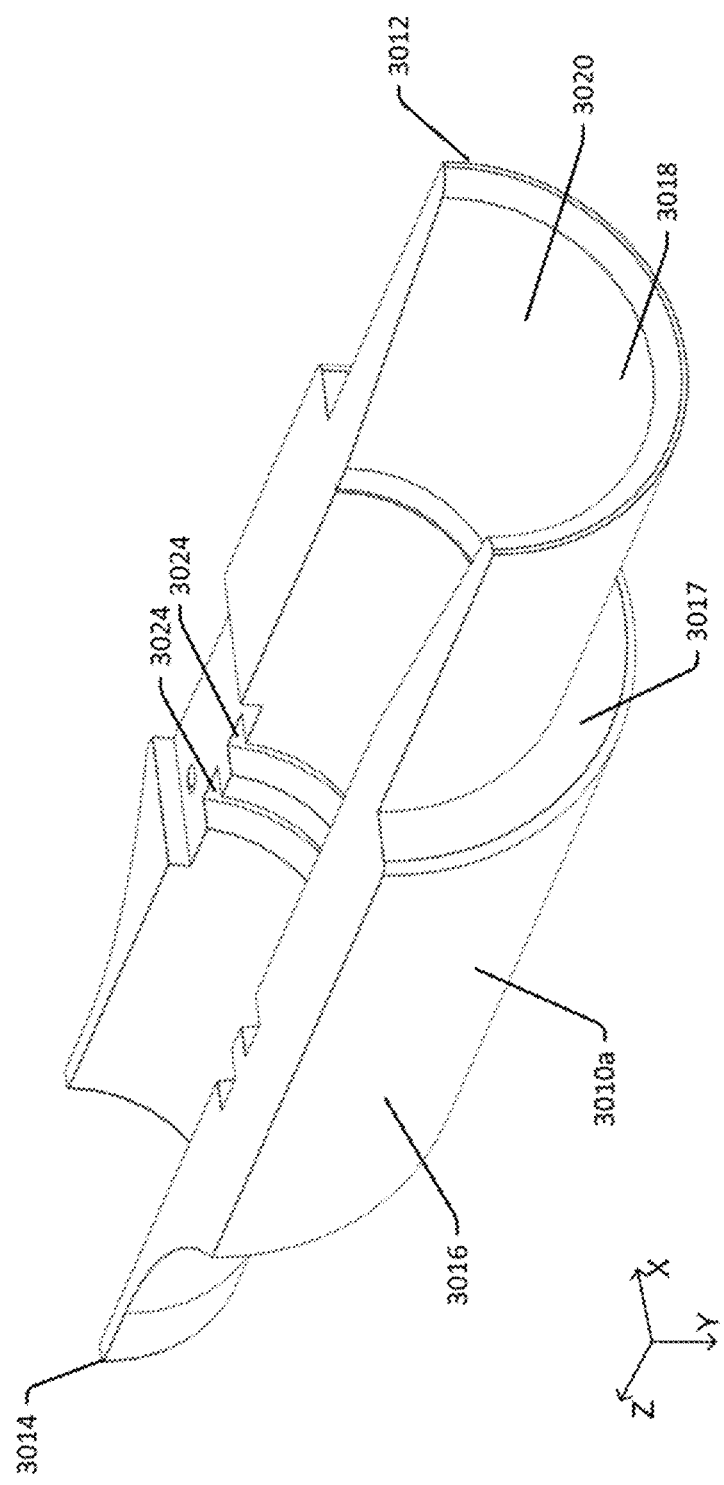
FIG. 36 is a side perspective view of the lower half of the air block lead in guide structure of FIG. 30.
Figure 37:
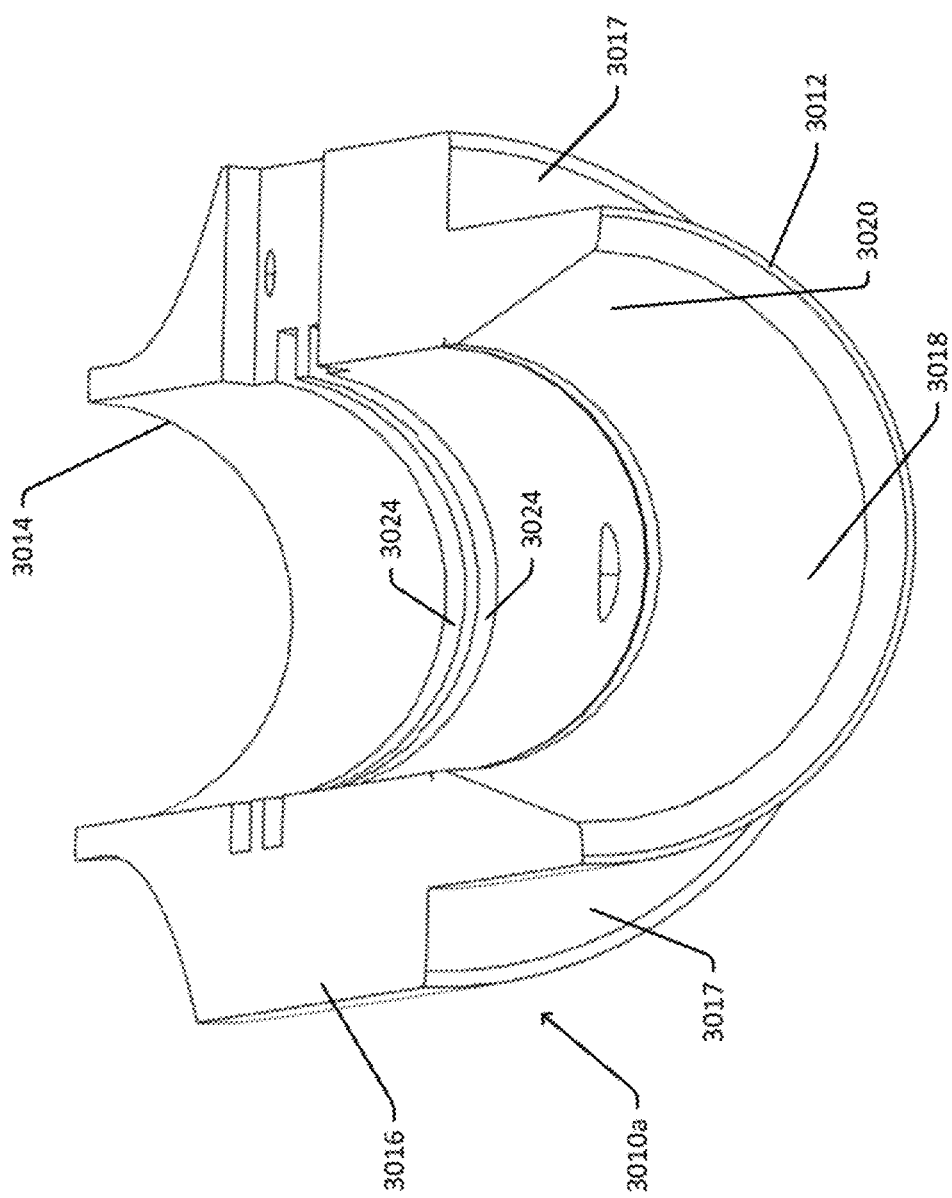
FIG. 37 is a front perspective view of the lower half of the air block lead in guide structure of FIG. 30.
Figure 38:
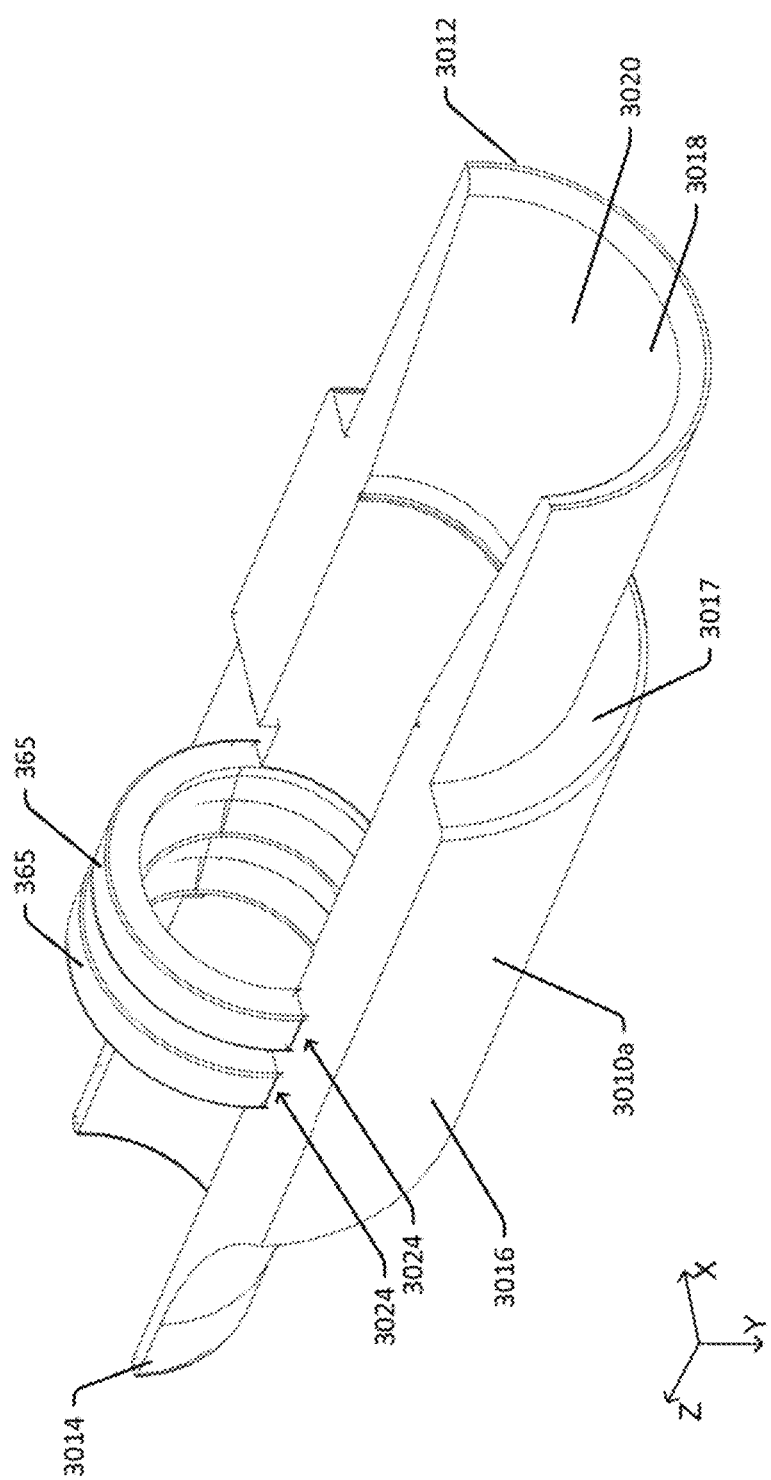
FIG. 38 is another side perspective view illustrating a portion of the air block lead in guide structure of FIG. 30, and further illustrating two seals.
Figure 39:
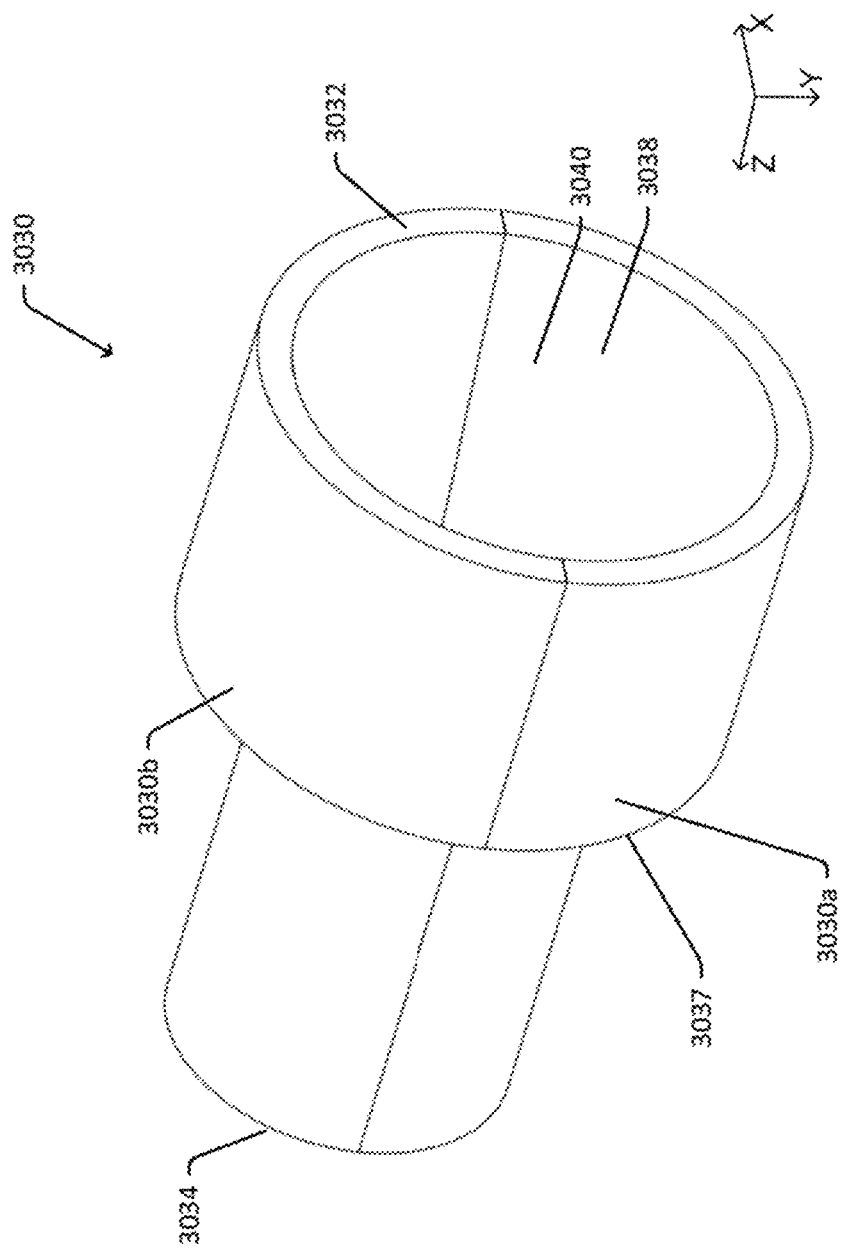
FIG. 39 is a side perspective view of the blower lead in guide structure of FIG. 30.
Figure 40:
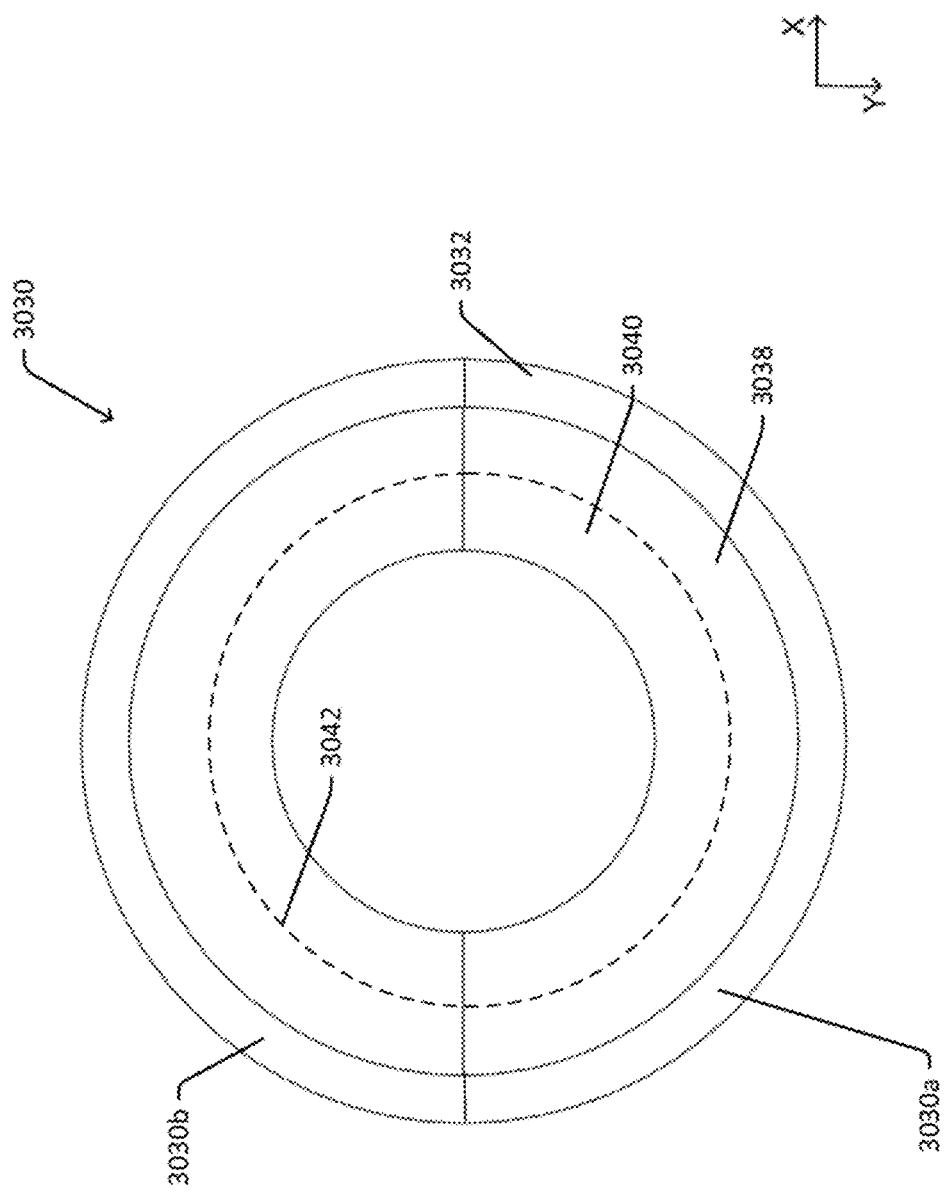
FIG. 40 is a front view of the blower lead in guide structure of FIG. 30.

As mentioned above, FIGS. 30-40 illustrate another embodiment of the line blower 118B. In general, in the embodiment of FIGS. 30-40, the line blower 118B includes, among other things, a blower lead in guide structure 3030 and an air block lead in guide structure 3010, which facilitate the automated feed-in of the transmission line 110. In one embodiment, the air block lead in guide structure 3010 is a venturi lead in guide structure. Specifically, FIGS. 30-32 illustrate the line blower 118B and the relationship between the blower lead in guide structure 3030 and the air block lead in guide structure 3010. FIGS. 33-37 illustrate the air block lead in guide structure 3010 and a lower half thereof. FIGS. 38-40 illustrate the blower lead in guide structure 3030.

FIG. 30 is a side perspective illustrating the example line blower 118B. Particularly, the line blower 118B in this example is located between two duct segments D1 and D2 extending in the Z direction, though the line blower 118B may also be used in other situations or locations. The line blower 118B includes, among other things, a cable drive assembly 360 and an air block 363. The cable drive assembly 360 further includes an upper tractor drive 322 and a lower tractor drive 324. As structures and functions of the cable drive assembly 360 and the air block 363 have been described in detail above with reference to FIGS. 8-11, identical structures and functions are not repeated for simplicity.

In general, the transmission line 110 advances, approximately in the Z direction, through the duct segment D1 and enters the cable drive assembly 360 through the blower lead in guide structure 3030. A pushing force is generated by frictional engagement of the transmission line 110 with the cable drive assembly 360. The transmission line 110 then enters the air block 363 through the air block lead in guide structure 3010. Eventually the transmission line 110 enters the duct segment D2 and continues advancing, approximately in the Z direction.

As will be described below, both the blower lead in guide structure 3030 and the air block lead in guide structure 3010 have a tapered (funnel-shaped) cross-sectional shape that is larger at the front and decreases in size toward the end. In other words, the tapered cross-sectional shape is facing the advancement direction of the transmission line 110. Therefore, the blower lead in guide structure 3030 and the air block lead in guide structure 3010 guide the leading end of the transmission line 110 toward the cable drive assembly 360 and the air block 363, respectively.

Due to the tapered cross-sectional shape of the blower lead in guide structure 3030 and the air block lead in guide structure 3010, the transmission line 110 may be fed in the cable drive assembly 360 and the air block 363 smoothly without manual intervention, thus reducing the risk of damaging structures such as the transmission line 110 itself, the transmission line input aperture 367 of FIG. 12, and seals inside the air block 363, and so on. The guide system composed of the blower lead in guide structure 3030 and the air block lead in guide structure 3010 may further improve the overall performance of a transmission line installation system 100 with multiple line blowers, as shown in FIGS. 1 and 2.

FIG. 31 is a side perspective view of the blower lead in guide structure 3030, the air block lead in guide structure 3010, the duct segment D1, the duct segment D2, and the transmission line 110. FIG. 32 is a side view of the blower lead in guide structure 3030, the air block lead in guide structure 3010, the duct segment D1, the duct segment D2, and the transmission line 110. A cable guide cone 111 is attached to the leading end of the transmission line 110. In the example shown in FIG. 31 and FIG. 32, the cable guide cone 111 has a cone shape, although other streamlined shapes are within the scope of the disclosure. The cable guide cone 111 may not only lower the friction drag between the transmission line 110 and the air but also protect the leading end of the transmission line 110 from damages. It should be noted that only a portion of the transmission line 110 is illustrated in FIGS. 31 and 32 for clarity so that details of the blower lead in guide structure 3030 can be easily seen. In other words, a portion of the transmission line 110 that goes through the blower lead in guide structure 3030 is not illustrated in FIGS. 31 and 32.

Figure 33:
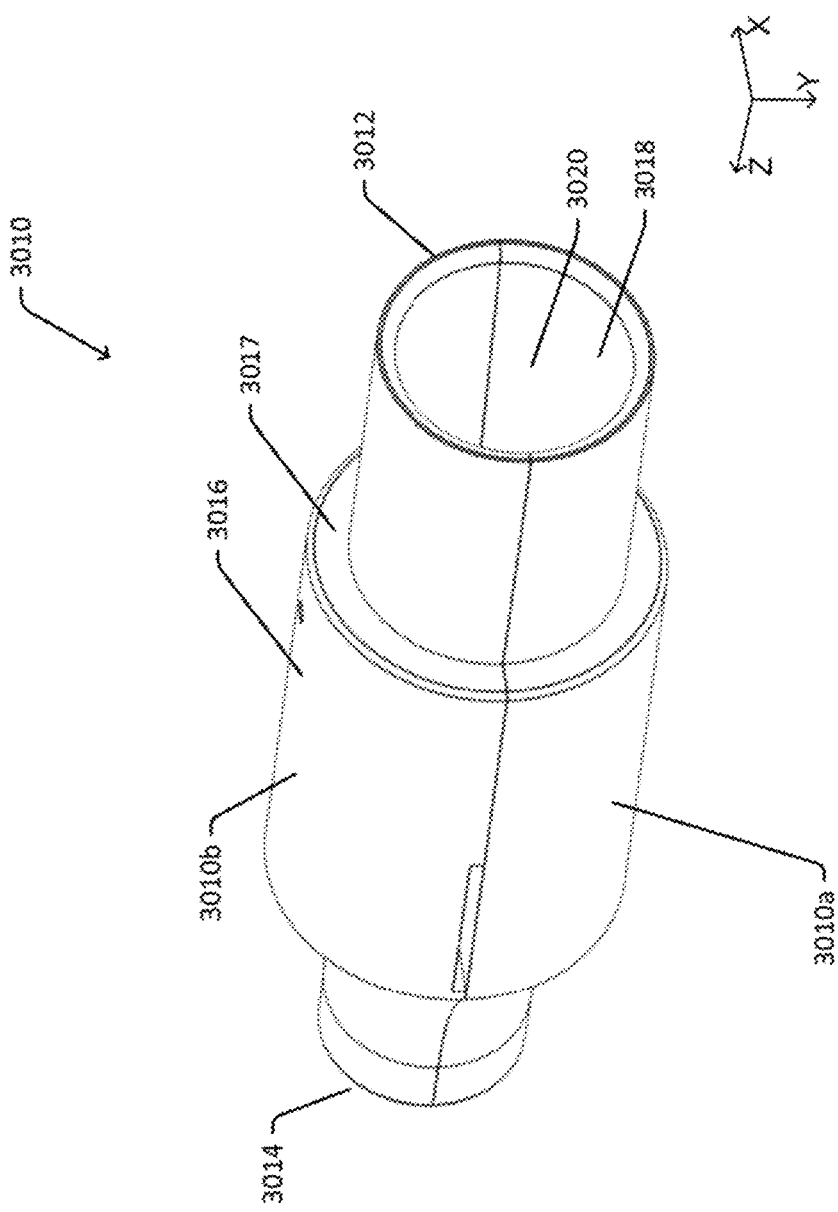
FIG. 33 is a side perspective view of the air block lead in guide structure of FIG. 30.
Figure 34:
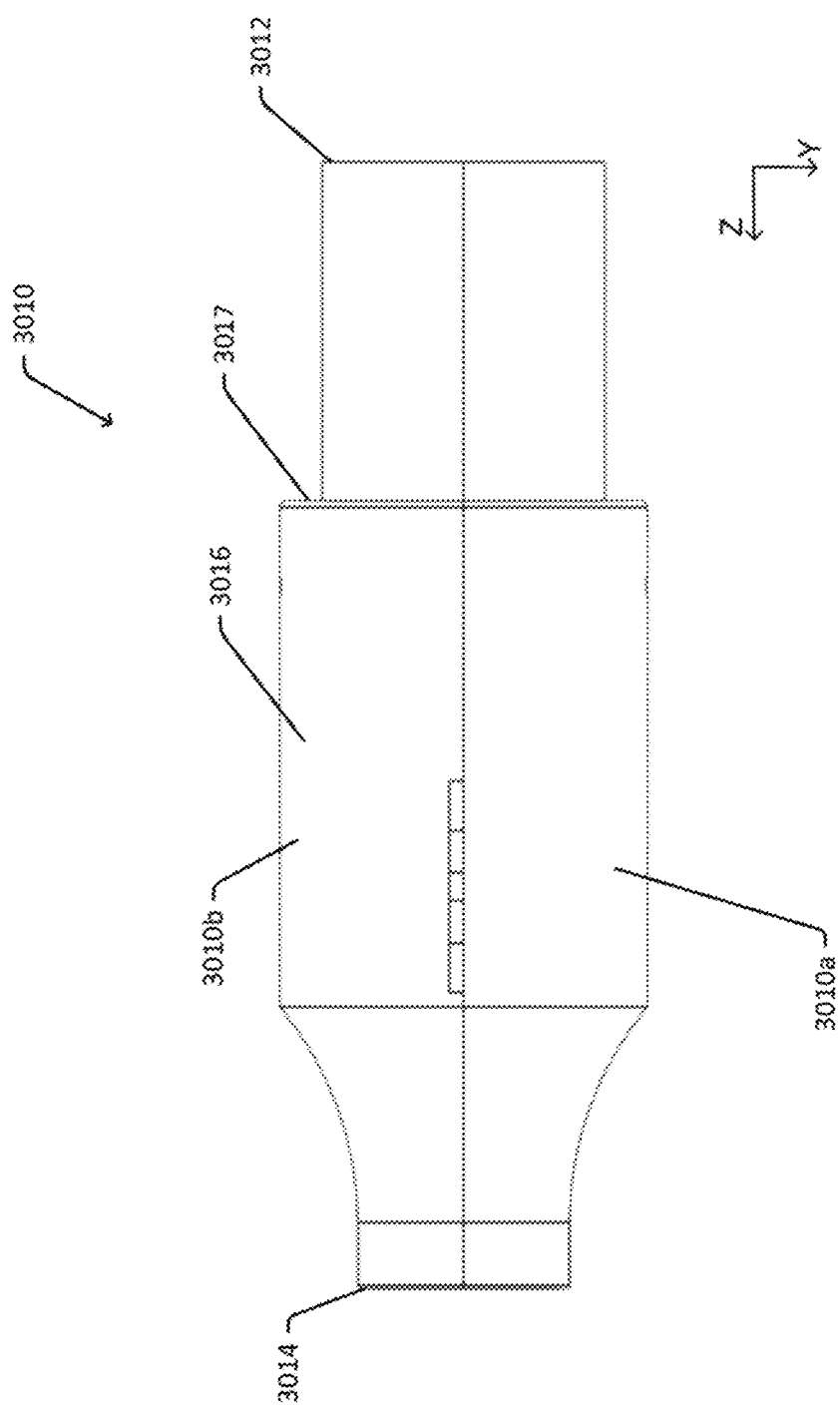
FIG. 34 is a side view of the air block lead in guide structure of FIG. 30.
Figure 35:
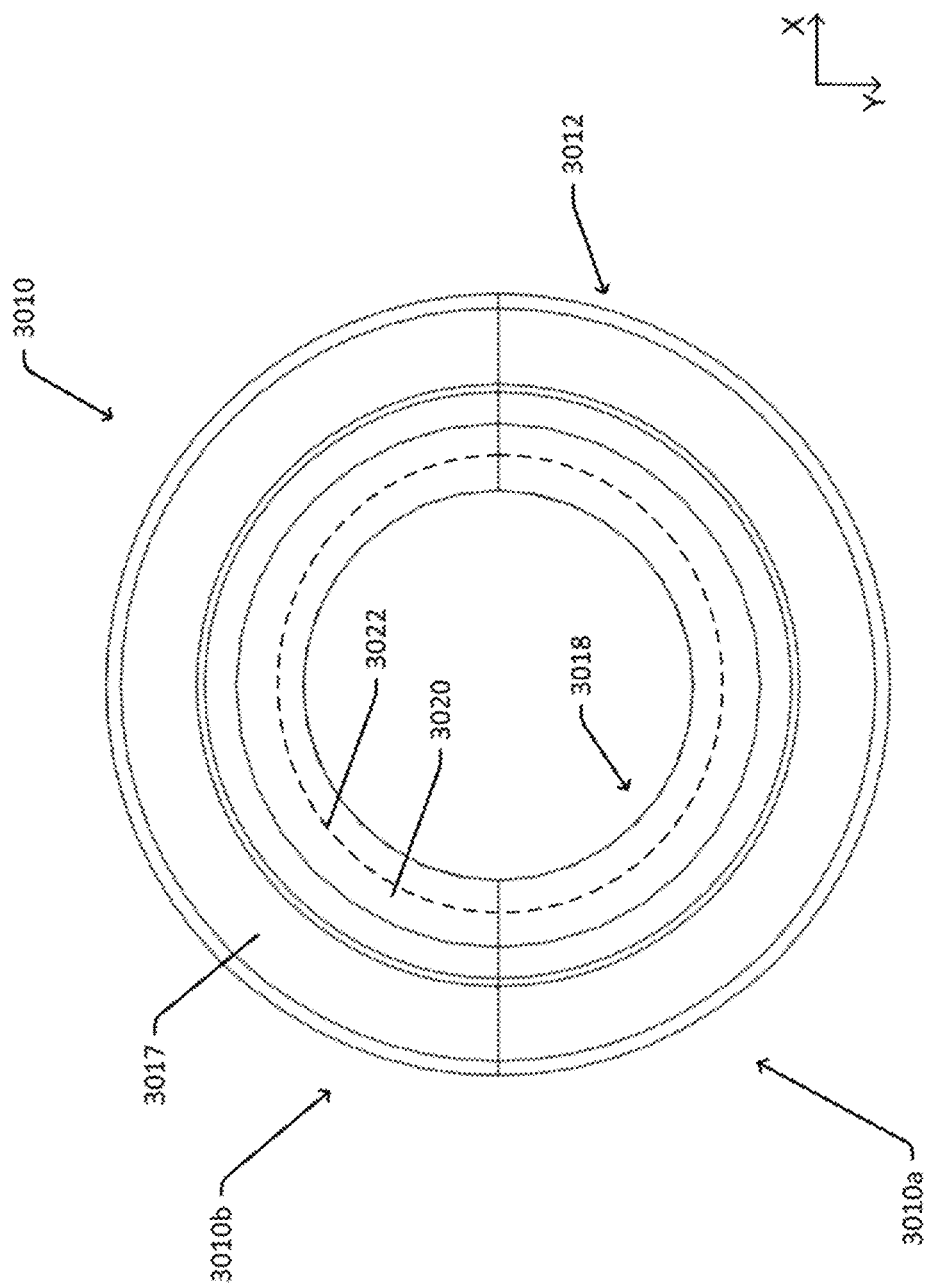
FIG. 35 is a front view of the air block lead in guide structure of FIG. 30.

FIG. 33 is a side perspective view of the air block lead in guide structure 3010. FIG. 34 is a side view of the air block lead in guide structure 3010. FIG. 35 is a front view of the air block lead in guide structure 3010. FIG. 36 is a side perspective view of the lower half 3010a of the air block lead in guide structure 3010. FIG. 37 is a front perspective view of the lower half 3010a of the air block lead in guide structure 3010.

In some embodiments the air block lead in guide structure 3010 has two halves: a lower half 3010a and an upper half 3010b (alternatively referred to herein as a first half and a second half). As such, the air block lead in guide structure 3010 can be opened to separate the lower half 3010a and the upper half 3010b, such as to provide access into the interior of the air block lead in guide structure, or to permit the transmission line 110 to be inserted or removed. For example, the lower half 3010a and the upper half 3010b can be separated during maintenance or in the event of a malfunction (e.g., damage of the transmission line 110). Additionally, the air block lead in guide structure 3010 may be replaceable. The air block lead in guide structure 3010 is made of a material that does not significantly deform with the impact of the transmission line 110. The material is more rigid than the seal 365 of FIG. 12. In one non-limiting example, the air block lead in guide structure 3010 is made of aluminum. In another non-limiting example, the air block lead in guide structure 3010 is made of plastic, especially a wear resistant plastic.

The air block lead in guide structure 3010 in this example include, among other things, a central portion 3016, a forward end 3012, and a rearward end 3014. The central portion 3016 has a larger size, in the X-Y plane, than those of the forward end 3012 and the rearward end 3014. As such, there is a securing flange 3017 formed at the place where the central portion 3016 and the forward end 3012 are joined. The securing flange 3017 can be used to secure the air block lead in guide structure 3010 to the transmission line input aperture of the air block. The rearward end 3014 has a gradual shape that may facilitate the air to flow smoothly inside the air block 363 toward the duct segment D2. As a result, turbulence or laminar flow may be avoided.

The air block lead in guide structure 3010 further includes an inner body 3018. The inner body 3018 has a tapered sidewall 3020 and defines an inner aperture 3022 that extends from the forward end 3012 to the rearward end 3014. The inner aperture 3022 has a dimension at the forward end 3012 that is greater than the dimension at the place where the forward end 3012 and the central portion 3016 are joined together (i.e., the location of the securing flange 3017). A smooth gradually tapered shape, facing the advancement direction of the transmission line (for example, having a tapered cross-sectional shape that decreases in size in an advancement direction of the transmission line), of the inner aperture 3022 and the tapered sidewall 3020 acts like a funnel to direct the transmission line into the air block.

FIG. 38 is another side perspective view illustrating a portion of the air block lead in guide structure of FIG. 30, and further illustrating two seals 365. As shown in the example of FIGS. 36-38, the central portion 3016 of the air block lead in guide structure 3010 has two seal recesses 3024 for accommodating seals 365, respectively. The seals 365 operate to prevent compressed air from within the air block 363 of FIG. 30 from escaping around the transmission line 110. The seals 365 fills a gap between the air block lead in guide structure 3010 and the transmission line 110. The seals 365 may be the example seal 365 illustrated and described in detail with reference to FIGS. 12-17. The seals 365 may also be the example rotational seal 365 illustrated and described in detail with reference to FIGS. 18-19. It should also be noted that the arrangement of two seal recesses 3024 and two corresponding seals 365 is just one example for illustration, and other numbers (e.g. one, three, and so on) of seal recesses 3024 and corresponding seals 365 are within the scope of the disclosure.

Figure 41:
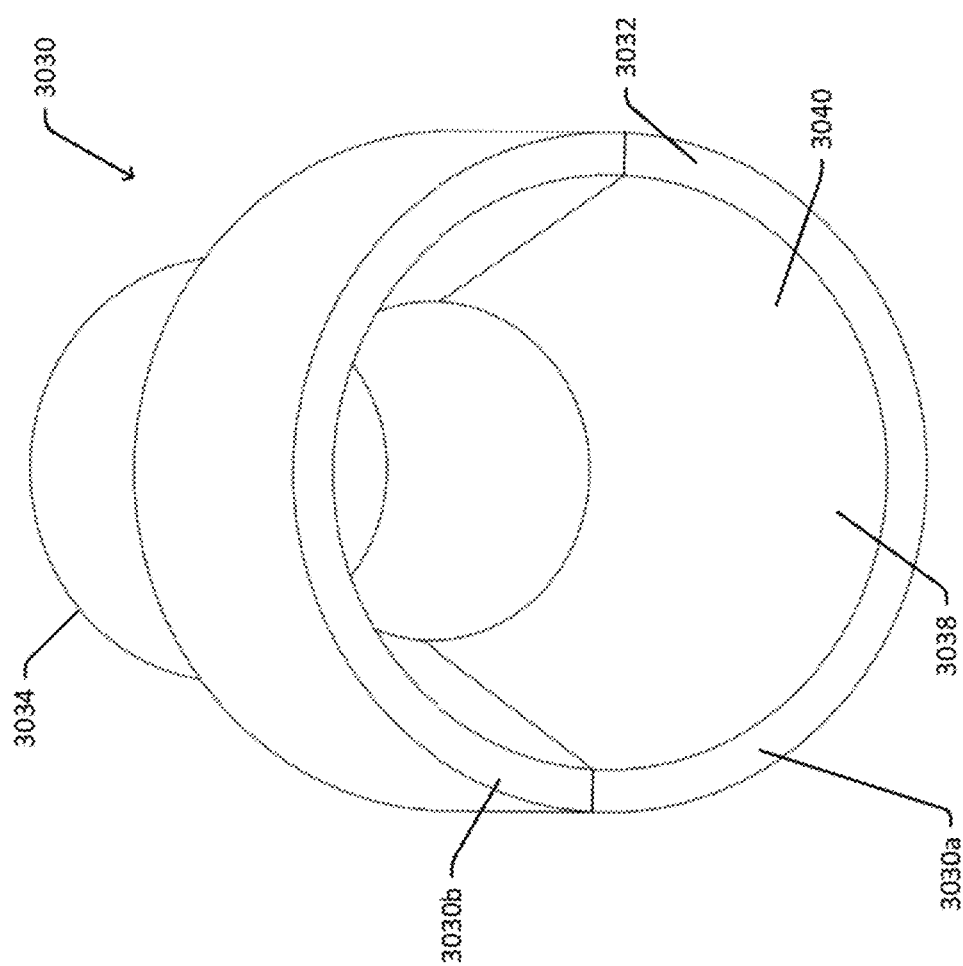
FIG. 41 is a front perspective view of the blower lead in guide structure of FIG. 30.

FIG. 39 is a side perspective view of the blower lead in guide structure 3030. FIG. 40 is a front view of the blower lead in guide structure 3030. FIG. 41 is a front perspective view of the blower lead in guide structure 3030.

Similarly, the blower lead in guide structure 3030 has two halves: a lower half 3030a and an upper half 3030b. As such, the blower lead in guide structure 3030 can be opened for similar reasons as the air block lead in guide structure 3010 described above. The blower lead in guide structure 3030 may be replaceable. The blower lead in guide structure 3030 is made of a material that does not significantly deform with the impact of the transmission line 110. The material is more rigid than the seal 365 of FIG. 12. In one non-limiting example, the blower lead in guide structure 3030 is made of aluminum. In another non-limiting example, the blower lead in guide structure 3030 is made of plastics, especially wear resistant plastics.

The blower lead in guide structure 3030 in this example include, among other things, a forward end 3032, and a rearward end 3034. The forward end 3032 has a larger size, in the X-Y plane, than that of the rearward end 3034. As such, there is a securing flange 3037 formed at the place where the rearward end 3034 and the forward end 3032 are joined together. The securing flange 3037 can be used to secure the blower lead in guide structure 3030 to the transmission line receptacle to prevent the blower lead in guide structure 3030 from moving rearward (along the advancement direction of the transmission line) as it passes therethrough.

The blower lead in guide structure 3030 further includes an inner body 3038. The inner body 3038 has a tapered sidewall 3020 and defines an inner aperture 3042 that extends from the forward end 3032 to the rearward end 3034. The inner aperture 3042 has a dimension at the forward end 3032 that is greater than the dimension at the place where the forward end 3032 and the rearward end 3034 are joined together (i.e., the location of the securing flange 3037). A smooth gradually tapered shape, facing the advancement direction of the transmission line (for example, having a tapered cross-sectional shape that decreases in size in an advancement direction of the transmission line), of the inner aperture 3042 and the tapered sidewall 3040 acts like a funnel to direct the transmission line into the cable drive assembly 360.

The present disclosure and claims sometimes utilize the words "first," "second," "third," etc. as labels to particularly identify particular objects. Unless required by the context, such terms are used only as labels and do not require any particular order or arrangement with respect to each other or with respect to other objects. For example, a first segment of a duct does not need to be at the beginning of the duct and the second segment does not need to come after the first.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A transmission line installation system comprising:
   a control unit comprising a processing device, a computer-readable storage device, a communication device, a display device, and at least one input device, the control unit being configured to display status information and to receive input from a user; and
   at least two transmission line conveying apparatuses configured to be arranged in series along a duct having at least a first segment and a second segment and operable to cooperate to advance a transmission line through the duct, the transmission line conveying apparatuses comprising a plurality of components each including a local controller operable to locally control an associated component, the local controllers of the associated components comprising a processing device, a computer-readable storage device, and a communication device, wherein the communication devices of the local controllers are configured to communicate with at least one of the control unit and at least one other local controller to synchronize operation of the associated components during installation of the transmission line;
   wherein the at least two transmission line conveying apparatuses comprise a first line blower and a second line blower;
   wherein the second line blower is configured to be arranged between the first and the second segments of the duct and is controlled to synchronize the operation of the second line blower with the operation of the first line blower and to receive the transmission line from an end of the first segment and to advance the transmission line into the second segment; and
   wherein at least one of the first line blower or the second line blower further comprises a guide system including a lead in guide structure having a tapered configuration to guide a leading end of the transmission line.

2. The transmission line installation system of claim 1, wherein the first line blower is controlled by the control unit to receive the transmission line from a reel stand and to advance the transmission line into a first segment of the duct.

3. The transmission line installation system of claim 1, wherein the first and second blowers are controlled by the control unit operating as a global controller.

4. The transmission line installation system of claim 1, wherein the first and second blowers are configured to be in real-time bi-directional data communication with at least one of: the control unit and each other, to permit at least one of the first and second blowers to provide feedback communication and to cause at least the operation of the other of the first and second blowers to be adjusted based on the feedback while the transmission line installation is in process.

5. The transmission line installation system of claim 1, wherein at least one of the transmission line conveying apparatuses includes a fluid injector to manually or autonomously apply a fluid to the transmission line as the transmission line passes therethrough.

6. The transmission line installation system of claim 5, wherein the fluid injector comprises a local controller and is controlled by the control unit.

7. The transmission line installation system of claim 1, wherein the operation of the components is configured to be synchronized using machine learning during installation of the transmission line.

8. A method of installing a transmission line into a duct using the transmission line installation system of claim 1, the method comprising:
   operating the first line blower to receive the transmission line and to advance the transmission line into the first segment of the duct;
   monitoring advancement of the transmission line through the first segment of the duct;
   automatically activating the second line blower arranged between the first and second segments of the duct when determined that the transmission line is approaching an end of the first segment; and
   operating the second line blower to receive the transmission line from the first segment of the duct and to advance the transmission line into the second segment of the duct.

9. The method of claim 8, wherein the operation of the first and second line blowers is controlled by the control unit, which monitors the advancement of the transmission line and automatically activates the second line blower.

10. The method of claim 8, wherein the transmission line continues moving as it advances from the first segment of the duct into the second segment of the duct.

11. The method of claim 8, wherein the second line blower operates to receive the transmission line and to advance the transmission line into the second segment of the duct without stopping the advancement of the transmission line.

12. The method of claim 8, wherein the first line blower receives the transmission line from a reel stand, the reel stand is controlled by the control unit to feed the transmission line at a specified rate based at least in part on a transmission line installation plan.

13. The method of claim 8, wherein activating the second line blower comprises determining a speed of the transmission line and controlling the second line blower to have a speed that matches the speed of the transmission line.

14. The method of claim 8, wherein activating the second line blower further comprises determining at the control unit an air pressure and an air flow rate and controlling the second line blower to operate at the air pressure and the air flow rate.

15. A line blower of the transmission line installation system of claim 1, wherein the line blower is one of the first or the second transmission line blowers with a guide system including the lead in guide structure having the tapered configuration to guide the leading end of the transmission line, the line blower further comprising:
- a cable drive assembly configured to engage with the transmission line and to provide a pushing force to advance the transmission line;
- an air block having a transmission line input and a transmission line output; and
- an air intake configured to receive pressurized air and to supply the pressurized air to the air block.

16. The line blower of claim 15, wherein the guide system comprises an air block lead in guide structure at the transmission line input, and the air block lead in guide structure has a tapered cross-sectional shape that decreases in size in an advancement direction of the transmission line.

17. The line blower of claim 15, wherein the guide system comprises a blower lead in guide structure, and the blower lead in guide structure has a tapered cross-sectional shape that decreases in size in an advancement direction of the transmission line.

* * * * *